(12) United States Patent
Wilkinson et al.

(10) Patent No.: US 11,340,188 B2
(45) Date of Patent: May 24, 2022

(54) METHODS AND APPARATUSES FOR ELECTROCHEMICAL ANALYSIS OF A SAMPLE

(71) Applicant: The University of British Columbia, Vancouver (CA)

(72) Inventors: David Wilkinson, Vancouver (CA); Arman Bonakdarpour, Vancouver (CA); Jason Kwan, Vancouver (CA); Louis Greg Afonso, Vancouver (CA)

(73) Assignee: The University of British Columbia, Vancouver (CA)

( * ) Notice: Subject to any disclaimer, the term of this patent is extended or adjusted under 35 U.S.C. 154(b) by 224 days.

(21) Appl. No.: 16/587,810

(22) Filed: Sep. 30, 2019

(65) Prior Publication Data
US 2020/0103363 A1 Apr. 2, 2020

Related U.S. Application Data

(60) Provisional application No. 62/738,225, filed on Sep. 28, 2018.

(51) Int. Cl.
*G01N 27/30* (2006.01)
*G01N 27/327* (2006.01)
*G01N 27/38* (2006.01)

(52) U.S. Cl.
CPC ....... *G01N 27/304* (2013.01); *G01N 27/3272* (2013.01); *G01N 27/30* (2013.01); *G01N 27/38* (2013.01)

(58) Field of Classification Search
CPC ......... G01N 27/30; G01N 27/31; G01N 17/02
See application file for complete search history.

(56) References Cited

U.S. PATENT DOCUMENTS

| 5,624,537 A | 4/1997 | Turner et al. |
| 7,361,257 B2 | 4/2008 | Wang et al. |
| 2003/0070917 A1* | 4/2003 | Giaquinta ............... C25D 17/02 204/269 |
| 2014/0014510 A1* | 1/2014 | Ehmele .................. G01N 17/02 204/404 |

OTHER PUBLICATIONS

Liu et al., "Manganese oxide-based catalysts for low-temperature selective catalytic reduction of NOx with NH3: A review," Applied Catalysts A: General 522 (2016) 54-60 (Year: 2016).*
Ardizzone et al., ""Inner" and "Outer" Active Surface of $RuO_2$ Electrodes," *Electrochimica Acta* 35(1):263-267, 1990.

(Continued)

*Primary Examiner* — Alexander S Noguerola
(74) *Attorney, Agent, or Firm* — Seed Intellectual Property Law Group LLP

(57) ABSTRACT

A method of exposing a sample to an electrical effect for electrochemical analysis of the sample in an electrolyte solution is disclosed. The method comprises causing an external electrical conductor of an electrode head to apply the electrical effect, the external electrical conductor of the electrode head being external to the electrode head and on an external side of the sample exposed to the electrolyte solution. Apparatuses are also disclosed.

20 Claims, 34 Drawing Sheets

(56) References Cited

OTHER PUBLICATIONS

Bonakdarpour et al., "Nanopillar niobium oxides as support structures for oxygen reduction electrocatalysts," *Electrochimica Acta* 85:492-500, 2012.

Darling, "Conductivity of Sulfuric Acid Solutions," *Journal of Chemical and Engineering Data* 9(3):421-426, 1964.

Gasteiger et al., "Activity benchmarks and requirements for Pt, Pt-alloy, and non-Pt oxygen reduction catalysts for PEMFCs," *Applied Catalysis B: Environmental* 56:9-35, 2005.

Jaouen et al., "Oxygen reduction activities compared in rotating-disk electrode and proton exchange membrane fuel cells for highly active Fe—N—C catalysts," *Electrochimica Acta* 87:619-628, 2013.

Kang et al., "Performance Modeling and Current Mapping of Proton Exchange Membrane Electrolyzer Cells with Novel Thin/Turnable Liquid/Gas Diffusion Layers," *Electrochimica Acta* 255:405-416, 2017.

Kroschel et al., "Analysis of oxygen evolving catalyst coated membranes with different current collectors using a new modified rotating disk electrode technique," *Electrochimica Acta* 317:122-736, 2019.

Kwan et al., "Bridging Fundamental Electrochemisty with Applied Fuel Cell Testing: A Novel and Economical Rotating Disk Electrode Tip for Electrochemical Assessment of Catalyst-Coated Membranes," *Electrochimica Acta* 258:208-219, 2017.

Lettenmeier et al., "Nanosized $IrO_x$—Ir Catalyst with Relevant Activity for Anodes of Proton Exchange Membrane Electrolysis Produced by a Cost-Effective Procedure," *Angew. Chem. Int. Ed.* 55:742-746, 2016.

Millet, "10. Characterization Tools for Polymer Electrolyte Membrane (PEM) Water Electrolyzers," 179-217, 2015.

Oh et al., "Oxide-supported Ir nanodendrites with high activity and durability for the oxygen evolution reaction in acid PEM water electrolyzers," *Chemical Science* 6:3321, 2015, (8 pages).

Rakousky et al., "An analysis of degradation phenomena in polymer electrolyte membrane water electrolysis," *Journal of Power Sources* 326:120-128, 2016.

Schmidt et al., "Rotating thin-film method for supported catalysts," *Handbook of Fuel Cells—Fundamentals, Technology and Applications*, edited by Vielstich et al., 2010, (18 pages).

\* cited by examiner

METHODS AND APPARATUSES FOR ELECTROCHEMICAL ANALYSIS OF A SAMPLE

CROSS-REFERENCE TO RELATED APPLICATION

This application claims priority to U.S. provisional patent application No. 62/738,225 filed Sep. 28, 2018, the entire contents of which are incorporated by reference herein.

FIELD

This disclosure relates generally to methods and apparatuses for electrochemical analysis of a sample.

RELATED ART

Known methods and apparatuses for electrochemical analysis of a sample may indicate electroactive processes of the sample. However, some known methods and apparatuses for electrochemical analysis are very costly, and electroactive processes of a sample in other known electrochemical analysis may not accurately represent electroactive processes of the sample in applications that differ from the electrochemical analysis.

SUMMARY

According to one embodiment, there is disclosed a method of exposing a sample to an electrical effect for electrochemical analysis of the sample in an electrolyte solution, the method comprising causing an external electrical conductor of an electrode head to apply the electrical effect, the external electrical conductor of the electrode head being external to the electrode head and on an external side of the sample exposed to the electrolyte solution.

In some embodiments, the method further comprises causing the sample and the external electrical conductor to rotate about an axis of rotation when the sample and the external electrical conductor are exposed to the electrolyte solution.

In some embodiments, causing the electrical effect to be applied to the external electrical conductor comprises causing the electrical effect to be applied to an electrical lead spaced apart from the sample and on an internal side of the sample opposite the external side of the sample.

In some embodiments: causing the external electrical conductor of the electrode head to apply the electrical effect comprises causing the electrical effect to be applied to an internal electrical conductor; the internal electrical conductor is between, and in electrically conductive communication with, the electrical lead and the external electrical conductor; and the internal electrical conductor extends from the external electrical conductor to the internal side of the sample.

In some embodiments, the sample comprises an electroactive sample.

In some embodiments, the electroactive sample comprises a proton-exchange membrane.

In some embodiments, the electroactive sample comprises a catalyst-coated substrate.

In some embodiments, the electroactive sample comprises a membrane-electrode assembly.

In some embodiments, causing the external electrical conductor of the electrode head to apply the electrical effect comprises causing an electric potential to be applied to the external electrical conductor.

According to another embodiment, there is disclosed an apparatus for electrochemical analysis of a sample in an electrolyte solution, the apparatus comprising an electrode head defining a space for receiving the sample, the space in the electrode head open to an exterior of the electrode head at an open side of the space in the electrode head, the electrode head comprising an external electrical conductor external to the electrode head and on the open side of the space in the electrode head.

In some embodiments, the electrode head comprises a shaft interface on an internal side of the space in the electrode head opposite the open side of the space in the electrode head and coupleable to a shaft for rotation of the electrode head and of the shaft about an axis of rotation.

In some embodiments, the space in the electrode head has a shape of a disk having a center on the axis of rotation.

In some embodiments, the space in the electrode head has a shape of a ring having a center on the axis of rotation.

In some embodiments, the apparatus further comprises a motor operable to rotate the electrode head about the axis of rotation.

In some embodiments, the apparatus further comprises a shaft coupled to the electrode head and a motor operable to rotate the electrode head and the shaft about an axis of rotation.

In some embodiments, the apparatus further comprises an electrical lead positionable to be in electrically conductive communication with the external electrical conductor and on an internal side of the space in the electrode head opposite the open side of the space in the electrode head.

In some embodiments, the electrode head further comprises an internal electrical conductor positionable to extend from the external electrical conductor to the internal side of the space in the electrode head, and positionable to be in electrically conductive communication with the electrical lead and with the external electrical conductor.

In some embodiments, the electrode head comprises: a first portion comprising the electrical lead; and a second portion defining the space in the electrode head, comprising the external electrical conductor, and removably attachable to the first portion. In some embodiments, the internal electrical conductor is positionable to be in electrically conductive communication with the electrical lead when the first portion of the electrode head is attached to the second portion of the electrode head.

In some embodiments, the electrode head further comprises a movable portion movable to urge the sample against the external electrical conductor when the sample is received in the space in the electrode head.

In some embodiments, the apparatus further comprises an electrolyte reservoir for an electrochemical cell, the electrolyte reservoir operable to hold the electrolyte solution and operable to hold the electrode head in a position such that external electrical conductor is exposed to the electrolyte solution when the reservoir holds the electrolyte solution.

Other aspects and features will become apparent to those ordinarily skilled in the art upon review of the following description of illustrative embodiments in conjunction with the accompanying figures.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

Figure 2:
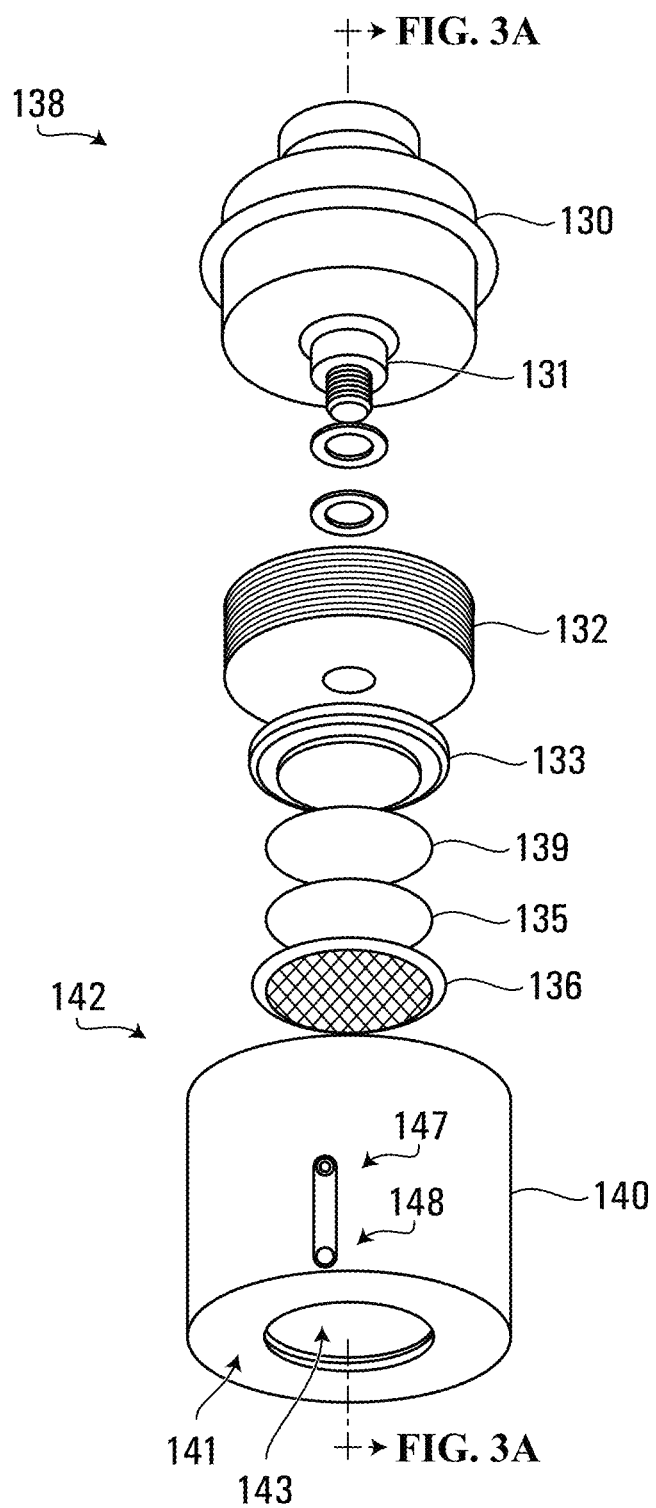
FIG. 2 is an exploded perspective view of an electrode of the electrochemical analysis system of FIG. 1.

Arrhenius plot of with the exchange current density (diamonds=ETS, circles=an electrode such as the electrode of FIG. 2).

Figure 25A:
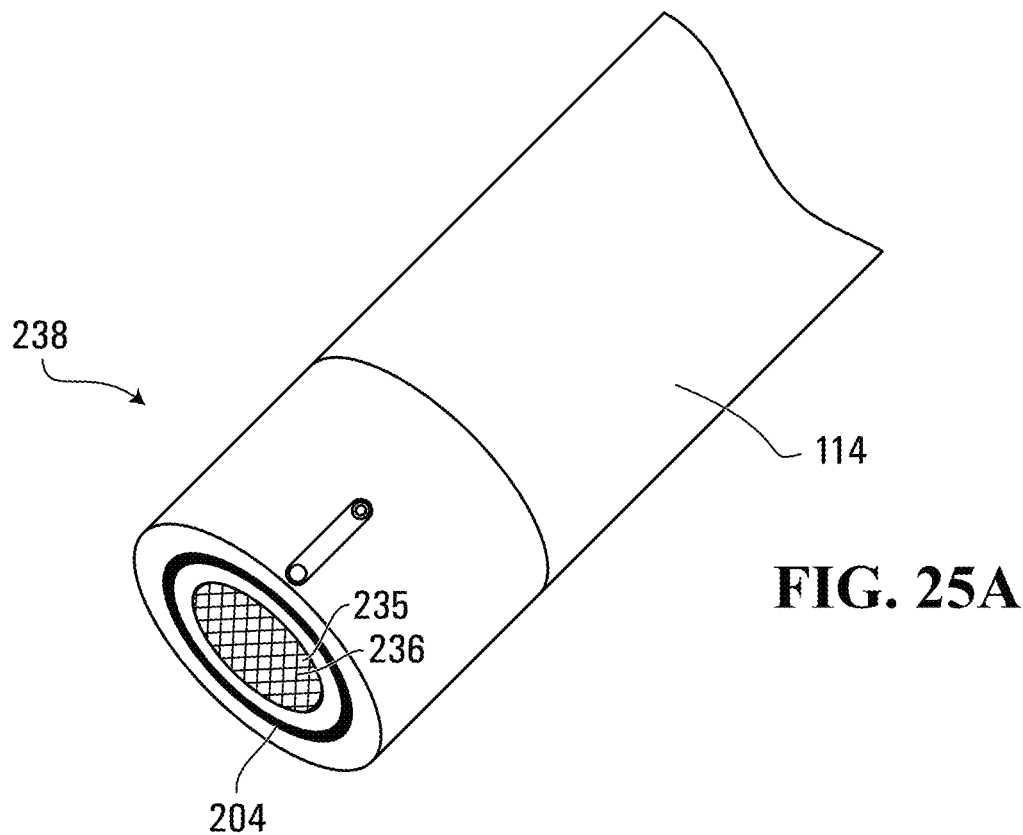

FIG. 25a is a perspective view of an electrode according to another embodiment.

Figure 25B:
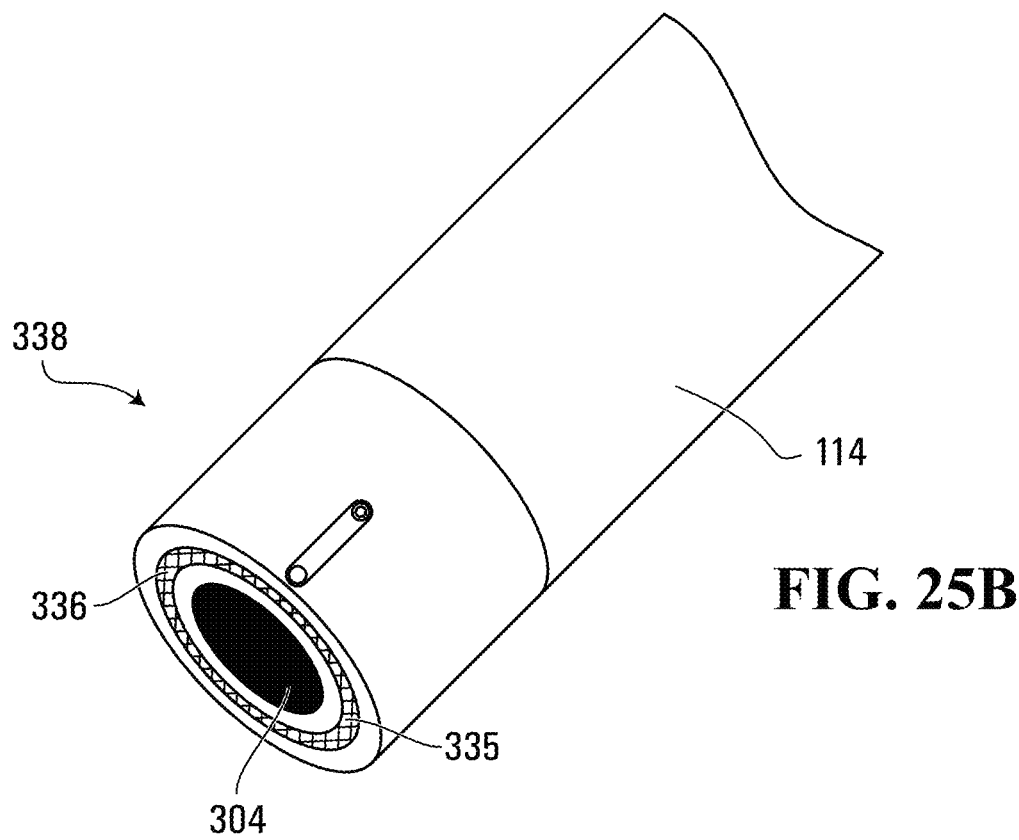

FIG. 25b is a perspective view of an electrode according to another embodiment.

DETAILED DESCRIPTION

Throughout the following description, specific details are set forth in order to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive, sense.

Figure 1:
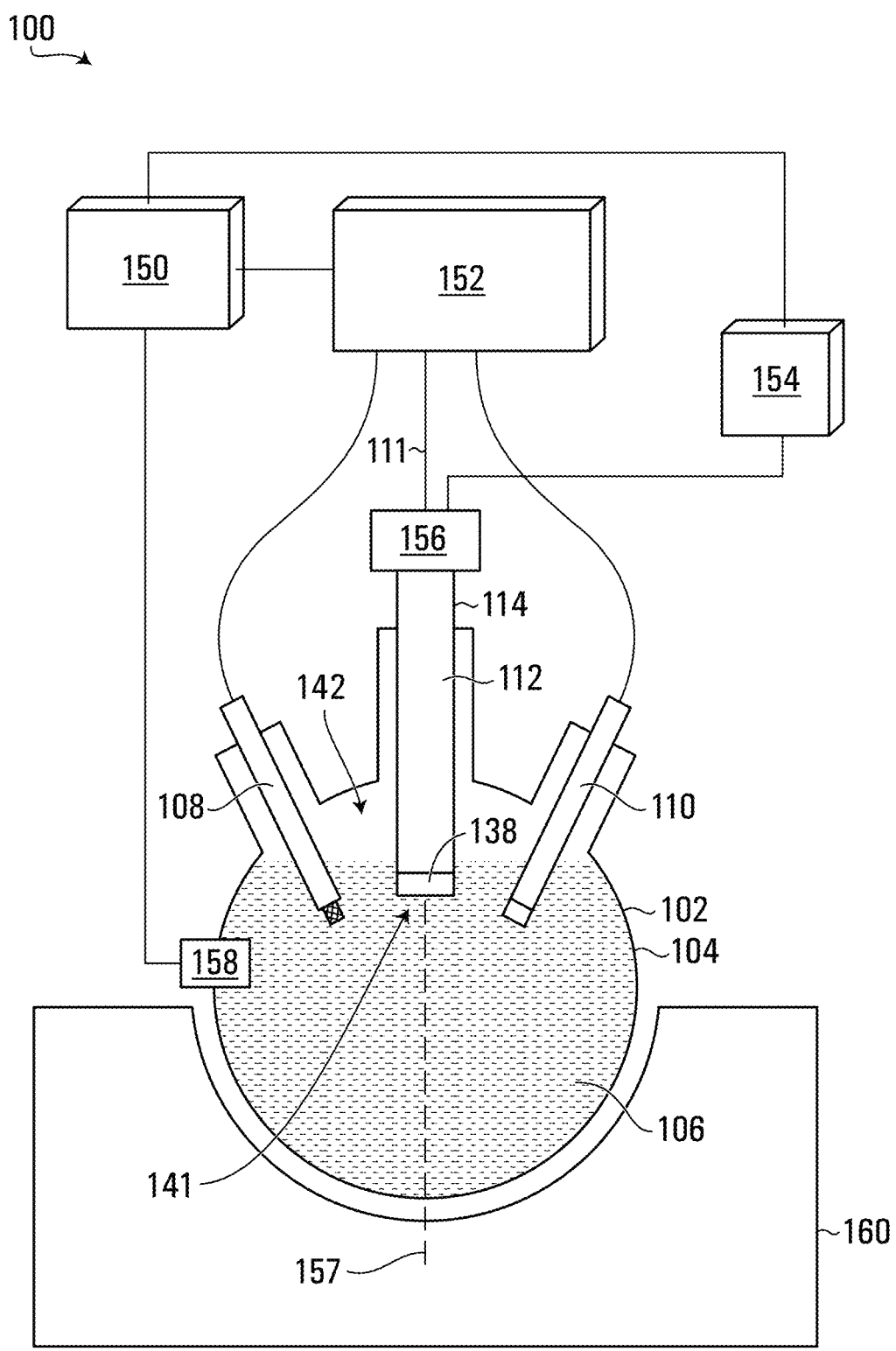
FIG. 1 illustrates an electrochemical analysis system according to one embodiment.

Referring to FIG. 1, an electrochemical analysis system according to one embodiment is shown generally at 100 and includes an electrochemical cell 102. In the embodiment shown, the electrochemical cell 102 includes an electrolyte reservoir 104 holding an electrolyte solution 106. The electrochemical cell 102 includes a counter electrode 108, a reference electrode 110, and a working electrode 112. The working electrode 112 includes a shaft 114 and an electrode head 138. The electrochemical analysis system 100 also includes a motor 156 operable to rotate the shaft 114 and the electrode head 138 about an axis of rotation 157. The electrochemical analysis system 100 also includes a motor controller 154 operable to control the motor 156 to control rotation of the shaft 114 and the electrode head 138 about the axis of rotation 157. The electrochemical analysis system also includes a potentiostat 152 operable to control an electrical effect (such as an electric potential or electric current) of the counter electrode 108 and an electrical effect (such as an electric potential or electric current) of the working electrode 112. The electrochemical analysis system 100 also includes a computing device 150 operable to control the potentiostat 152 and the motor controller 154. The electrochemical analysis system 100 may also include an optional sensor 158, and the computing device 150 may be operable to receive sensor signals from the sensor 158. In some embodiments, the sensor 158 may be an optical sensor such as a camera, a spectrometer, an optical recording device, or an infra-red spectrometer, for example. The electrochemical analysis system 100 may also include an optional temperature control system (for example a heater) 160 operable to control a temperature of the electrolyte solution 106.

The electrochemical analysis system 100 is an example only, and alternative embodiments may differ. For example, in some embodiments, the electrolyte reservoir 104 may be omitted or may differ. Further, in some embodiments, the sensor 158 may be omitted, or some embodiments may include one or more sensors that may be the same as or different from the sensor 158. Further, in some embodiments, the temperature control system 160 may be omitted or may differ.

Figure 3A:
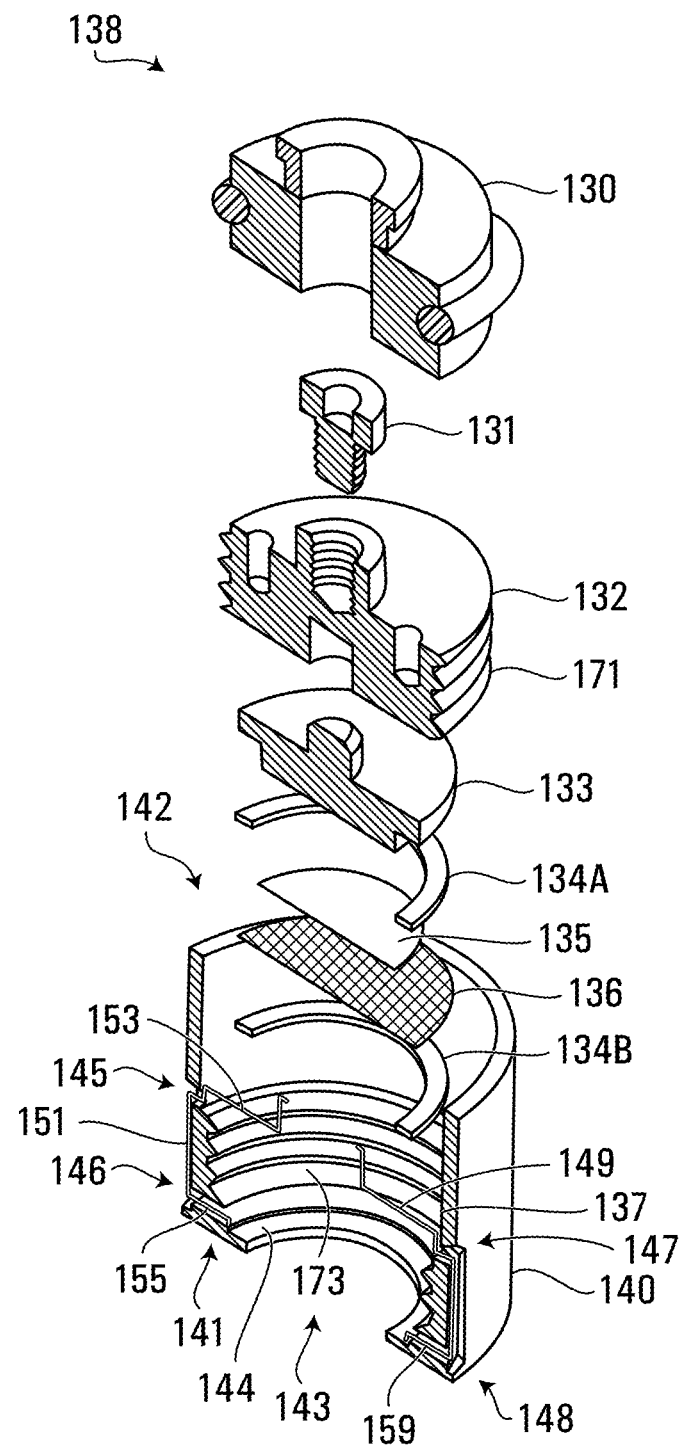
FIG. 3a is an exploded cross sectional perspective view of the electrode of FIG. 2.
Figure 3B:
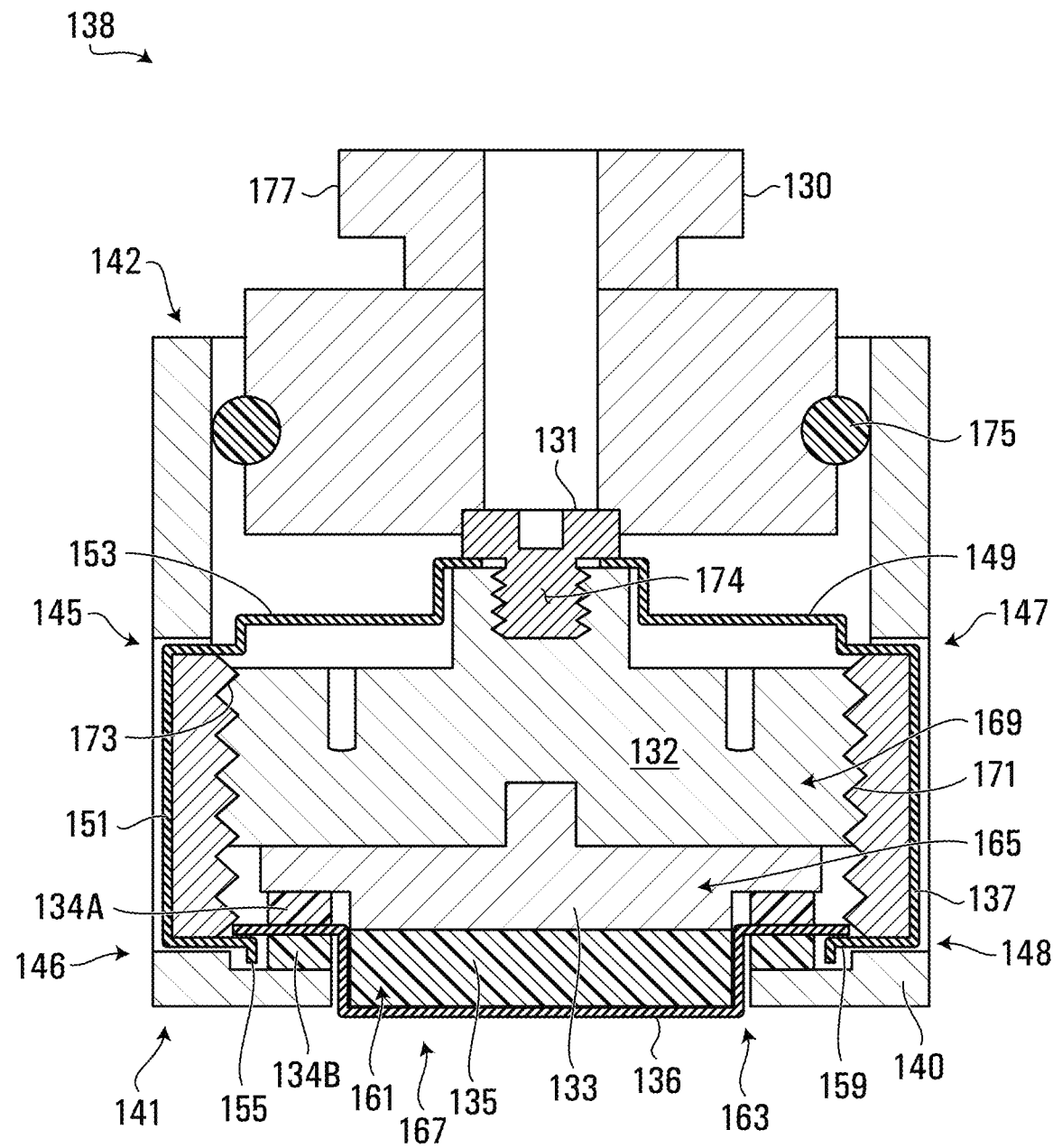
FIG. 3b is an assembled cross sectional view of the electrode of FIG. 2.
Figure 4:
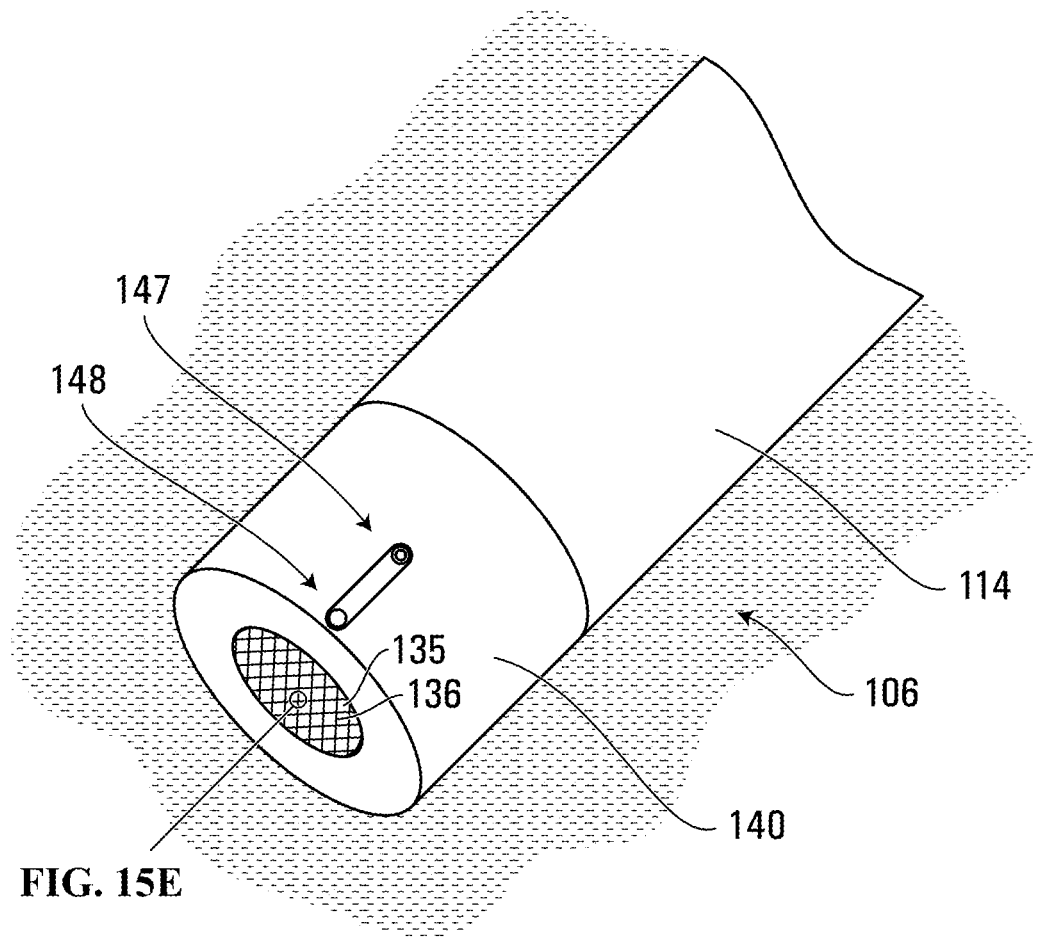
FIG. 4 is a perspective view of the electrode of FIG. 2.

Referring to FIGS. 2, 3a, and 3b, the electrode head 138 includes an electrode housing 140 having a first side shown generally at 141 and a second side shown generally at 142 opposite the first side 141. On the first side 141, the electrode housing 140 is open at a first opening shown generally at 143 and surrounded by a flange 144. The electrode housing 140 defines a first pair of generally radial openings shown generally at 147 and 148, and a second pair of generally radial openings 145 and 146 opposite the generally radial openings 147 and 148 respectively. The electrode housing 140 may be made of any suitable material that is inert under the reaction conditions to be employed during use, such as polytetrafluoroethylene (PTFE), Teflon™, ceramic, graphite, or other materials (such as polymeric materials) which are chemically inert in the electrolyte solution 106.

A first internal electrical conductor 137 has an internal-side portion 149 extending generally radially inward from the generally radial opening 147 and an external-side portion 159 extending generally radially inward from the generally radial opening 148. A second internal electrical conductor 151 includes an internal-side portion 153 extending generally radially inward from the generally radial opening 145, and an external-side portion 155 extending generally radially inward from the generally radial opening 146.

The electrode head 138 also includes a first gasket 134b positionable against the flange 144, and an external electrical conductor 136 positionable against the gasket 134b, all on the second side 142 of the flange 144. Suitable materials for the gasket 134b may include silicone or other rubber materials that may be selected to be non-reactive in the conditions of use of the electrode 112. The structure of the gasket 134b may be an O-ring or a circular flat gasket with compressibility.

The external electrical conductor 136 may be a mesh in some embodiments, and may be referred to herein as a mesh. The external electrical conductor 136 may also be referred to as a current collector, although reference to a current collector is not intended to limit the external electrical conductor to a particular current direction. The external electrical conductor 136 may be made of an electrically conducting material that does not interfere with the working electrode 112 reaction under the conditions existing during use and does not corrode under the conditions, for example a metal, metal alloy, carbonaceous material (e.g., carbon foam) or conducting metal oxides. The external electrical conductor 136 may be comprised of titanium, tungsten, gold, or other materials that do not have an electrochemical reaction at the potentials and in the media present during operation of the electrochemical cell 102. The external electrical conductor 136 may be in the form of a mesh, net, felt, discrete particle packed layers, or various 3D shapes (e.g., metal foams, carbon foams, spongy porous structures, porous transport layer (sintered Ti)). The external electrical conductor 136 may be selected from various material types, including, for example, carbon-fiber gas diffusion layers, meshes, packed sintered particulate layers, or felts, or semi-conductors. In some embodiments, the external electrical conductor 136 possesses a low resistance to electrical current, and in some embodiments is also made of a material that is inert or of very low activity to reaction under the conditions (e.g. pH, temperature, chemical species present, liquid medium, applied potentials etc.) selected during use.

As shown in FIG. 3b, when the external electrical conductor 136 is positioned against the gasket 134b, the external electrical conductor 136 is positionable in contact with the external-side portion 155 of the internal electrical conductor 151 and in contact with the external-side portion 159 of the internal electrical conductor 137 such that the internal electrical conductors 137 and 151 are in electrically conductive communication with the external electrical conductor 136.

The electrode head 138 also includes a second gasket 134a positionable against the second side 142 of the external electrical conductor 136, and a backing piece 133 positionable against the second side 142 of the gasket 134a. Suitable materials for the gasket 134a may include silicone or other rubber materials that may be selected to be non-reactive in the conditions of use of the electrode 112. The structure of the gasket 134a may be an O-ring or a circular flat gasket with compressibility. The backing piece 133 may be made of suitable materials that are inert under the intended reaction conditions, such as PTFE, Teflon, PEEK, Ultem and other similar materials, for example.

When the backing piece 133 is thus positioned, a space shown generally at 161 is formed between the backing piece 133 and the external electrical conductor 136. The space 161 has an open side shown generally at 163 on the first side 141 of the electrode head 138, and the space also has an internal side shown generally at 165 on the second side 142 of the electrode head 138 and opposite the open side 163. In the embodiment shown, the space 161 has a shape of a disk having a center on the axis of rotation 157, so the motor 156 is operable to rotate the electrode 112 (including the shaft 114 and the electrode head 138) about the center of the space 161.

A sample 135 may be positioned in the space 161, and when the sample 135 is positioned in the space 161, the sample has an external side shown generally at 167 on the side 141 of the electrode head 138, and an internal side shown generally at 169 on the second side 142 of the electrode head 138 and opposite the external side 167. In some embodiments, the sample may be an electroactive sample such as a proton exchange membrane, a catalyst-coated substrate, or a membrane-electrode assembly, for example.

The backing piece 133 may assist with maintaining the sample 135 flat, and may enhance the contact of the sample 135 with the external electrical conductor 136. Furthermore, the backing piece 133 can aid with ensuring that the sample 135 will be flush with the opening 143 so that hydrodynamic interferences may be reduced or minimized. The backing piece 133 may have a small physical footprint while an elevated portion may be sized such that a protrusion of the sample 135 occurs. An outer diameter of the backing piece 133 in some examples ranges from 0.5 to 2 cm with the elevated portion being 2 to 5 mm high.

The external electrical conductor 136 may be in a form that provides a high open area so that an area of the sample 135 that physically contacts solid parts of the external electrical conductor 136 may be relatively small compared to the area of the sample 135 that does not physically contact the solid parts of the external electrical conductor 136. The external electrical conductor 136 may have a net circular shape.

In some embodiments, an optional shim or support piece 139 may be positioned between the sample 135 and the backing piece 133 to improve contact of the sample 135. The support piece 139 may be made of various materials, which may be inert under the conditions present during use, such as Kapton or other material with similar properties.

In some embodiments, the external electrical conductor 136 is in such close contact with the external side 167 of the sample 135 in order to have substantially uniform electrical conductivity with the sample 135 across the external side 167 of the sample 135. In some embodiments, the external electrical conductor 136 may have some flexibility where the sample 135 hydrates and expands. A very slight bulge may occur, which may improve contact between the sample 135 and the external electrical conductor 136, but such a slight bulge may not interfere with the fluid dynamics when the electrode 112 rotates around the axis of rotation 157.

In some embodiments, the net shape and size of the portion of the external electrical conductor 136 that defines the space 161 matches the size of the sample 135, while having sufficient open area in the portion of the external electrical conductor 136 that contacts the sample 135 (for example, 5% or more, 25% or more, or 40% or more) to allow passage of any reactants and/or products formed to be removed with relative ease.

The electrode head 138 also includes a separator body 132 having external threads 171 complementary to internal threads 173 of the electrode housing 140, and rotation of the separator body 132 in the electrode head housing 140 may move the separator body 132 towards the backing piece 133 to exert a force on the backing piece 133 towards the first side 141, which urges the sample 135 against the external electrical conductor 136, thereby holding the sample 135 in the space 161. Therefore, one or both of the separator 132 and the backing piece 133 may be referred to as a movable portion of the electrode head 138 movable to urge the sample 135 against the external electrical conductor 136 when the sample 135 is received in the space 161. The embodiment shown includes threads 171 and 173, although alternative embodiments may include alternatives to such threads. The separator body 132 may separate the sample 135 and the electrolyte solution 106 during use of the electrode 112, from a core electrical housing. The separator body 132 may be sized to fit within the electrode housing 140, and may be of any suitable size to accommodate various embodiments. In the embodiment shown, the separator body 132 is about 0.5 to 2 cm in diameter. The thickness of the separator body 132 may be sufficient to withstand compressive forces from assembly of the components of the electrode head 138 together, and may depend to some degree on the materials chosen. In the embodiment shown, a thickness of the separator body 132 is about 1-3 cm.

The separator body 132 may be a means to apply compression to the first and second gaskets 134a and 134b, the sample 135, the external electrical conductor 136, and the external-side portions 155 and 159 when fully assembled for use. Such compression may provide sealing via the first and second gaskets 134a and 134b, which may fluidly seal the sample in place. Sealing from the first and second gaskets 134a and 134b may mitigate fluid flow of the electrolyte solution 106 or other fluids around the sample 135 to the internal side 169 of the sample 135 directly, rather than via any possible migration of fluid through the sample 135 itself. As a result of this sealing from the first and second gaskets 134a and 134b, only the external side 167 of the sample 135 may come into contact with the electrolyte solution 106, and thus only the external side 167 of the sample 135 may be characterized in electroanalytical experiments such as those described herein, while a periphery and the internal side 169 of the sample 135 may be shielded from the electrolyte solution 106 and may therefore not contribute to such electroanalytical measurements.

The generally radial through openings 145 and 147, and the internal-side portions 149 and 153 of the internal electrical conductors 137 and 151 respectively, are on the internal side 165 of the space 161, and on the internal side 169 of the sample 135. Also, as indicated above, the external electrical conductor 136 is positionable in contact with the external-side portion 155 of the internal electrical conductor 151 and in contact with the external-side portion 159 of the internal electrical conductor 137 such that the internal electrical conductors 137 and 151 are in electrically conductive communication with the external electrical conductor 136. Therefore, the internal electrical conductors 137 and 151 extend from the external electrical conductor 136 to the internal side 169 of the sample 135 and to the internal side 165 of the space 161.

The separator body 132 defines a threaded opening shown generally at 174, and a threaded fastener (or head-to-shaft electrical connector segment) 131 may be coupled to the separator body 132 in the threaded opening 174, for example by engagement of external threads of the threaded fastener 131 with internal threads of the threaded opening 174, although alternative embodiments may include alternatives to such threads. The separator body 132 may be made from materials that are able to withstand high temperatures and a variety of different electrolyte solutions such as machinable plastics, polymers, or ceramics. The threaded fastener 131 may be made of, or plated with any electrically conductive material, such as stainless steel, or a low-resistance metal such as gold, copper, platinum or the like. When the threaded fastener 131 is coupled to the separator body 132, the threaded fastener 131 may be positioned adjacent and in electrically conductive communication with, the internal-side portions 149 and 153. The threaded fastener 131 may therefore be referred to as an electrical lead on the internal side 165 of the space 161 and on the internal side 169 of the sample 135.

The electrode head 138 also includes a plunger body 130, which includes an O-ring (or other sealing material such as a gasket-like component) 175 on an external or peripheral surface of the plunger body 130 and receivable within the housing 140 such that the O-ring 175 may frictionally contact an inner surface of the housing 140 to couple the plunger body 130 to the housing 140. The plunger body 130 defines an axial through-opening that allows the shaft 114 to couple to the threaded fastener 131 to allow the electrode head 138 to be physically attached to the shaft 114 with sufficient strength to allow rotational operation to be performed without separation. Therefore, the threaded fastener 131 may function as a shaft interface on the internal side 165 of the space 161 and coupleable to the shaft 114. The plunger body 130 also includes an additional shaft interface 177 coupleable to the shaft 114 (shown in FIG. 1) that may facilitate coupling the electrode head 138 to the shaft 114. The plunger body 130 may be made of chemically inert material such as Teflon. When the electrode head 138 is coupled to the shaft 114, the threaded fastener 131 may be in electrically conductive communication with an electrical lead 111 (shown in FIG. 1) in electrically conductive communication with the potentiostat 152. For example, one or more conductive brushes may be used to facilitate an electrical connection between the electrical lead 111 and a conductive lead of the shaft that is in electrical communication with the threaded fastener 131, or other structures (such as one or more electrical conductors, including various different structures such as electrical conductors of rotating-disk electrode (RDEs) that may be known to a person skilled in the art) may facilitate an electrical connection between the threaded fastener 131 and the electrical lead 111.

Referring to FIGS. 1 and 3b, the threaded fastener 131 and the separator body 132 may be referred to as a first portion, and as indicated above, the threaded fastener 131 may be referred to as an electrical lead. The backing piece 133, the housing 140, and the external electrical conductor 136 may be referred to as a second portion defining the space 161. As indicated above, the external threads 171 of the separator body 132 are complementary to the internal threads 173 of the electrode housing 140, so the first portion (including the separator body 132) is removably attachable to the second portion (including the housing 140). As also indicated above, rotation of the separator body 132 in the electrode head housing 140 may exert a force on the backing piece 133 towards the first side 141, which may cause peripheral portions of the external electrical conductor 136 to contact the external-side portion 155 of the internal electrical conductor 151 and the external-side portion 159 of the internal electrical conductor 137, which may cause the internal electrical conductors 137 and 151 to be in electrically conductive communication with the external electrical conductor 136.

As indicated above, the electrical lead 111 (shown in FIG. 1) may be in electrically conductive communication with the potentiostat 152 and in electrically conductive communication with the threaded fastener 131, the threaded fastener 131 may be in electrically conductive communication with the internal electrical conductors 137 and 151, and the internal electrical conductors 137 and 151 may be in electrically conductive communication with the external electrical conductor 136. The potentiostat 152 may thereby apply an electrical effect (such as an electric potential or electric current) to the electrical lead 111, and the electrical effect may be applied to the internal electrical conductors 137 and 151, and to the external electrical conductor 136. However, alternative embodiments may differ. For example, some embodiments may include a single continuous electrical conductor extending between the external electrical conductor 136 and the electrical lead 111 (or a single continuous electrical conductor extending between the external electrical conductor 136 and the potentiostat 152 itself), or one or more different electrical conductors or other structures (including various different structures such as electrical conductors of RDEs that may be known to a person skilled in the art) that allow the potentiostat 152 to cause an electrical effect (such as an electric potential or electric current) to be applied to the external electrical conductor 136.

In assembly of the electrode head 138, in some embodiments, the backing piece 133 is placed into an assembly stand, followed by the second gasket 134a on top of the backing piece 133, the sample 135 on top of the backing piece 133, the external electrical conductor 136 on top of the sample 135, and the first gasket 134b on top of the external electrical conductor 136. The internal-side portion 149 of the first internal electrical conductor 137 is inserted generally radially through the generally radial opening 147 of the electrode housing 140, and the external-side portion 159 is inserted generally radially through the generally radial opening 148. The internal-side portion 153 of the second internal electrical conductor 151 is inserted generally radially through the generally radial opening 145 of the electrode housing 140, and the external-side portion 155 is inserted generally radially through the generally radial opening 146.

The electrode housing 140 is positioned above the assembled components (133, 134a, 135, 136, and 134b) in the assembly stand with the second side 142 facing downwards, so that the second side 142 of the electrode housing 140 is facing towards the first gasket 134b of the assembled components and the first side 141 of the electrode housing 140 is facing away from the first gasket 134b of the assembled components. The electrode housing 140 is lowered onto the previously assembled components (133, 134a, 135, 136, and 134b) such that the flange 144 contacts the first gasket 134b. In some embodiments, the internal-side portions 149 and 153 may be bent to allow the assembled components (133, 134a, 135, 136, and 134b) to pass from the second side 142 of the internal-side portions 149 and 153 to the first side 141 of the internal-side portions 149 and 153.

In other embodiments, the internal-side portion 149 and the external-side portion 159 are inserted into the first pair of generally radial openings 147 and 148 after the assembled components (133, 134a, 135, 136, and 134b) have been positioned into the electrode housing 140, and the internal-side portion 153 and the external-side portion 155 are inserted into the second pair of generally radial openings 145 and 146 after the assembled components (133, 134a, 135, 136, and 134b) have been positioned into the electrode housing 140.

Once the electrode housing 140 is lowered onto the previously assembled components (133, 134a, 135, 136, and 134b) such that the flange 144 contacts the first gasket 134b, the assembly (133, 134a, 135, 136, 134b, and 140) and the assembly stand are all simultaneously inverted, causing the previously assembled components (133, 134a, 135, 136, and 134b) to be positioned into the electrode housing 140 (as shown in FIG. 3b).

The external threads 171 of the separator body 132 are then engaged with the complementary internal threads 173 of the electrode housing 140 to exert a force on the backing piece 133 and on the sample 135 towards the first side 141 until the sample 135 is positioned in close contact with, and urged against, the external electrical conductor 136. The threaded fastener 131 is coupled to the threaded opening 174 of the separator body 132 to position the internal-side portions 149 and 153 of the first and second internal electrical conductors 137 and 151 in close physical contact with the threaded fastener 131 between the threaded fastener 131 and the separator body 132. In some embodiments, the plunger body 130 is positioned on in the electrode housing 140.

In operation of the electrochemical analysis system 100, the motor controller 154 is operable to control the motor 156 to cause rotation of the shaft 114 and the electrode head 138 about the axis of rotation 157. The electrolyte reservoir 104 may hold the electrode 112 in a position in which the sample 135 is exposed on the external side 167 to the electrolyte solution 106 in the electrolyte reservoir 104. The potentiostat 152 may apply an electrical effect (such as an electric potential or an electric current) to the electrical lead 111, and through electrically conductive communication with the fastener 131 on the internal side 165 of the space 161 and on the internal side 169 of the sample 135, thereby causing the electrical effect to be applied to the internal-side portion 149 and the external-side portion 159 of the first internal electrical conductor 137, and to the internal-side portion 153 and the external-side portion 155 of the second internal electrical conductor 151. The external-side portions 159 and 155 are in electrically conductive communication with the external electrical conductor 136 on the open side 163 of the space 161, and on the external side 167 of the sample 135 exposed to the electrolyte solution 106, causing the electrical effect to be applied to the external side 167 of the sample 135.

Electroactive processes of the sample 135 (such as oxidation/reduction reactions, electrocatalysis, kinetic studies, reaction mechanism determination, electroplating, electrodeposition, photoelectrochemical reactions, accelerated degradation/lifetime testing, biosensing, and performance studies, for example) may be observed using the sensor 158, and may be recorded or analyzed using the computing device 150. However, such electroactive processes are merely illustrative and optional, and alternative embodiments may omit such electroactive processes or involve other processes.

The electrode head 138 and the electrode 112 are examples only, and alternative embodiments may differ. It will be apparent to one of skill in the art that the above example is not limiting, and that various permutations are possible and at times desirable for certain uses. For example, some of the described components could be integrated into a "combination" component for ease of use of manufacture, whereby the combination component provides the same functionality and purpose as the described components of which it is a combination. Such a combination component could have the one or more of the separate sub-components permanently attached or integrated, or semi-permanently attached or integrated.

As a non-limiting example, the gasket 135a could be physically integrated into the backing piece 133. As another example, the separator body 132 and the backing piece 133 could be prepared to be a single combined component with the backing piece 133 permanently or semi-permanently attached or integrated with the separator body 132. By extension the separator body 132, the backing piece 133 and the gasket 134a could also be integrated into a single component.

Furthermore, in some embodiments, the external electrical conductor 136 and the internal electrical conductors 137 and 151 could be formed as a single continuous electrically conducting material. As another example, alternative embodiments may include more or fewer internal electrical conductors, and one or more internal electrical conductors of alternative embodiments may differ from the internal electrical conductors 137 and 151. For example, in alternative embodiments, one or more internal electrical conductors may be separate from, detachably attachable to, permanently coupled to, or integrally or unitarily formed with an external electrical conductor (such as the external electrical conductor 136). In some embodiments, one or more internal electrical conductors may extend through walls, cavities, or spaces in an electrode housing (such as the electrode housing 140). Therefore, alternative embodiments may omit some or all of the generally radial openings 145, 146, 147, and 148, or may include one or more alternatives to the generally radial openings 145, 146, 147, and 148.

In some embodiments, a rotatable shaft (similar to the shaft 114, for example) and an electrode head (similar to the electrode head 138, for example) may be detachably attachable to each other by a threaded connection or by an alternative to a threaded connection, and detachably attaching such an electrode head to such a rotatable shaft may facilitate electrically conductive communication between an electrical conductor (such as the external electrical conductor 136, for example) of the electrode head and an electrical lead (such as the electrical lead 111, for example) by electrically conductive communication with an electrical lead on the electrode head that may differ from the threaded fastener 131. For example, such an alternative electrical lead on an electrode head may not necessarily be a threaded fastener, and may include one or more other electrical leads on the electrode head.

In some embodiments, a portion of a rotatable shaft (similar to the shaft 114, for example) may contact a sample (such as the sample 135) and urge the sample against an external electrical conductor (such as the external electrical conductor 136) when the rotatable shaft is detachably attached to an electrode head holding the sample (for example, by threaded engagement between the rotatable shaft and the electrode head, or by an alternative to a threaded connection). In other words, such a portion of a rotatable shaft, which may be detachably attachable to, permanently coupled to, or integrally or unitarily formed with the rotatable shaft, may function similarly to one or both of the separator 132 and the backing piece 133 to urge a sample (such as the sample 135) against an external electrical conductor (such as the external electrical conductor 136) when the rotatable shaft is detachably attached to the electrode head holding the sample.

In some embodiments, a sample (such as the sample 135, for example) may be held in an electrode head differently from how the electrode head 138 holds the sample 135. For example, in some embodiments, a sample may be insertable in and removable from a space in an electrode head from an external side (such as the first side 141, the open side 163, or the external side 167 as described above, for example) of an electrode housing (such as the electrode housing 140) of the electrode head. For example, in some embodiments, an external electrical conductor (such as the external electrical conductor 136, for example) may be urged resiliently (by a spring or by another resilient body, for example) into a position that retains a sample in a space of an electrode head, but such external electrical conductor may be resiliently movable away from the space to allow for insertion of a sample in the space or to allow for removal of the sample from the space.

As another example, an electrical conductor (such as the external electrical conductor 136, for example) may be removably attachable to an external side (such as the first side 141, the open side 163, or the external side 167 as described above, for example) of an electrode housing (such as the electrode housing 140), for example by threads of a threaded cap or by a fastener or other structure that permits such removable attachment.

In some embodiments, such as embodiments in which a sample may be insertable in and removable from an electrode head from an external side (such as the first side 141, the open side 163, or the external side 167 as described above, for example) of the electrode head, the electrode head may be permanently coupled to, or integrally or unitarily formed with, a rotatable shaft (similar to the shaft 114, for example).

Referring to FIG. 25a, an electrode head 238 according to another embodiment includes an external electrical conductor 236 that may be similar to the external electrical conductor 136, and the external electrical conductor 236 is surrounded by a ring-shaped electrode 204 (which may be a standard ring-shaped electrode). The electrode head 238 may hold a sample 235 that may be similar to the sample 135. The electrode head 238 may otherwise be similar to the electrode head 138, except that the electrode head 238 includes the ring-shaped electrode 204, and an electrical effect (such as an electric potential or an electric current) of the ring-shaped electrode 204 may be controlled by a potentiostat, such as the potentiostat 152.

Referring to FIG. 25b, an electrode head 338 according to another embodiment includes a disk-shaped electrode 304 (which may be a standard disk-shaped electrode) surrounded by a ring-shaped external electrical conductor 336 that may be similar to the external electrical conductor 136 but ring-shaped. An electrical effect (such as an electric potential or an electric current) of the disk-shaped electrode 304 may be controlled by a potentiostat, such as the potentiostat 152. The electrode head 338 may hold a ring-shaped sample 335 (that may be similar to the sample 135 but ring-shaped) in a ring-shaped space (that may be similar to the space 161 but ring-shaped). The ring-shaped sample 335 and the ring-shaped space may have centers on an axis of rotation (such as the axis of rotation 157) so that a motor (such as the motor 156) and a shaft (such as the shaft 114) may rotate the ring-shaped sample 335 and the ring-shaped space about their centers. The electrode head 338 may otherwise be similar to the electrode head 138.

In the specific experiments discussed herein, for the ease of reference and understanding, the resulting data are reported as an example of the disclosure according to an embodiment. It is to be understood that various embodiments are also possible and the electrode is not limited to this singular example, and that various permutations of materials, sizes and operations may also be possible.

In the following examples and summary, an electrode (such as the electrode 138) may be referred to as a modified rotating-disk electrode (MRDE).

Example 1

Modified RDE Head Engineering

For the detailed experiments discussed here, an MRDE head was built in accordance with an embodiment. This example MRDE was capable of holding a 0.785 cm$^2$ catalyst-coated sample. Various types of samples, for example CCMs, Pt foil, etc. (with a diameter of ~10 mm) were studied. A mesh-based Ti metal current collector (expanded Ti, 0.0508 mm nominal original thickness) and gaskets made from high heat-resistant silicone were used. The Ti current collector allows the user to perform high potential voltammetry experiments if desired (for example, the oxygen reduction reaction, ORR). From the dimensions of the Ti current collector mesh, the percentage of total area covered geometrically is estimated to be about 16% in this particular example. The actual percentage of total area covered geometrically can vary in various embodiments, and is not limited to specifically a particular relative percentage. Two Ti wires (0.25 mm diameter, 99.7% metals basis), which slightly protrude over the exposed face of the MRDE head, provide the required electrical pathway from the Ti current collector to a gold-coated screw head-to-shaft electrical connector segment located on the inside bottom of the MRDE head. The Ti current collector maintains an excellent contact across the catalyst-coated sample and allows for a uniform lateral current collection. The MRDE tip is secured to a standard rotating-disk electrode (RDE) shaft (e.g., AFE3M shaft, Pine Research Instrumentation Inc.). The electrical resistance from the mesh to the base of the shaft, where electrical contact with rotator's graphite brush contacts is made, is about 4Ω in this case. The Ti wires are weaved into openings on opposite sides of the RDE head and are sealed in this case with a high heat-resistant silicone.

The MRDE components (excluding the catalyst-coated samples) used in this example are grouped into two main material-based classes: i) silicone-based components and ii) silicone-free components. The silicone-based components (i.e., housing and gaskets) are cleaned three times in sonication bath using 18 MΩ Millipore deionized water (DI, 18.2 MΩ cm, <5 ppb TOC water). The silicone-free components (i.e., current collector, head-to-shaft electrical connector segment, and backing piece) were cleaned in the same sonication bath using 18 MΩ DI water, followed by 50/50 vol % ethanol/18 MΩ DI water, and then 18 MΩ DI water, respectively.

Example 2

Sample Preparation and Loading

Three types of samples were examined for the experiments discussed herein: i) Pt foil (0.02 mm thickness, 99.9+%), ii) unsupported hand-painted half-CCMs (0.1 and 0.4 $mg_{Pt}$ $cm^{-2}$), and iii) carbon-supported Pt (Pt/C). The entire as-received Pt foil sheet (92 mm×32 mm×0.02 mm thick) was cleaned by boiling in: DI water followed by a 50/50 vol % mixture of DI water/ethanol (≥99.5% ACS Plus) and DI water again. The CCM samples were used as-received with no pretreatments. A piece of Kapton (0.0015 inch adhesive thickness) pre-cleaned with ethanol and rinsed with DI was placed over the non-active side of the CCM or Pt foil. If better contact was required, an extra 10 mm OD Kapton piece with adhesive backing was used as a shim behind the CCM. All samples were punched out as 10 mm diameter disks and flattened with an applied pressure of ≈4 MPa using a hydraulic press.

Example 3

Electrochemical Measurements

The example electrochemical tests discussed here were performed using an MRDE tip according to one embodiment. The example MRDE possessed interchangeable sample capabilities. The MRDE was used as the working electrode, a Pt-flag counter electrode, a $Cl^-$ free $Hg/Hg_2SO_4$ reference electrode, and 0.1 M $HClO_4$ (70%). The rotator setup consisted of a rotator/controller (AFMSRCE, Pine Instrument Company) and an RDE shaft (AFE3M, Pine Instrument Company). A potentiostat and its software were used to perform all the electrochemical measurements. The electrolyte in the glass cell (125 mL, 5 neck) was first saturated with an appropriate gas, for this example Ar (99.999%, UHP) or $O_2$ (99.993%, UHP), by flowing each gas for about 15 minutes through a porous dispersion tube. Then, a gas blanket (either Ar or $O_2$) was maintained during the electrochemical measurements. All measurements were performed at room temperature (21±0.5° C.) and ambient pressure (1 atm). All the potentials are reported versus the reversible hydrogen electrode (RHE). Reported current densities are normalized by either the geometric or electrochemical surface area (ECSA) of the electrodes.

The cell resistance was determined by performing an impedance scan (10 mV AC amplitude and a frequency range of 100 mHz to 1000 kHz) and using the ohmic component of the impedance. The cell resistance, as measured by electrochemical impedance spectroscopy (EIS), was on average about 15Ω. In-situ IR correction (85% correction level) was performed with the potentiostat software and the remaining 15% of IR loss was corrected manually after the data collection.

Electrochemical cleaning was performed by sweeping the sample potential between 0 and 1.30 V vs. reversible hydrogen electrode (RHE) at a scan rate of 500 mV $s^{-1}$ until steady state CVs were obtained (typically about 100 cycles). Depending on the sample type and loading, CVs were collected at a number of different sweep rates (50, 20, 10, 5 and 2 mV $s^{-1}$), both before and after the ORR measurements. The ORR scan ranges were between 0 mV vs. RHE and the open circuit potential in the oxygen saturated electrolyte which corresponds to the onset of oxygen reduction reaction (≈1100 mV vs. RHE). Oxygen reduction measurements were performed with the same potential window at 50, 5 and 2 mV $s^{-1}$ for Pt foil (SG), 0.1 $mg_{Pt}$ $cm^{-2}$ and 0.4 $mg_{Pt}$ $cm^{-2}$ CCM samples, respectively. ORR measurements were performed at angular speeds (ω) of 225, 400, 625, 900 and 1225 RPM.

The electrochemically active surface area (ECSA) was estimated by integrating charge from the $H^+_{ads}$ region of the CVs collected with Ar-saturated electrolyte and using the 210 μC $cm^{-2}_{Pt}$ conversion factor. The reported ECSA values ($A_{ECSA,avg}$) were determined from the $3^{rd}$ cycle of the CV scan before and after the ORR measurements and averaged for determining the real (ECSA-based) current densities. The surface enhancement factor (SEF) was obtained by normalizing the ECSA to the geometric surface area $A_{geo}$ ($\pi r^2$=0.785 $cm^2$ for a sample with r=5 mm). The kinetic current density was obtained using the Koutecky-Levich relation (equation 1).

$$\frac{1}{j_{geo}} = \frac{1}{j_{kinetic,geo}} + \frac{1}{j_{diffusion-limited,geo}} \quad (1)$$

The value of $j_{diffusion-limited, geo}$ was determined from the middle of the diffusion-limited current plateau regions. In general, the value of $j_{diffusion-limited, geo}$ determined this way are very close to the theoretical values which can be calculated by the Levich relation (equation 2) using D=1.93×$10^{-5}$ $cm^2$ $s^{-1}$, v=1.01×$10^{-2}$ $cm^2$ $s^{-1}$ and C=1.26×$10^{-3}$ mol $L^{-1}$, for the diffusivity of oxygen, kinematic viscosity, and oxygen concentration in water at room temperature respectively (A. Bonakdarpour, R. T. Tucker, M. D. Fleischauer, N. A. Beckers, M. J. Brett, D. P. Wilkinson, Nanopillar niobium oxides as support structures for oxygen reduction electrocatalysts, Electrochim. Acta 85 (2012) 492-500, doi:http://dx.doi.org/10.1016/j.electacta.2012.08.005).

$$j_{diffusion-limited,geo} = 0.62 n C F A_{geo} D^{2/3} \omega^{1/2} v^{-1/6} \quad (2)$$

ECSA-normalized current densities ($j_{kinetic, EC}$) were obtained by dividing $j_{kinetic, geo}$ by the surface enhancement factor (SEF) according to equations 3 and 4:

$$SEF = \frac{Area_{ECSA,avg}}{Area_{geo}} \quad (3)$$

$$j_{kinetic,EC} = \frac{j_{kinetic,ego}}{SEF} \quad (4)$$

For Tafel analysis, a current density normalized by the ECSA and corrected for mass transport effects was used. A Nernstian correction for operating conditions was performed on the RDE data using equation 5 in order to have meaningful specific and mass activity comparisons with PEMFC data.

$$E = E° - \frac{RT}{nF} \ln\left(\frac{a_{H2O}}{a_{H2} \times a_{O2}^{0.5}}\right) \quad (5)$$

The physical constants are defined as follows: R=8.314 J $mol^{-1}$ $K^{-1}$, T=80° C., n=2, F=96485 C $mol^{-1}$, $a_{H2O}$=1, $a_{H2}$=2 bar and $a_{O2}$=2 bar. To correct for the Nernstian effects, equation (6) was used where ΔE=−0.0078 V, thus the RDE specific and mass activity measurements were taken at 0.892 V vs. RHE to compare with the 0.9 V data from the PEMFC.

$$E_{RDE}(80° C., 2 \text{ bar } H_2, 2 \text{ bar } O_2) = E_{RDE}(20° C., a_{H2}=1, a_{O2}=1.26\times10^{-3}) + \Delta E \quad (6)$$

The thin-film RDE measurements (TF-RDE) were performed by depositing a commercial Pt/C catalyst ink onto the tip of a 5.0 mm OD mirror polished glassy carbon RDE (AFE5T050GCPK, Pine Research Instrumentation Inc.)

cleaned with DI water and ethanol. The ink mixture was composed of 5 mg catalyst (Pt/carbon black, 20 wt % Pt), 1.99 mL DI water, 0.5 mL isopropanol, and 10 μL Nafion™ D-521 dispersion (5% w/w in water and 1-propanol). The mixture was sonicated for 30 minutes and a droplet was casted on the glassy carbon electrode and was then air dried to give a catalyst loading on the RDE tip of 0.0204 $mg_{Pt}$ $cm^{-2}$. The electrochemical cell setup was similar to the one used with the example MRDE.

Figure 7:
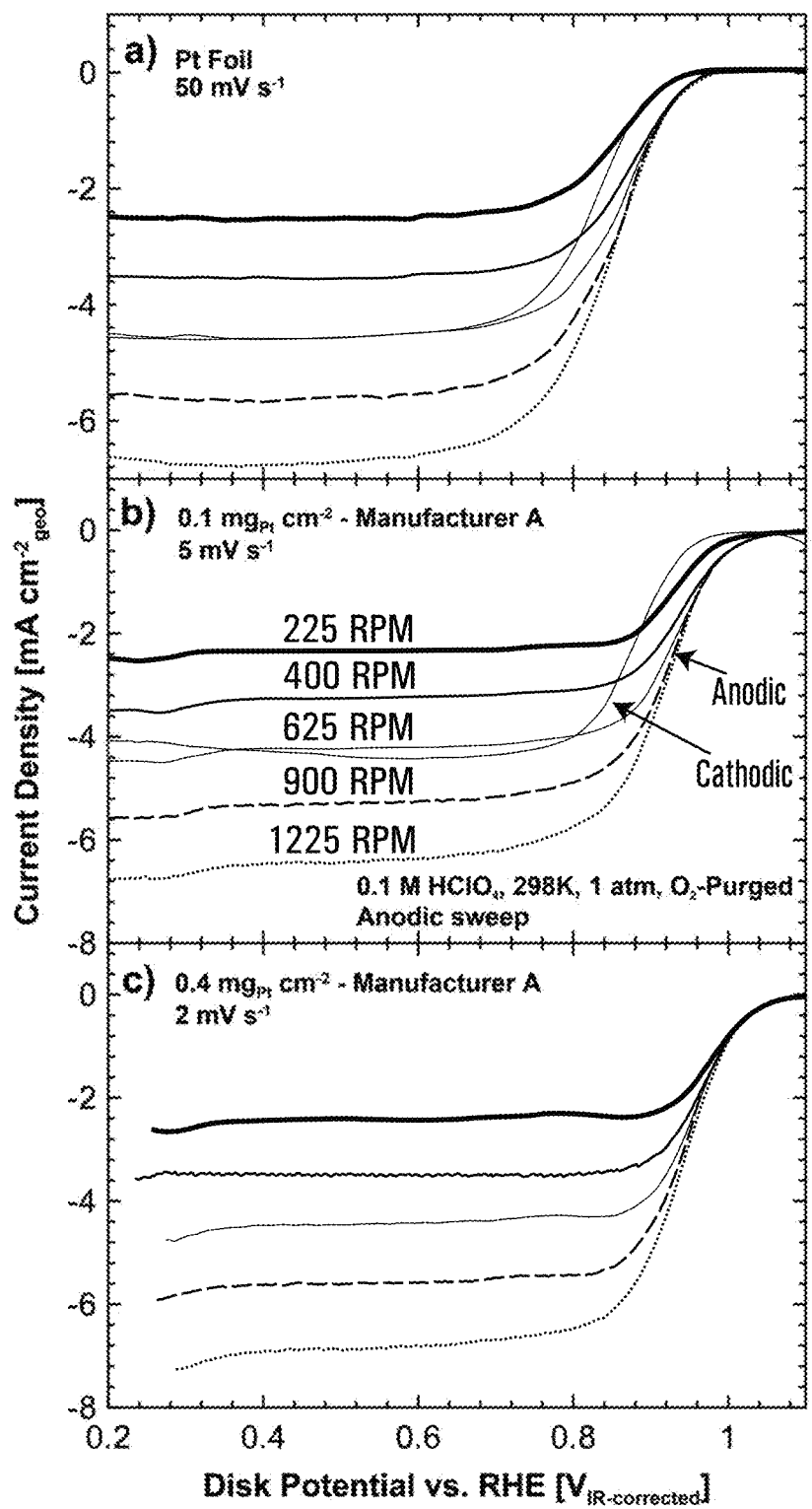
FIG. 7 is graphs representing the Oxygen reduction reaction curves obtained in accordance with an embodiment of (a) Pt foil, (b) Manufacturer A 0.1 mg cm$^{-2}$, and (c) Manufacturer A 0.4 mg cm$^{-2}$.

A common measurement used in fuel cell studies involves the oxidation reduction reaction (ORR). This disclosure enables useful ORR activity measurements on CCMs that are not readily attainable using conventional RDEs. FIGS. 7a-c show the ORR measurements of the Pt foil, and commercial CCM samples (0.1 and 0.4 $mg_{Pt}$ $cm^{-2}$) for a number of rotation speeds (ω=225 to 1225 rpm) using an MRDE according to an embodiment.

Example 4

Electrochemical Results of Pt Foil Sample

Figure 5:
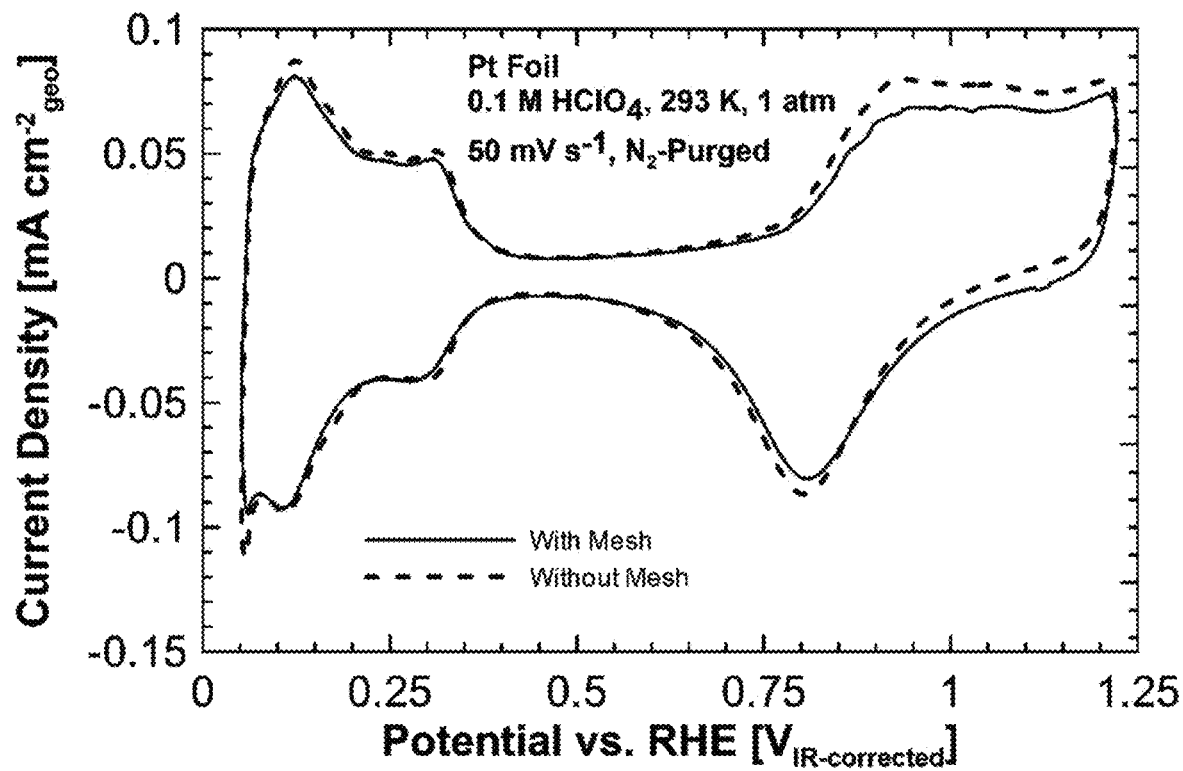
FIG. 5 is a graph representing the Cyclic Voltammagrams obtained on a Pt foil sample using an embodiment, and as obtained without the current collector present.

It is noted that covering a portion of the front surface of the sample with the current collector may lead to a degree of masking or occlusion of contact of said covered portion of the front surface wherein the covered portion may possibly have limited or no direct exposure to the electrolyte solution and reactants therein during electrochemical reaction processes when the MRDE is in use. With proper design and selection of the current collector, this masking effect may be kept negligible. It may be useful to illustrate this effect quantitatively for an example. FIG. 5 shows CVs of one example of an MRDE head with and without a Ti expanded metal mesh current collector on Pt foil. Table 1 shows integration results of the Pt—H⁺ adsorption/desorption regions, and the corresponding electrochemical surface area (ECSA) values. For both of the adsorption and desorption regions, the ECSA values obtained (Masked ECSA) were lower by about 5.7% when the RDE tip was covered with the Ti mesh as calculated by equation 7.

$$\% \text{ Masked } ECSA = \left( \frac{ECSA_{NoMesh} - ECSA_{WithMesh}}{ECSA_{NoMesh}} \right) \times 100\% \quad (7)$$

The reduced ECSA is lower (≈6%) than what the geometrical calculations (≈16%) indicate. However, the Ti wire mesh in this example has a very thin strand width (≈100 μm) and it appears that a significant portion of the region under the wire is active.

TABLE 1

Comparison of ECSA with and without the current collector mesh in the MRDE

| Peak Region | Experiment | Sweep Rate (mV s⁻¹) | $Q_i$ (μC) | ECSA (cm²) | [a]ECSA loss (%) |
|---|---|---|---|---|---|
| $H_{ads}$ | Mesh | 50 | 203 | 0.967 | 5.69 |
|  | No Mesh | 50 | 215 | 1.026 |  |
| $H_{des}$ | Mesh | 50 | 213 | 1.012 | 5.71 |
|  | No Mesh | 50 | 225 | 10.74 |  |

[a]ECSA loss was quantified as the difference in ECSA between the mesh and no mesh case normalized by the no mesh case The specific activity of the Pt foil, measured with the MRDE at 0.9 V vs. RHE was about 1.55 $mA_{kinetic}$ $cm_{Pt}^{-2}$ at 900 RPM. This value is consistent with the well-reported range of about 1.2-2 $mA_{kinetic}$ $cm_{Pt}^{-2}$ for polycrystalline platinum. This demonstrates the validity of the MRDE wherein the masking effect(s) of the current collector may be controlled to be negligible.

Example 5

Cyclic Voltammetry of the Catalyst Coated Membrane

Figure 6:
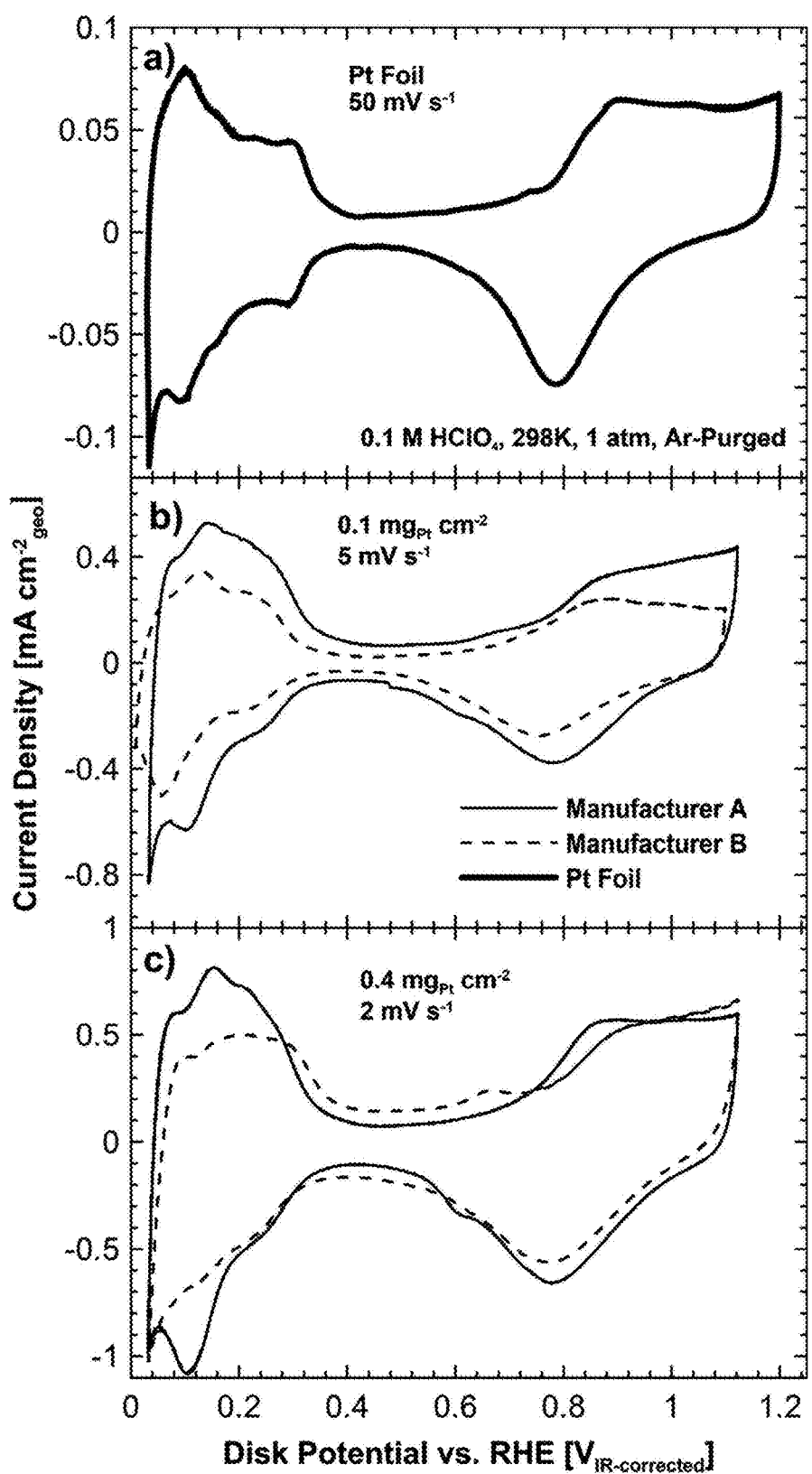
FIG. 6 is graphs representing the Cyclic voltammograms of (a) Pt foil, (b) 0.1 mg cm$^{-2}$ loading catalyst-coated membranes (CCMs), (c) 0.4 mg cm$^{-2}$ loading CCMs obtained in accordance with an embodiment.

FIGS. 6a-c show cyclic voltammograms of Pt foil and commercially available CCMs (Manufacturer A—Johnson-Matthey; JM); (Manufacturer B—Solvicore; SC), with loadings of 0.1 and 0.4 $mg_{Pt}$ $cm^{-2}$. The CVs were collected after electrochemical cleaning and represent stabilized measurements. The CVs show the typical polycrystalline-like CV signature of Pt with the characteristic Pt—H and Pt—OH adsorption/desorption peaks, and the absence of any contamination peaks. These measurements demonstrate the MRDE-tip is free of issues such as inadequate electrical contact, leakage, and potential contamination, and therefore provides similar quality electrochemical signal response as a standard RDE. The ECSAs were calculated from the third cycle of each sample before and after the ORR (discussed in FIG. 9d) measurements. The reported ECSA is taken from the average between the Pt-adsorption and Pt-desorption peaks, and is used for converting the geometric current density to the real current density.

Example 6

Measurements of Oxygen Reduction Reaction Activity

FIGS. 7a-c show the ORR measurements of the Pt foil, and Manufacturer A CCM samples (0.1 and 0.4 $mg_{Pt}^{cm-2}$) for a number of rotation speeds using the MRDE (ω=225 to 1225 rpm). Only the anodic sweeps for each rotation rate are shown except for the 625 rpm case for which a complete anodic and cathodic cycle is presented. The transported-limited current plateaus for all rotation speeds reach the theoretical diffusion-limited Levich current densities. The reduction currents decrease in the very low potential region 0.2 V vs. RHE) where H⁺ adsorption occurs indicating that a fraction of the reduced oxygen molecules are released as hydrogen peroxide into the electrolyte. The two-electron reduction of oxygen molecules becomes operative when Pt surface coverage with adsorbed species ($H_{ads}$ in this case) increases. The Pt-foil data show the smallest amount of capacitive current among all the samples tested; for this reason a commonly used sweep rate of 50 mV s⁻¹ was used. The CCM samples, however, have higher capacitive currents (due to the presence of the carbon support) which increase in proportion to the catalyst loading. To decrease the influence of the capacitive current, lower sweep rates of 5 and 2 mV s⁻¹ were used for the catalyst loadings of 0.1 and 0.4 $mg_{Pt}$ $cm^{-2}$, respectively. Diffusion-limited current densities of the CCM samples, obtained from an average of the anodic and cathodic sweeps (i.e., the midpoint of the sweeps), are in good agreement with those of the Pt foil sample for all of the rotation speeds examined here. These ORR measurements demonstrate the efficacy of the MRDE-tip for ORR characterization of the CCM samples.

In one use case example, the disclosure allows for an easy way to compare the ORR performance of different commercial and developmental CCMs. FIGS. 7a-b show ORR activity of Commercial A and CCM samples with catalyst loadings of 0.1 and 0.4 $mg_{Pt}$ $cm^{-2}$, respectively, at various rotation speeds employing an MRDE tip according to one embodiment. All the measurements achieve the theoretical diffusion-limited current densities. For the CCM samples with a catalyst loading of 0.4 $mg_{Pt}$ $cm^{-2}$, the diffusion-limited current densities between the JM and SC are similar and quite flat in the range of 0 to 0.4 V vs. RHE.

Example 7

Analysis of Oxygen Reduction Measurements

Figure 8A:
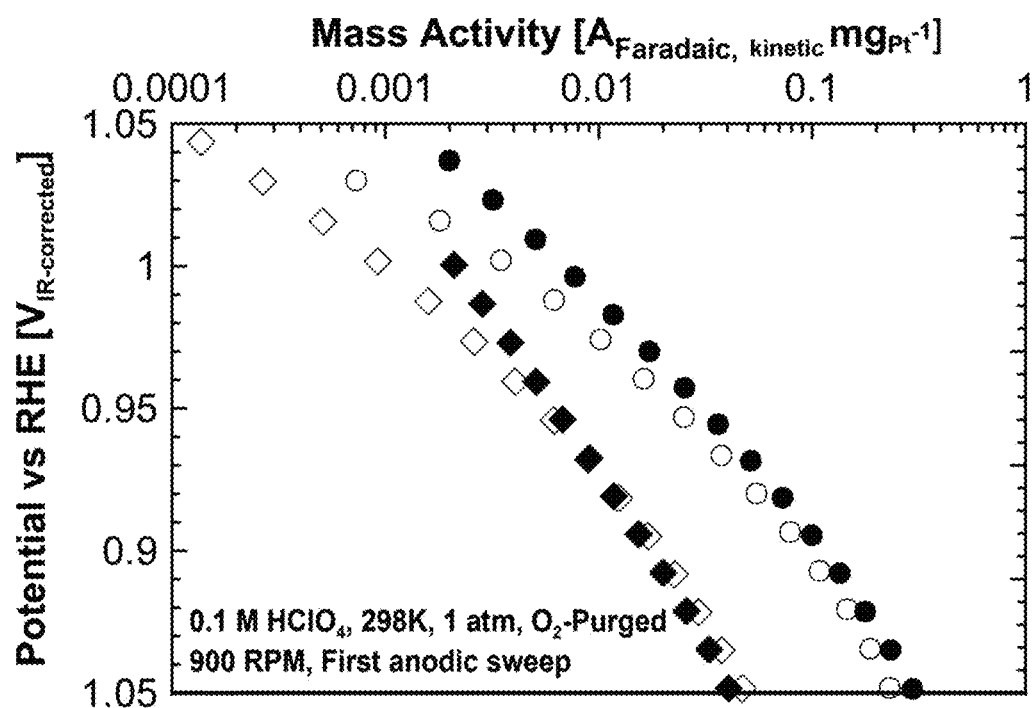
FIGS. 8a-c are graphs representing (a) Tafel plots of mass activity, and (b) Tafel plots of specific activity for certain catalyst samples, and (c) a summary of specific and mass activities at 0.9 V, all obtained in accordance with an embodiment.
Figure 8B:
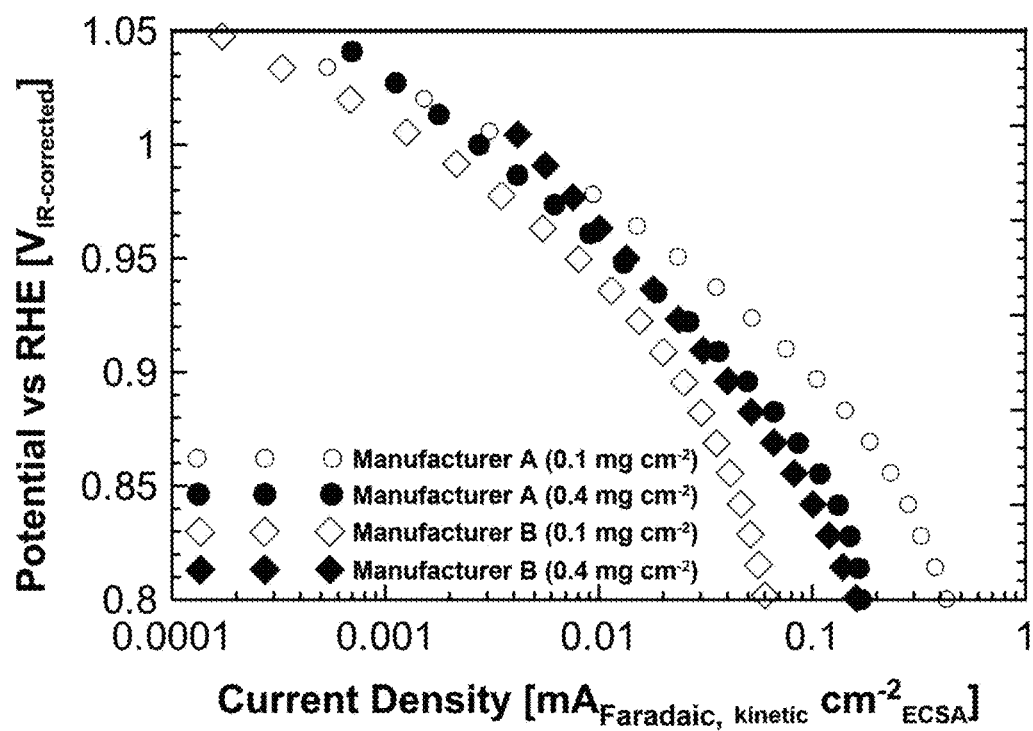
Figure 8C:
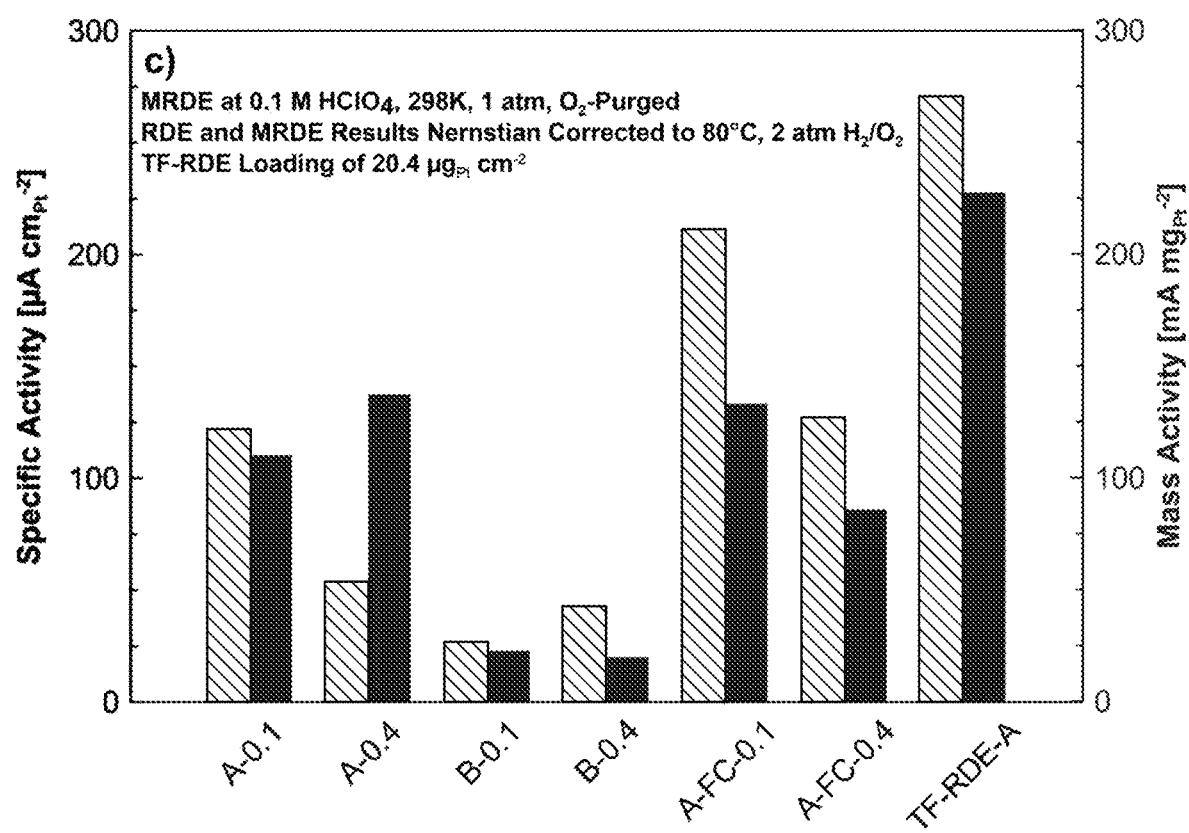

FIGS. 8a-b show the Tafel plots for, selected commercial CCM samples measured with an MRDE in accordance with an embodiment. FIG. 8c summarizes the specific and mass activities of these commercial CCMs. The current densities reported here are normalized to the electrochemical surface area and corrected for the transport as described in the experimental section. The samples examined exhibit similar specific activities with the exception of the 0.1 $mg_{Pt}$ $cm^{-2}$ FCE sample. The higher activities observed are most likely due to the high uncertainties in the actual catalyst loadings (i.e., <0.1 $mg_{Pt}$ $cm^{-2}$—the nominal value) which results from the inhomogeneous and poor adhesion nature of the hand-painted catalyst layer. FIGS. 8a and 8b show the mass activities and specific activities, respectively, of the samples. The specific and mass activities for the MRDE measurements were obtained at 0.892 V vs. RHE in order to account for the Nernstian correction and to compare with the PEMFC results obtained at higher temperature and oxygen activity.

Unsupported Pt CCMs are known to exhibit significantly higher specific activity, but lower mass activity, than the supported Pt/C CCMs. FIG. 8c compares a commercially available catalyst (20.4 $\mu g_{Pt}$ $cm^{-2}$) measured by TF-RDE and Manufacturer A (0.4 $mg_{Pt}$ $cm^{-2}$) samples measured by MRDE and $H_2/O_2$ single fuel cell hardware. The mass activities for the 0.1 $mg_{Pt}$ $cm^{-2}$ Manufacturer A samples measured by the MRDE and the PEMFC are 110 and 113 mA $mg_{Pt}^{-1}$, respectively. The mass activities for the 0.4 $mg_{Pt}$ $cm^{-2}$ Manufacturer A samples measured by MRDE and PEMFC are 137 and 86 mA $mg_{Pt}^{-1}$, respectively. These values are in closer agreement than those obtained by the TF-RDE technique which yielded 227 mA $mg_{Pt}^{-1}$. This result is a factor of 2 greater than the mass activity determined by the MRDE/PEMFC. The smaller activities measured by the MRDE could in part be explained by the differences in the thickness of the catalyst layer. If a catalyst loading exceeds 20 $\mu g_{Pt}$ $cm^{-2}$ such as in the case of the CCM, the ECSA will decrease with increased catalyst loading due to catalyst utilization. It is worth mentioning that the differences between two CCM types may partly be due to the details of CCM preparation that is similar loadings may not necessarily be the only thing required to yield similar performance.

Example 8

Repeatability of CV and Oxygen Reduction Reaction Measurements Using MRDE

Figure 9:
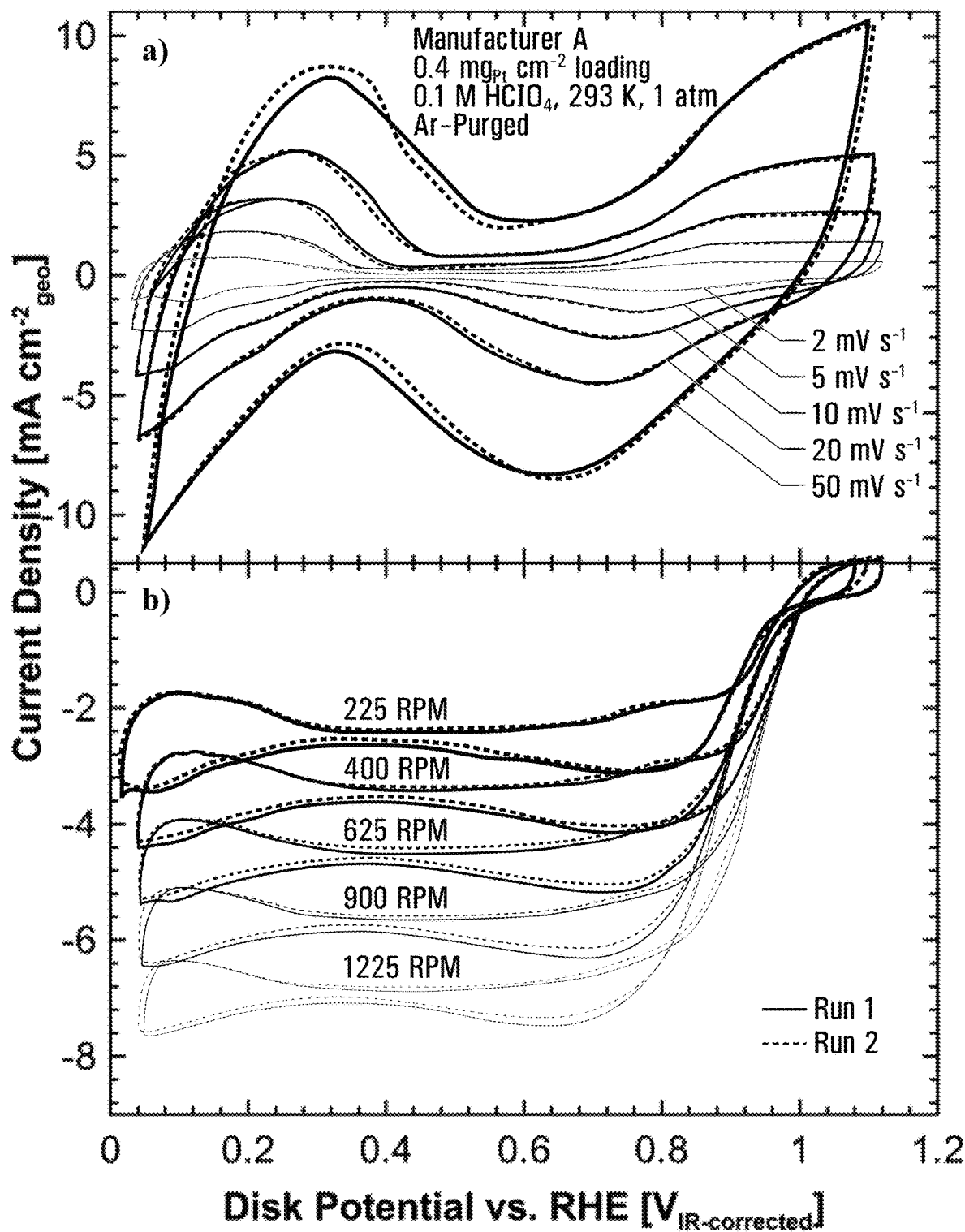
FIG. 9 is graphs representing Repeatability studies showing (a) Cyclic voltammograms, and (b) oxygen reduction reaction curves of two commercial CCM samples, obtained in accordance with an embodiment.

FIGS. 9a and 9b demonstrate the excellent repeatability of CV and ORR measurements for two samples cut from the same piece of a commercial CCM (0.4 $mg_{Pt}$ $cm^{-2}$) when using an example of the MRDE apparatus and method. FIG. 9a shows that all the CVs, collected at various sweep rates (from 2 to 50 mV $s^{-1}$), overlap for the two pieces of CCM investigated independently. FIG. 9b shows that the ORR curves collected with the two samples at different rotation rates ($\omega$=225 to 1225 rpm) essentially overlap, indicating that there are no detectable artifacts and repeatability issues due to the sample loading and tip assembly.

Example 9

Accelerated Degradation Tests

Accelerated degradation tests (ADT) are commonly used to evaluate the robustness of materials for certain applications. In the field of electrocatalytic materials, various protocols have been established for ADT. Current ADT testing of CCMs can generally only be performed by the use of test stations, which are expensive and complicated. ADT test protocols have been developed for catalyst powders deposited on the tip of regular TF-RDE set-ups. As mentioned above, electroanalytical tests conducted by TF-RDE have inherent limitations that create issues with translating such information about an electroactive material directly to performance in the intended operating environment. This disclosure allows for direct application of ADT on samples (for example CCMs and similarly structured samples) that more closely reproduces the intended operating environment. This provides a number of advantages, including:
   Use of low cost and widely available RDE systems
   Use of currently developed ADT protocols for catalysts (e.g. US DOE protocols of ADT)
   Durability testing with CCMs: allows one to screen, for instance, commercially available CCMs (not: preparation, ink formulation, ionomer content, etc. are typically proprietary and not known to the customer)
   Avoids ink preparations and variabilities in a given lab and also between different labs thus significantly improves repeatability (=measurements done in a given lab) and reproducibility (=measurements done between different labs)

Figure 11:
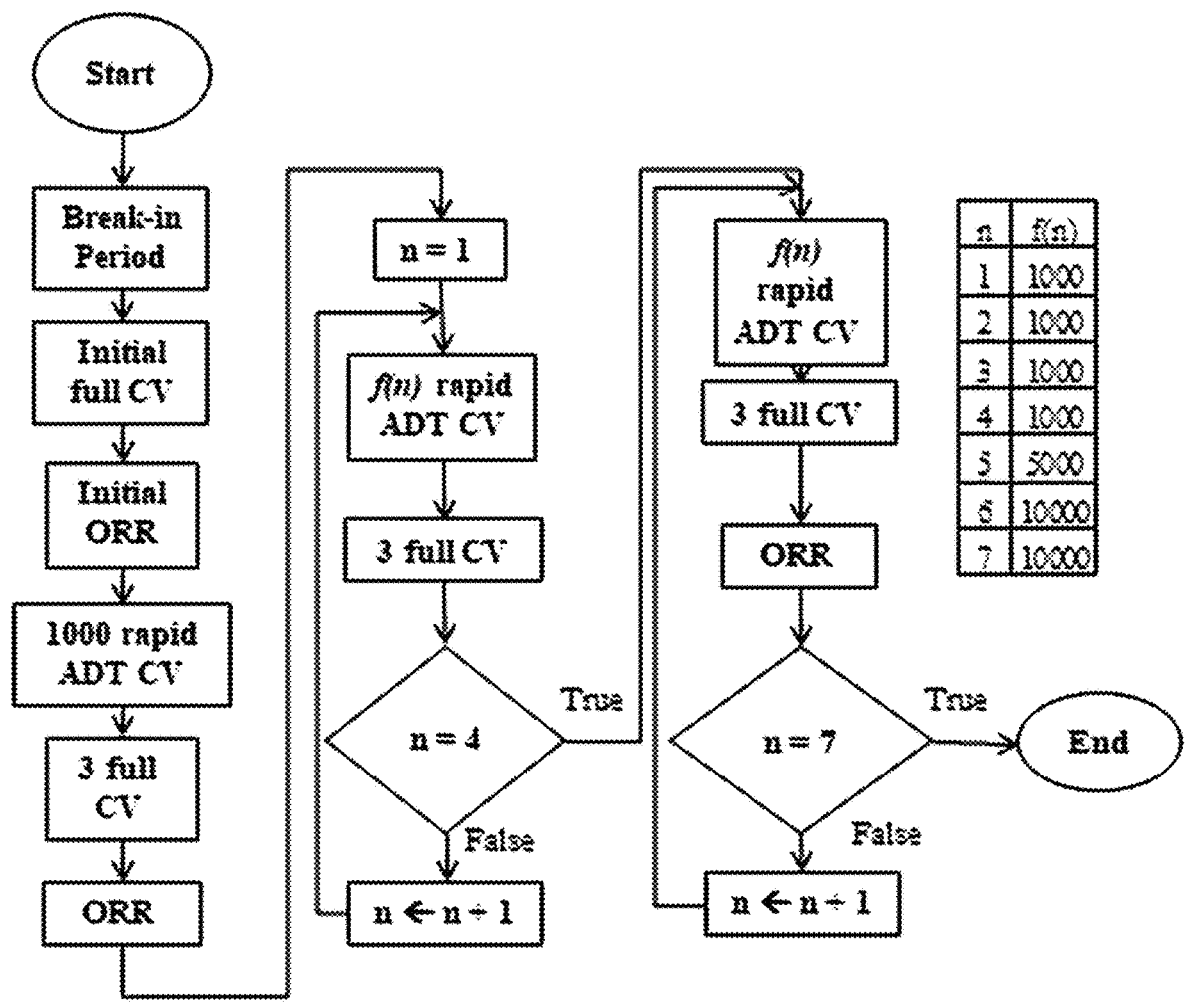
FIG. 11 is a flow-diagram of one example of an Accelerated Degradation Test protocol for use in accordance with an embodiment.

Accelerated degradation tests (ADT) were performed on a commercial 0.4 $mg_{Pt}$ $cm^{-2}$ CCM sample (which may be Commercial A) using an ADT protocol. Rapid cycle ADT CVs were collected at 50 mV $s^{-1}$ between 0.6-1 V vs RHE as per the protocol. Full CVs were collected between 0.05-1.2 V vs RHE using a sweep rate of 2 mV $s^{-1}$ (instead of the 50 mV $s^{-1}$ proposed by the DOE). This slower sweep was chosen in order to minimize the capacitive currents which are significant in the case of high surface area carbon-supported platinum catalysts and is more representative of steady-state fuel cell testing. FIG. 11 describes the complete modified protocol used for ADT tests in these examples.

Figure 10:
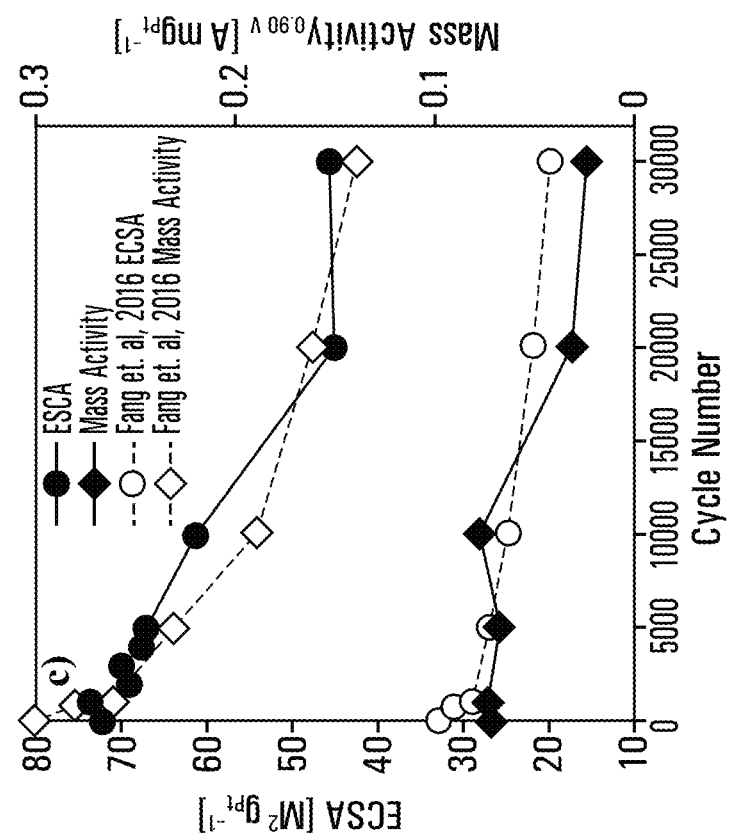
FIG. 10 is graphs representing for a commercial CCM sample: (a) Cyclic voltammogram progression during ADT cycling, (b) ADT Oxygen reduction reaction curve progression with inset showing the kinetic region, and (c) ADT Specific and mass activity progression as a function of cycle number, obtained in accordance with an embodiment.
Figure 10:
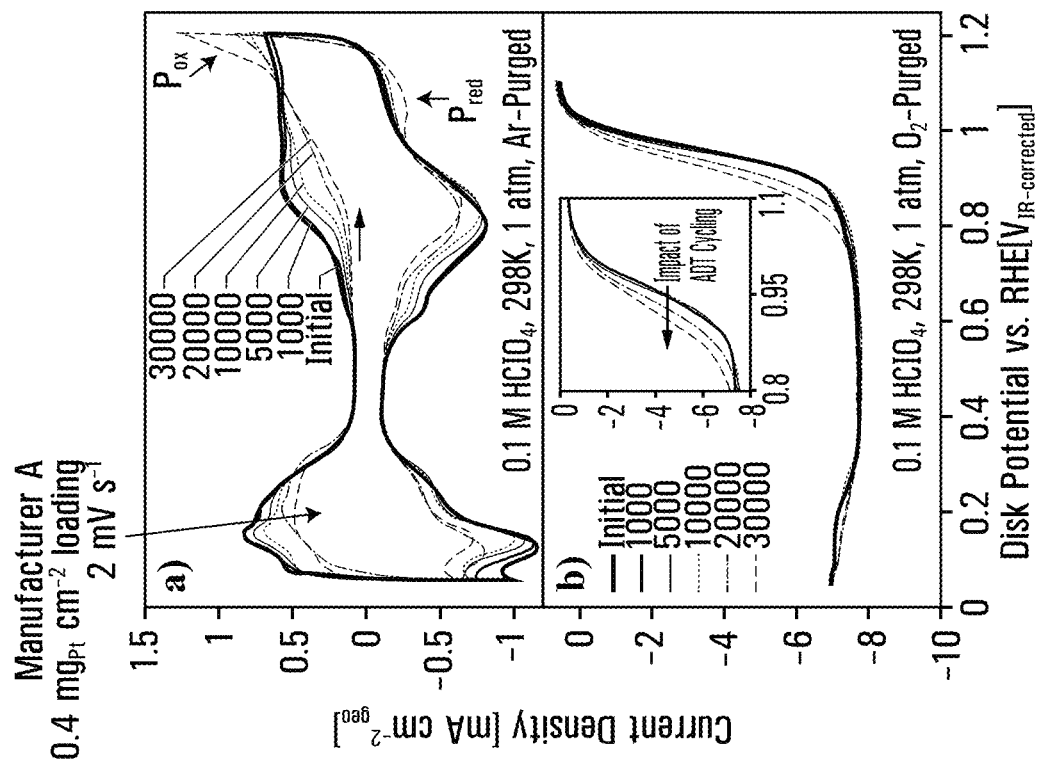

FIGS. 10a-c show results of selected accelerate degradation testing (ADT) experiments with a commercial CCM sample using the example MRDE. For clarity this disclosure refers to the rapid CVs performed between 0.6-1 V vs RHE as "ADT Cycles" and the CVs collected between 0-1.2 V vs. RHE as "Full CVs". FIG. 10a shows a number of Full CVs collected during the 30,000 cycle ADT protocol. The CV peaks (both in the Pt—H and Pt—OH regions) diminish as a function of cycling, indicating that the electrochemically-active Pt surfaces available for the ORR decrease during the potential cycling. It is worth noticing that considerable changes occur in the shape of the Full CVs. The hydrogen desorption peaks shift in their positions, the onset of oxides' formation shifts to higher potentials, and a new oxidation/reduction peak ($P_{ox}$, $P_{red}$) begins to appear at higher potentials. The most pronounced changes in the shape of the Full CVs happen between 10,000 and 20,000 cycles. Each Full CV was collected three times and no significant changes were observed during these three cycles. It is possible that by extensive Full CV cycling (i.e., 0.05 to 1.2 V vs. RHE), CV shapes closer to the initial Full CV (but smaller peaks) may appear again; however, the ADT protocol was not to altered to perform extensive Full CV cycling. The CV results show that the state and the nature of the oxidation peaks of the Pt catalyst surface in the CCM is quite different from those of pristine nano-sized Pt catalysts, after long term exposure to high anodic potentials.

FIG. 10b shows the anodic ORR curves obtained at the designated cycles. The largest changes in ORR activity also occur in the 10,000 to 20,000 cycle range when the ORR waves first appear to show any major shifts to lower potentials. This cycling interval corresponds to the same regime where a sharp decrease in the ECSA is observed in the CV measurements (FIG. 9a). FIG. 9c shows the ECSA and the mass activity of the CCM sample as a function of the cycle number. The ECSA and mass activity losses appear to be linear during the 30,000 ADT cycles performed, hence they can be quantified per cycle number by linear regression (FIG. 10c). The losses of ECSA and mass activity per cycle number are $1.0 \times 10^{-3}$ $m^2$ $g_{Pt}^{-1}$ $cycle^{-1}$ and $1.8 \times 10^{-6}$ A $mg_{Pt}^{-1}$ $cycle^{-1}$, respectively. FIG. 11 shows the ADT protocol used.

Figure 12:
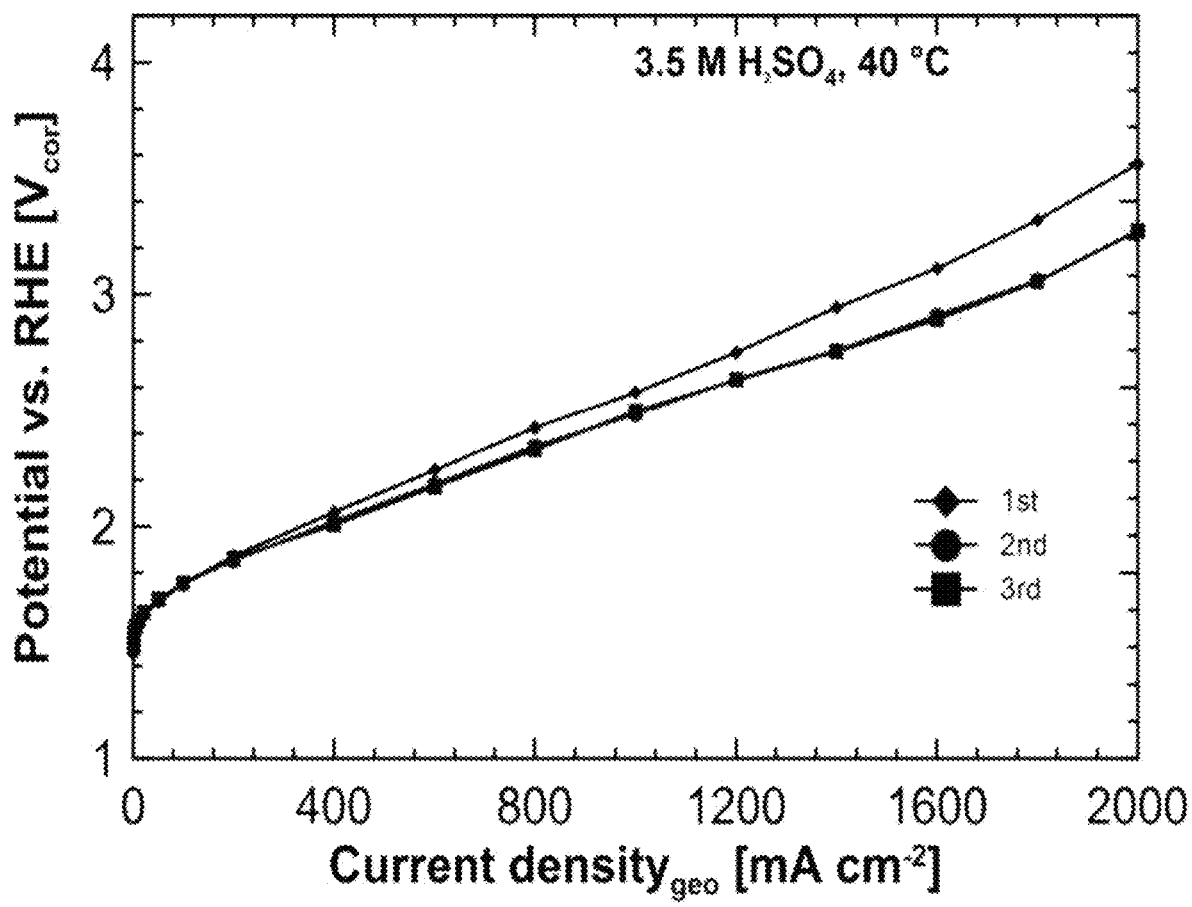
FIG. 12 is a graph representing Oxygen Evolution Reaction data for an electrolysis electrocatalyst, obtained in accordance with an embodiment.

FIG. 12 shows the polarization curves of a commercially-available CCM with $IrO_2$ catalyst for oxygen reduction reaction (ORR). The CCM used here is a typical component of larger scale PEM-based electrolysis cells. The CCM (~1 cm in dia.) was mounted on the tip of an MRDE together with a Ti mesh. The assembly is very similar to that of the ORR CCM layers presented in earlier figures. Electrolyte consisted of 3.5 M $H_2SO_4$ and was maintained at 40° C. The MRDE was rotated at 1600 rpm to dislodge the oxygen bubble and improve the mass transfer. Typical PEM electrolysis is done in the temperature range of 60 to 80° C. The MRDE can also be operated in this temperature range. The sample was polarized galvanostatically from 0 to 2 A/cm² in anodic direction (from 1.5 to 3.5 V vs. RHE). Resistance measurements were made at point and the voltage was corrected for the IR losses. Three polarizations were made. After the first polarization, the polarizations reached steady state values. These results show the applicability of the disclosure for characterization of CCM samples used for OER. Very high current densities (similar to PEM electrolysis cells) can be achieved (~2 A/cm²) and therefore the user can directly assess the activity (and stability) of OER CCM samples. Stability tests may be performed using various protocols known in the art. The electrode can be rotated at a desired speed to reduce the impact of generated bubble attachment and improve the mass transfer (or in fact study the influence of bubble's attached). The MRDE method operated in a flooded environment similar to that of a PEM electrolysis unit and as such there are no transport limitations. This allows the user to achieve high current densities and study the CCMs under real life conditions.

Example 10

Current Collectors

Figure 13A:
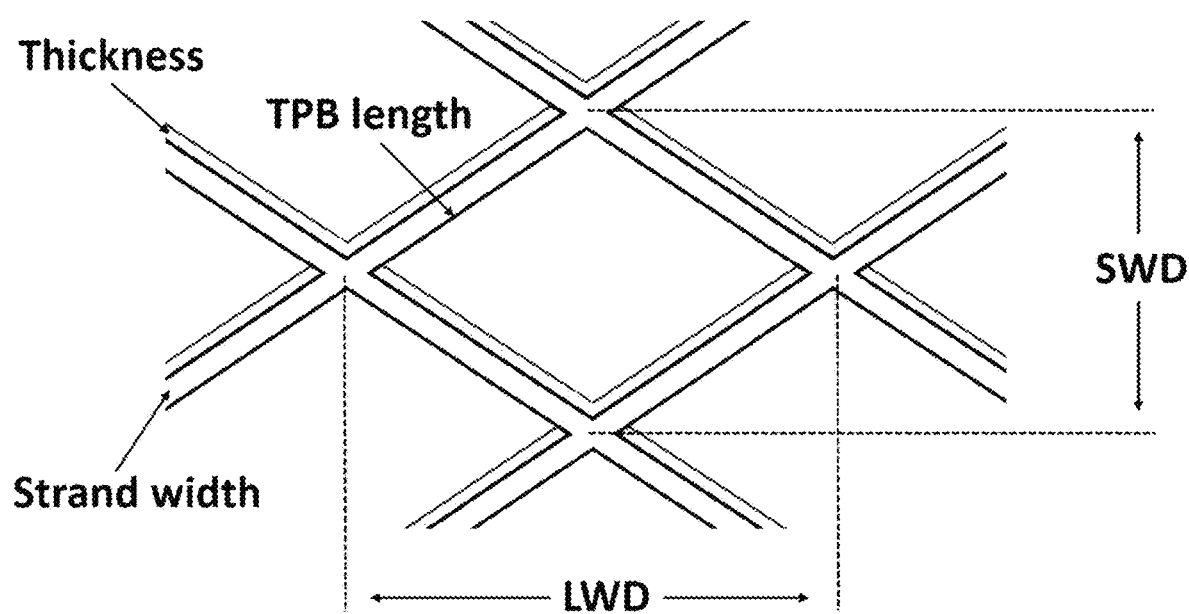
FIG. 13a is a perspective view of (a) a sketch of an expanded metal mesh (LWD=long way of the diamond, SWD=short way of the diamond, TPB=triple phase boundary) in accordance with an embodiment.
Figure 13B:
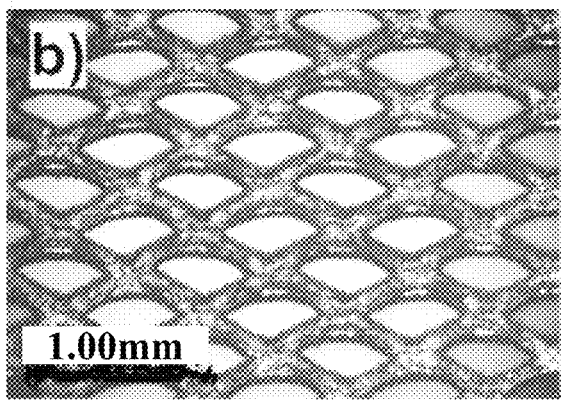
FIGS. 13b-g are microscope images of a Ti mesh-type current collector (all same magnification, red scale bar=1 mm) used: b) 3Ti4-031, c) 3Ti8.5-031, d) 3Ti10-031, e) 2Ti4-124, f) 10Ti12-125, and g) 9Ti-twill in accordance with an embodiment.
Figure 13C:
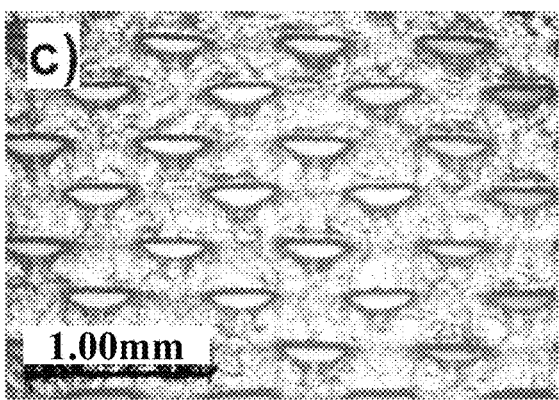
Figure 13D:
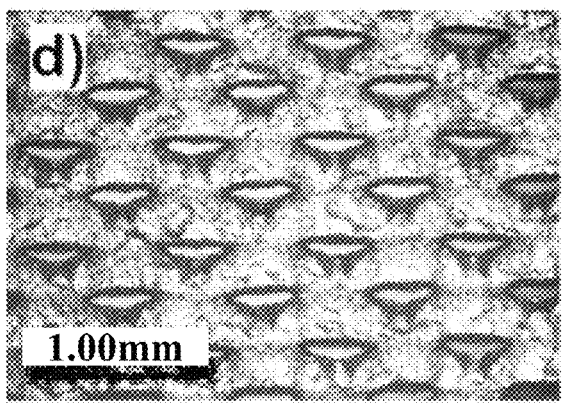
Figure 13E:
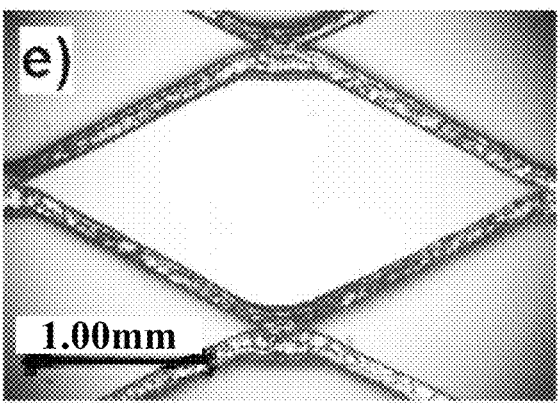
Figure 13F:
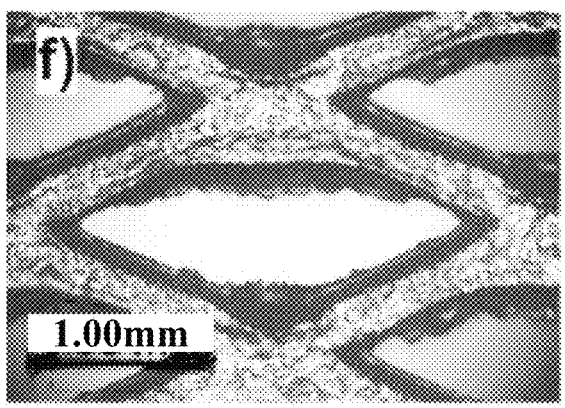
Figure 13G:
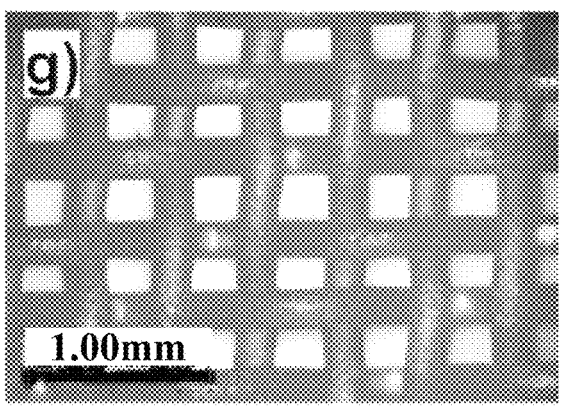

Variations in the design of the external electrical conductor (or current collector) 136 can affect the overall electrochemical testing performance. In the examples below, this disclosure discusses a Ti current collector and an MEA sample, however other forms of samples and current collectors may be used, and the discussion is only meant as an illustrative example. FIG. 13a illustrates a sketch of a magnified view of a current collector. The open area and the perimeter can be determined by approximating a polygon to the openings. The total open area can be calculated by multiplying the number of openings per MEA area (0.785 cm²) with the averaged open area in equation (8). The quotient of the total open area and the MEA area gives the open area in percentage in equation (9). Finally, the coverage (in %) was determined by taking the difference of the open area from 100% in equation (10). As shown in FIG. 13g, the twilled Ti mesh consists of wires, therefore it is not flat, whereas the expanded metal meshes were flat. The actual contact surface between an incompressible substrate and an incompressible wire would be ideally almost linear, and depending on the elasticity of the substrate, the wire is pressed to a certain degree into the surface. The above described calculation method for the coverage cannot be applied to a twilled mesh because the coverage corresponds to the projected contact face and not to the actual contact face. Therefore, assuming a certain elasticity of the swollen MEA, a correction factor of ⅔ is applied in case of the 9Ti-twill current collector to the calculated contact area (i.e., coverage). The TPB length is considered as the total inner perimeter of the openings and was calculated by taking the product of the perimeter and the number of openings per MEA area in equation (11). As shown in Table 2, the coverage is not related to the TPB length, instead it depends on the number of openings and the perimeter per opening.

$$\text{Total open area (cm}^2\text{)} = \frac{\text{\#openings}}{\text{cm}^2} \times \frac{\text{open area(cm}^2\text{)}}{\text{\#opening}} \times A_{electrode}(\text{cm}^2) \qquad (8)$$

$$\text{Open area (\%)} = \frac{\text{Total open area (cm}^2\text{)}}{A_{electrode}(\text{cm}^2)} \qquad (9)$$

$$\text{Coverage (\%)} = 100 - \text{Open area (\%)} \qquad (10)$$

$$TPB \text{ length (cm)} = \frac{\text{\#openings}}{\text{cm}^2} \times \frac{\text{perimeter(cm)}}{\text{\#opening}} \times A_{electrode}(\text{cm}^2) \qquad (11)$$

FIGS. 13b-g show the microscope images of the current collectors examined. Expanded metal samples (FIGS. 13b-f) and a twilled-type mesh (FIG. 13g) are shown in these examples. All mesh samples (12 mm diameter) were punched from a larger sample using a hollow punch and flattened before usage with a manual hydraulic press to ensure a planar geometry and good contact to the CCM sample. The pressure used varied between 5 to 10 MPa.

TABLE 2

Calculated dimensional characteristics of the Ti meshes tested

| Index | Thickness[a] (μm) | Openings/cm² | Coverage (%) | TPB (mm) |
|---|---|---|---|---|
| 3Ti4-031 | 76 | 534 | 48 | 56 |
| 3Ti8.5-031 | 76 | 433 | 78 | 35 |
| 3Ti10-031 | 76 | 437 | 77 | 34 |
| 2Ti4-125 | 50 | 38 | 20 | 20 |
| 10Ti12-125 | 254 | 42 | 39 | 18 |
| 9Ti-twill | 228 | 558 | 51[b] | 40 |

TPB denotes the calculated triple-phase boundary. Indices:
[a]according to the manufacturer,
[b]including the correction factor described in the text.

Figure 14A:
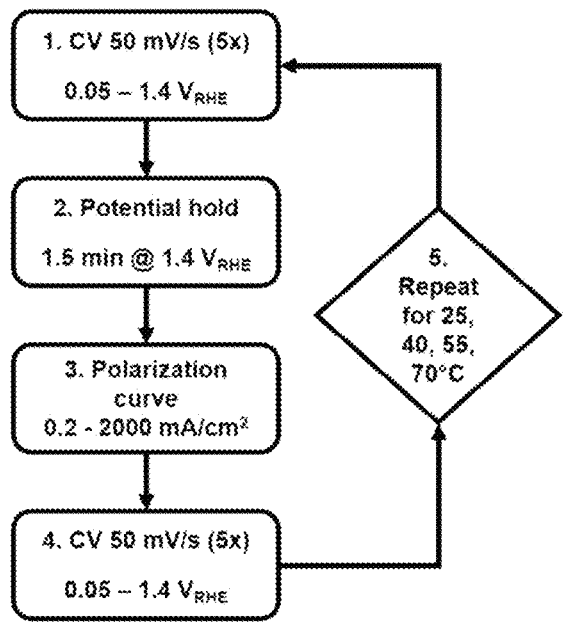
FIG. 14a is a flow-diagram of an electrochemical measurement protocol according to an embodiment.
Figure 14B:
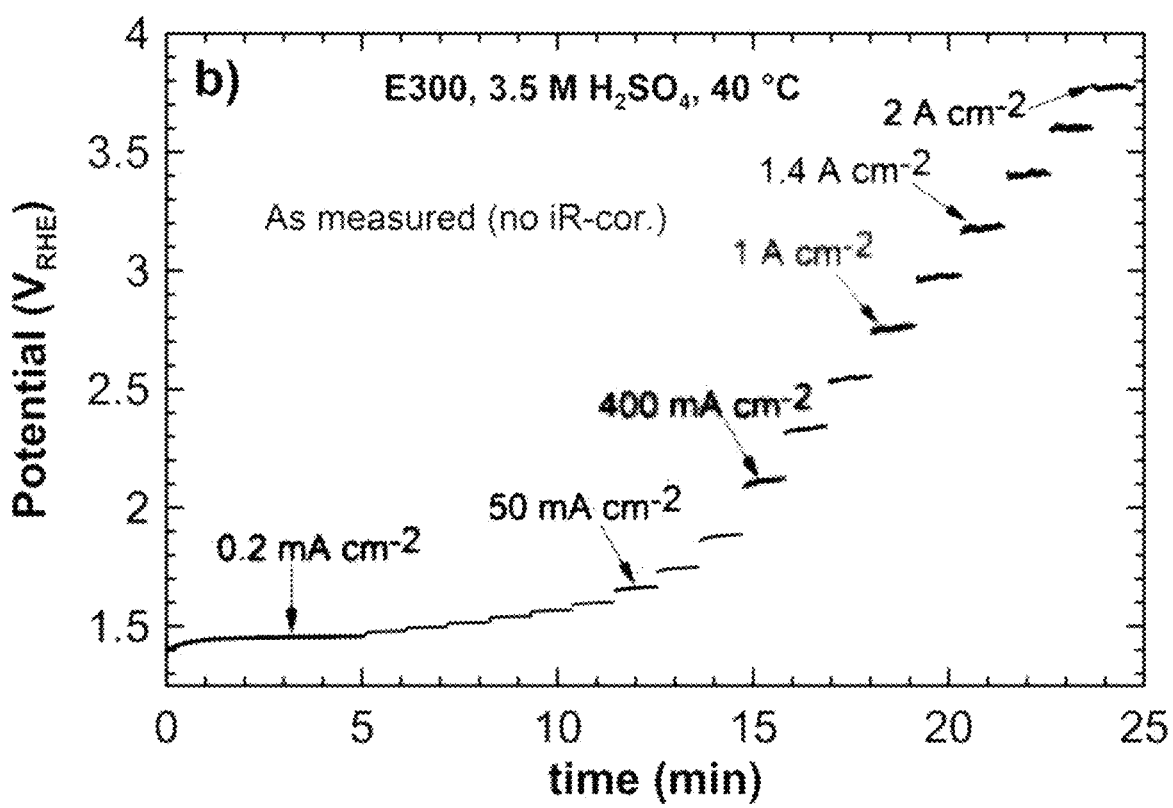
FIG. 14b is a graph representing a typical polarization measurement showing potential equilibration for each specific current as a function of time in accordance with an embodiment.

OER protocol: FIG. 14a shows the OER measurement protocol used in these examples. The samples were evaluated by an OER protocol consisting of a five cyclic voltammograms (CV, FIG. 14a Step 1.), followed by a chronoamperometric (CA, FIG. 14a Step 2.) potential hold, a galvanostatic polarization curve (FIG. 14a Step 3.) and a final five CV step (FIG. 14a Step 4.). All the electrochemical half-cell measurements were conducted at a rotation speed of 1600 rpm. The CVs were recorded between 0.05 and 1.4 V at a sweep rate of 50 mV s$^{-1}$ and the charge was obtained by averaging the integrated charge of the anodic and cathodic sweep. Subsequently, the potential was held at 1.4 V for 1.5 minutes to accelerate the double layer charging. Our experiments using this setup showed that the double layer charging required up to 30 minutes at 0.1 mA cm$^{-2}$ in 1 M H$_2$SO$_4$. Galvanostatic polarization curves were recorded by stepping the current as shown in FIG. 14b. The initial (i.e., 0.2 mA cm$^{-2}$) current density was applied for five minutes and the subsequent currents were applied for one minute, respectively. The very first recorded CCM polarization curve measured for every sample was not analyzed any further since it was not stable. The steady-state potential for each current step was obtained by averaging of the potential values recorded during the last 10 seconds of each step. Each current step culminated with a galvanostatic electrochemical impedance spectra (GEIS) obtained for a frequency range of 100 Hz-15 kHz with an AC amplitude equal to 5% of the applied DC current. For the GEIS data collection, 10 points per decade were averaged over three measurements, with a total GEIS time of 14 seconds. In addition to GEIS, the ohmic resistance was determined by using the current interrupt (CI) technique at eight different current densities. For these measurements, the applied current stimulus was maintained for 0.1 s followed by an immediate switch to open circuit potential (OCP) condition for 0.1 s. This sequence was repeated for 10 times and the average of the resistance was used. The resistance of each step was calculated by the EC-Lab software using both, the rising and falling edges. The measured resistance was used to manually correct the potentials for the iR drop between reference and working electrode after the experiments. Measurements were performed for the temperature range of 25 to 70° C., using a temperature increment of 15° C. The same pair of CCM and Ti mesh was used for a complete set of temperature measurements. All potentials are reported versus the reversible hydrogen electrode (RHE) and the reference electrode was calibrated against RHE in the electrolyte for every temperature used.

In order to reduce the impact of electrolyte heating at high current densities (>1 A cm$^{-2}$), a large beaker cell (~450 mL) was used instead of the more commonly smaller volume (~125 mL) electrochemical cells. Electrolyte heating results in variable ionic resistance in the electrolyte making the interpretations difficult. To ensure adequate conductivity, a 3.5 M H$_2$SO$_4$ was used for all of the experiments. FIG. 14b shows that the uncompensated potential at the working electrode, even with using a 3.5 M H$_2$SO$_4$, becomes significantly higher when high current densities are used. For instance, the ohmic overpotential of a cell with a resistance of 1.17Ω (FIG. 14b) and a current density of 2 A cm$^{-2}$ (i.e., 1.57 A) would be about 1.84 V. Another potential issue at high current densities could be oxidation of hydrogen (evolved at the counter electrode) at the working electrode. The experimenters chose not to isolate (for instance by using a fritted tube) the counter electrode from the other electrodes. Experiments with either a fritted glass tube or a hollow glass tube covered with a Nafion NRE-211 membrane introduced additional high resistances between the working and the counter electrodes and higher current densities could not be reached due to the voltage compliance limitations (±10 V) of the potentiostat used. The experimenters determined that the current contribution from the oxidation (HOR) of hydrogen generated at the counter electrode had a negligible impact on the potential of the working electrode because of the low solubility of hydrogen (7×10$^{-7}$ mol cm$^{-3}$ at 25° C. To verify this, we measured the limiting current of hydrogen oxidation reaction (HOR) and obtained values smaller than 2.5 mA cm$^2$ for potentials reaching as high as 1 V using a H$_2$ (99.999% purity, Praxair Canada Inc.) saturated electrolyte.

Optical microscope images of the Ti current collectors studied are presented in FIGS. 13b-g. Samples b-f are expanded mesh-type samples, whereas sample g is a twilled mesh. Table 2 shows the dimensional characteristics of selected Ti mesh examples. The first, second and third numbers in the index of the expanded metals refer to the nominal thickness, the strand width and the pattern (i.e., the long way in the diamond shape) in thousandths of an inch, respectively. The openings per cm$^2$ were calculated by the long and short way of the diamonds (LWD and SWD) and verified by counting the number of openings for a given area.

Example 11

Impact of Current Collector and Temperature on the CV and the Corresponding Charge of IrO$_2$-Based CCMs Using MRDE For later interpretation of the results, it is worthwhile to briefly discuss the mechanisms of charge adsorption. The origin of the adsorbed charge on oxides is a characteristic Faradaic-type reaction superimposed on the electrochemical double layer charge. The contribution of the diffuse double layer, according to the Stern-model, should be negligible since the high electrolyte concentration restricts the thickness of the diffuse double layer to basically a monolayer. The reversible, Faradaic redox reactions are the adsorption and desorption of protons from the electrolyte which indicate a change in the redox state in equation (12). The corresponding capacitance is called pseudo-capacitance, whereas the capacitance caused by the double layer formation is of non-Faradaic nature and is called double layer capacitance. The reaction in equation (12) causes broad redox peaks spread over a wide potential window (e.g., 0.45-1.2 V, FIG. 15a), whereas the CV of an ideal capacitor appears almost rectangular.

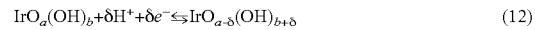

$$IrO_a(OH)_b + \delta H^+ + \delta e^- \leftrightarrows IrO_{a-\delta}(OH)_{b+\delta} \quad (12)$$

Figure 15A:
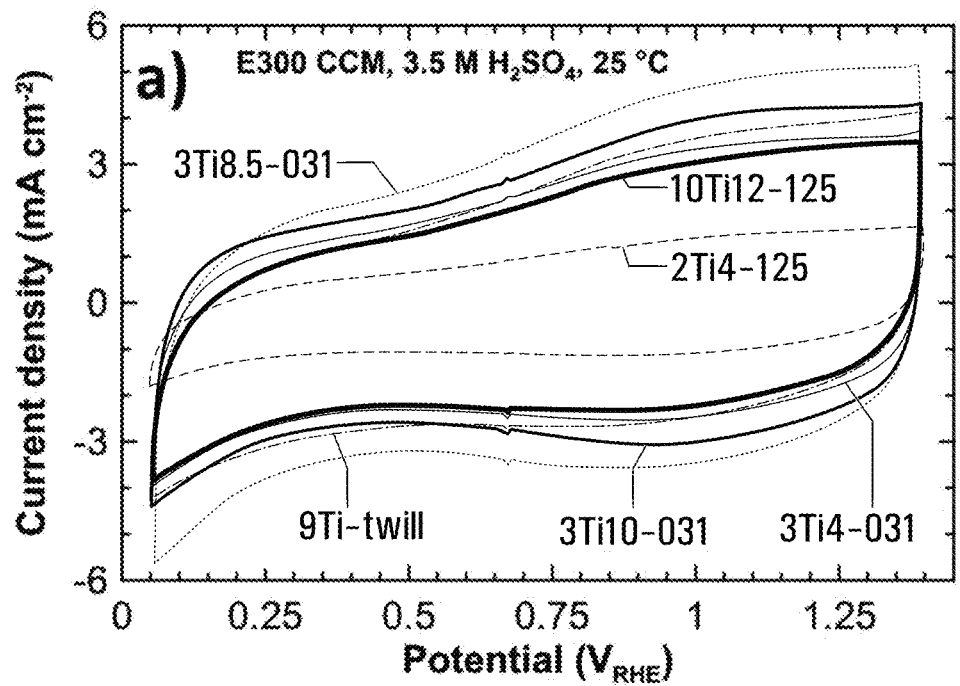
FIGS. 15a-d are graphs representing the 5$^{th}$ cyclic voltammogram of an OER CCM sample in accordance with an embodiment, with different Ti meshes used with an embodiment of an electrode such as the electrode of FIG. 2, measured with a scan rate of 50 mV s$^{-1}$ for a potential range of 0.05-1.4 V in 3.5 M H$_2$SO$_4$ at a) 25° C. and b) 70° C., c) Relation between the charge obtained with different meshes and the coverage of the mesh, and d) Temperature dependency of the charge for the different Ti meshes with the fitted lines showing the exponential trends. The charge was obtained by averaging the entire cathodic and anodic areas of the measured cyclic voltammograms (CVs).
Figure 15B:
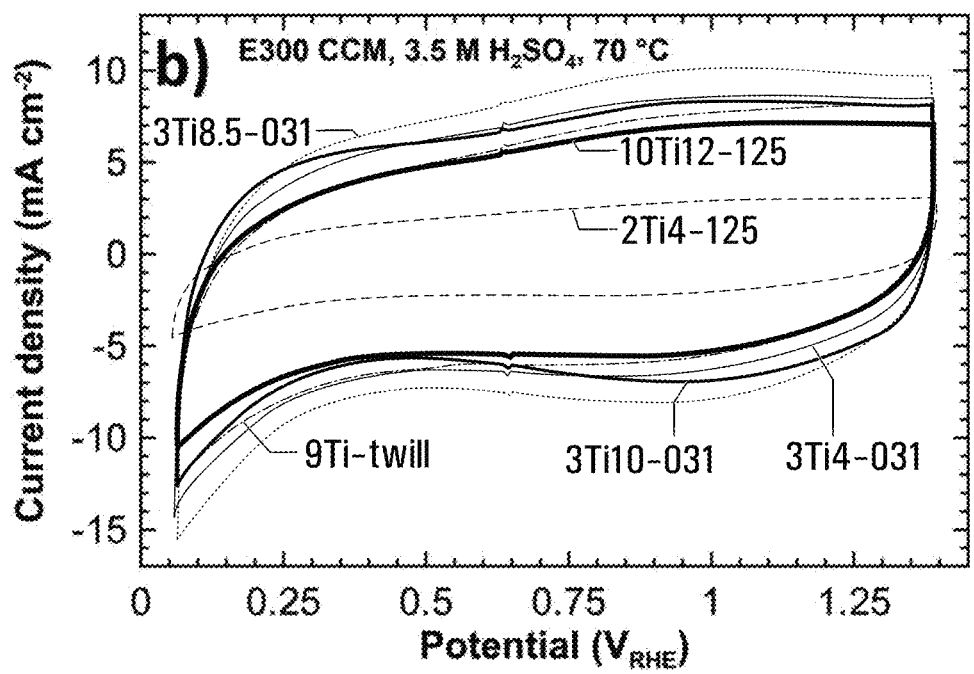

FIGS. 15a and 15b show the CVs obtained with the six current collectors at 25 and 70° C., respectively. The overall appearance of the CVs at 25° C. appears similar to that reported in the literature of anhydrous IrO$_2$ electrodes prepared at higher calcination temperatures, whereas at 70° C., the CVs are similar to those reported for IrO$_2$-based MEAs using a PEM electrolyzer at 80° C. All of the CVs in FIGS. 15a and 15b show a broad redox peak in the potential range of 0.45-1.2 V during the anodic scan and between 1.4 and 0.5 V during the cathodic sweep. The rapid decrease in the current density between 0.5-0.05 V during the cathodic sweep after the redox wave, is most likely caused by hydrogen adsorption processes. These measurements allow the study of the effect of the current collector on the CVs at a given temperature on the one hand and on the other hand the impact of temperature on the CVs for a given current collector.

The overall charge correlated with the CVs in FIGS. 15a and 15b clearly depends on the current collector used. Unless specifically mentioned, charge refers to the average of adsorbed and desorbed charge from the CV measurements, both of which are very close in magnitude. In order to determine the charge contribution of the mesh to the CV, the bare Ti meshes were tested under similar conditions. For this purpose, the mesh was assembled into the MRDE head and instead of a CCM sample a piece of Nafion NRE 211 membrane was used. The normalized charge of the meshes at 25° C. varied between 0.02 mC cm$^{-2}$ (2Ti-125) to ~0.16 mC cm$^{-2}$ (9Ti-twill)—both of which are negligible compared to the charges measured with the mesh-CCM assemblies. For maximum utilization of the catalytically active surfaces, three conditions must be met by the TPB: i) adequate protonic conductivity, ii) electrical conductivity, and iii) unhindered mass transport of the reactants and products. These requirements are fulfilled at the edges of the current collector and the length of the edges is referred to as the TPB-length here. The protonic conductivity is ensured for the MRDE because it is immersed in a liquid, acidic electrolyte. A homogeneous distribution of the contact points and the overall contact surface area between the current collector and the catalyst layer are critical parameters for the electrical conductivity. It has been reasonably argued that the portion of the catalyst layer buried under the current collector is either less active or all together inactive for OER because the removal of produced oxygen bubbles is difficult and will block the active sites. This is very different from the quite facile transport of protons due to penetration of the liquid electrolyte in the porous electrode structure.

Figure 15C:
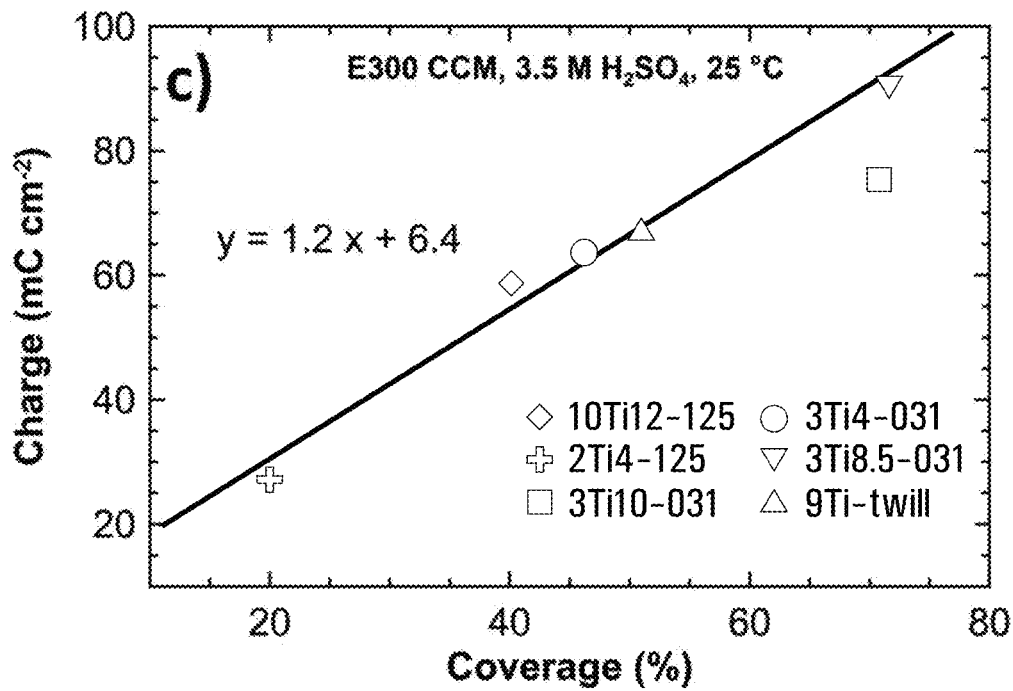
Figure 15D:
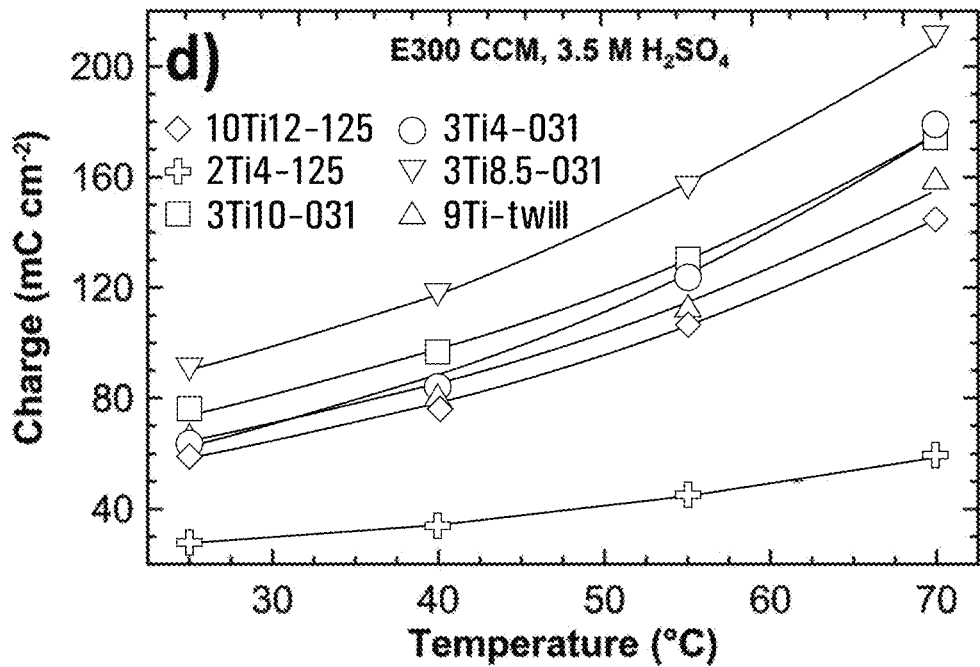
Figure 15E:
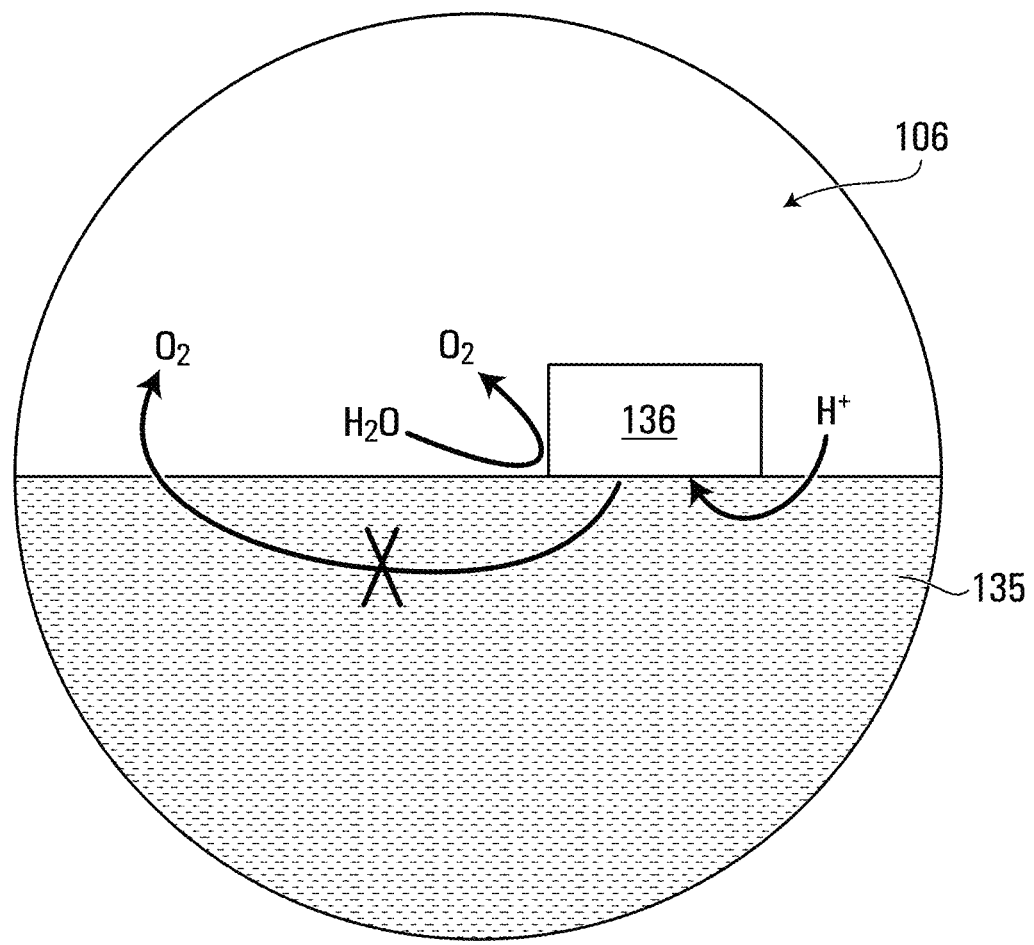
FIG. 15e illustrates an electrolyte/external electrical conductor/catalyst layer interface of FIG. 4.

FIG. 15c shows that the charge varies very linearly ($R^2$=0.98) with respect to the coverage of the mesh. It is worth mentioning that sample 3Ti10-031, which appears as an outlier, was excluded from the regression analysis here. There may have been insufficient contact between the catalyst layer and the sample in this case. The current collector with the lowest coverage (2Ti4-125, 20%) results in the lowest charge (27.3 mC cm$^{-2}$), whereas the highest coverage (3Ti8.5-031, 72%) gives the largest charge (90.4 mC cm$^{-2}$). The slope of the fitted line equals 1.026 mC per percentage coverage. Although there is a clear linear correlation between the charge and area coverage (at different temperatures as well), no correlations were observed between the TPB-length of the current collectors and the observed charge. Linearity of charge vs. coverage implies two things: 1) that the catalyst layer buried under the current collector is accessible for the electrolyte (mainly H$^+$) and contributes to the charge and 2) the catalyst layer in the center of an opening (i.e., areas not covered with mesh) does not contribute to the adsorbed charge. FIG. 15e shows a schematic of the catalyst/collector geometry, coverage and the important species involved.

The inaccessibility of the catalyst layer in the center of an opening can be explained by considering the characteristic time constant of a resistor-capacitor (RC) circuit for an isopotential surface (e.g., the electrode) as shown in equation (13). The characteristic time constant ($\tau$) is a measure of the time required to charge a capacitor in an RC circuit to 63% of its total capacitance by a constant potential step. In equation (13), R□, δ, d and C denote the sheet resistance, thickness of the catalyst layer, distance from the current collector and the capacitance in Farad and is expressed by the ratio of adsorbed charge and the potential window as shown in equation (14). Equation 13 shows that the characteristic time constant, hence the charge contribution, depends on the distance to the current collector.

$$\tau = R \times C = R \times \delta \times d \times C \qquad (13)$$

$$C = \frac{q}{\Delta E} \qquad (14)$$

The measured sheet resistance of the CCM is 1024 Ω□$^{-1}$ and is in good agreement with other literature-reported values for similar catalyst layers (e.g., IrRuO$_x$: 1011.85 Ω□$^{-1}$: Z. Kang, J. Mo, G. Yang, Y. Li, D. A. Talley, B. Han, F. Y. Zhang, Performance Modeling and Current Mapping of Proton Exchange Membrane Electrolyzer Cells with Novel Thin/Tunable Liquid/Gas Diffusion Layers, Electrochim. Acta. 255 (2017) 405-416 (see p. 410). doi:10.1016/j.electacta.2017.09.170). The capacitance (at 25° C.) of the meshes used varies between 21 to 71 mF with the 50 mV s$^{-1}$ scan rate used. The large sheet resistance increases the time required to charge the electrode far away from the current collector since 95% charging requires 3τ for a single potential step (A. J. Bard, L. R. Faulkner, Electrochemical Methods: Fundamentals and Applications, 2nd ed., John Wiley & Sons Inc, 2000 (see 1.2.10). doi:10.1016/B978-0-12-381373-2.00056-9). However, the characteristic time constant for the catalyst far away from the current collector likely exceeds the time scale of the scan rate used.

FIGS. 15a and 15b show the effect of the electrolyte temperature on the voltammograms. Thermal behavior of IrO$_2$ CVs has rarely been discussed in relation to OER. Three notable observations can be made from the data in FIGS. 15a and 15b. First, the shape of the CVs changes with temperature: CVs at 70° C. show less features during their anodic scan and their hydrogen adsorption regions appears more pronounced. The increased hydrogen adsorption could be the reason for lesser features in the CV because the hydrogen desorption increases the current density in the anodic sweep up to a potential of ~0.5 V. Furthermore, the overall shape of the CV, except the hydrogen adsorption region, becomes more rectangular at 70° C., resembling a capacitive response. This suggests that the charge at 70° C. is mainly caused by the formation of the electrochemical double layer and not by changes of the redox state. The second effect of operating temperature is the magnitude of the maximum anodic and cathodic current densities. At 25° C. both of these current densities are quite similar (5.2 and −5.7 mA cm$^{-2}$, respectively), whereas the magnitude of the cathodic maximum (hydrogen adsorption region) at 70° C. is ~60% higher (−15.6 vs. 9.7 mA cm$^{-2}$) than the anodic peak. The third effect is the increasing anodic and cathodic current densities; hence, the increase in the charge with temperature (FIG. 15d). The adsorbed charge follows an exponential trend with respect to the temperature for all current collectors between 25 and 70° C. The absolute increase in charge spans from ~32 mC cm$^{-2}$, for 2Ti4-125, to about 120 mC cm$^{-2}$, for the 3Ti8.5-031 mesh. The increasing trend of adsorbed charge vs. temperature is influenced by a faster diffusion at higher temperatures, a behavior which is can be explained by an Arrhenius-type activation process. The exponential increase in the charge vs. temperature may be attributed to a decreasing apparent activation energy of charging at higher temperatures. The apparent activation energy for porous electrodes refers most likely to the proton diffusion. Furthermore, the activation energy has been found to decrease with scan rate, suggesting that pore diffusion is the limiting process.

Example 12

Influence of the CV Scan Rate on $IrO_2$-Based CCMs with Ti Mesh Using MRDE

We use Ardizzone et al.'s method to analyze the voltammetric charge, q, using different scan rates (Electrochim. Acta. 35 (1990) 263-267). Since both charge generation mechanisms (double layer charging and proton adsorption/desorption) depend on the accessibility of the electrolyte, it is clear that diffusion within the porous catalyst layer would play a very important role here. The electrode area is assumed to consist of two regions: i) the inner and ii) outer surface areas. The former is supposed to arise from pores and cracks which are more difficult to access. The latter, on the other hand, is readily accessible by the electrolyte. The voltammetric charge, q, is expressed as a square root of $\upsilon$, where $\upsilon$ is the scan rate, by the equations (15) and (16):

$$q(\upsilon) = q_O + B\frac{1}{\sqrt{\upsilon}} \quad (15)$$

$$\frac{1}{q} = \frac{1}{q_T} + B'\sqrt{\upsilon} \quad (16)$$

where B and B' denote constants with no direct physical meaning. The outer charge, $q_O$, is related to the outer electrode area and is obtained from Equation (15). A linear fit of Eq. 11 and an extrapolation of $\upsilon \rightarrow \infty$ allows one to extract the outer charge from the y-axis intercept. The underlying assumption here is that the scan rate is faster than the diffusion of protons into the pores and cracks of the inner surface, hence the adsorbed charge is reflects that of the outer surface. The total charge, $q_T$, is the sum of the outer charge and the inner charge, $q_i$ in equation (17). The total charge can be obtained from an extrapolation to $\upsilon \rightarrow 0$ using equation (16). Oh et al. (Chem. Sci. 6 (2015) 3321-3328) have defined the electrochemical porosity, $\varepsilon_{Echem}$, as the ratio of inner and outer charge in equation (18).

$$q_T = q_i + q_O \quad (17)$$

$$\varepsilon_{Echem} = \frac{q_i}{q_T} \quad (18)$$

Figure 16A:
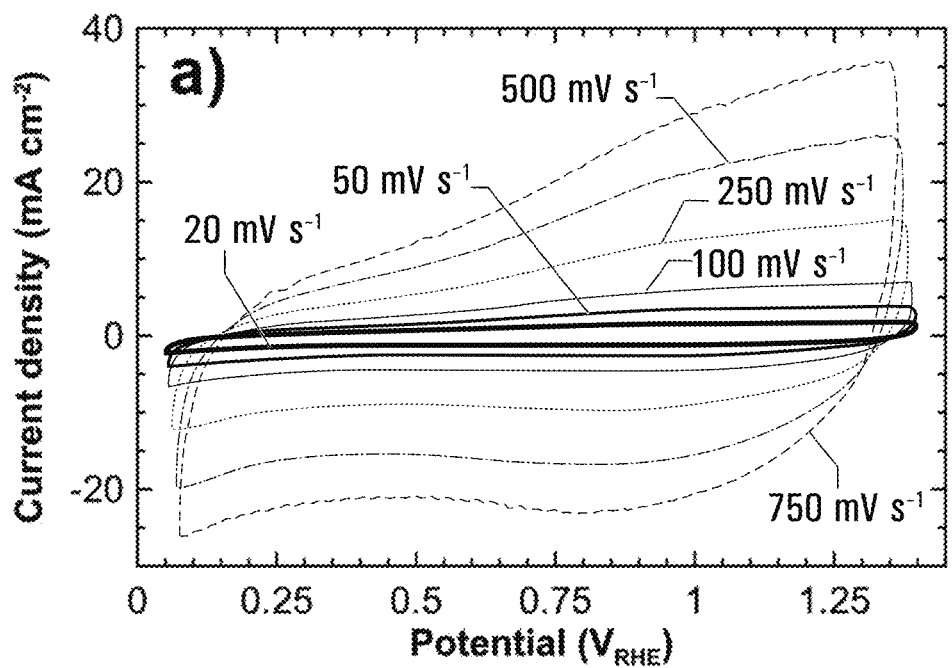
FIGS. 16a-d are graphs representing, in accordance with an embodiment, a) CVs of an IrO$_2$-based CCM in 3.5 M H$_2$SO$_4$ for a selected number of scan rates, b) Voltammetric charge per cm$^2$ as a function of the scan rate, c) Surface-normalized charge as a function of the inverse square-root of the scan rate, and d) Inverse normalized charge vs. the square-root of the scan rate.
Figure 16B:
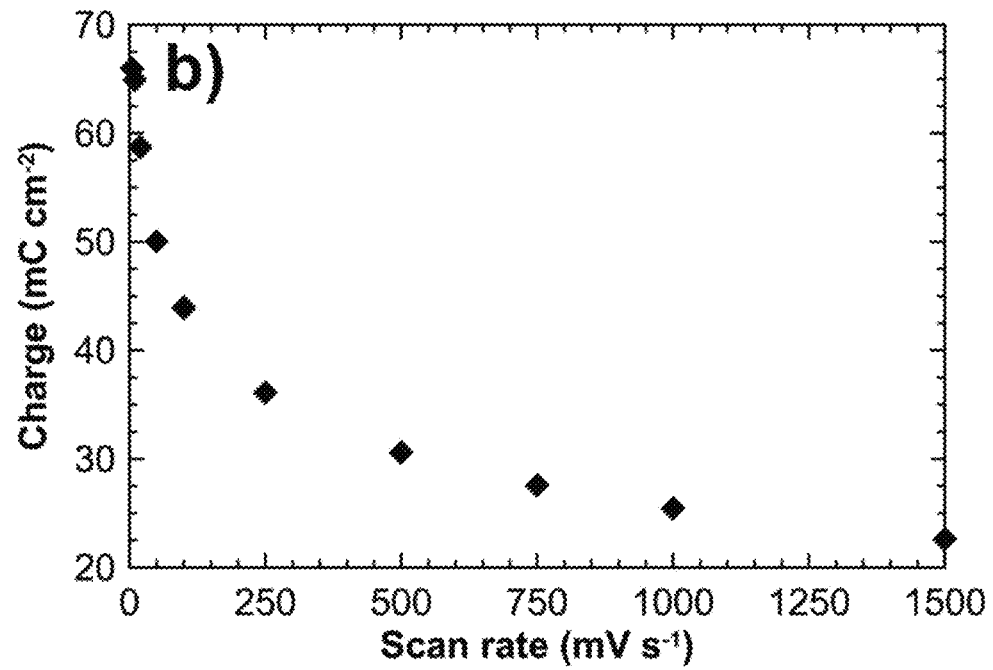
Figure 16C:
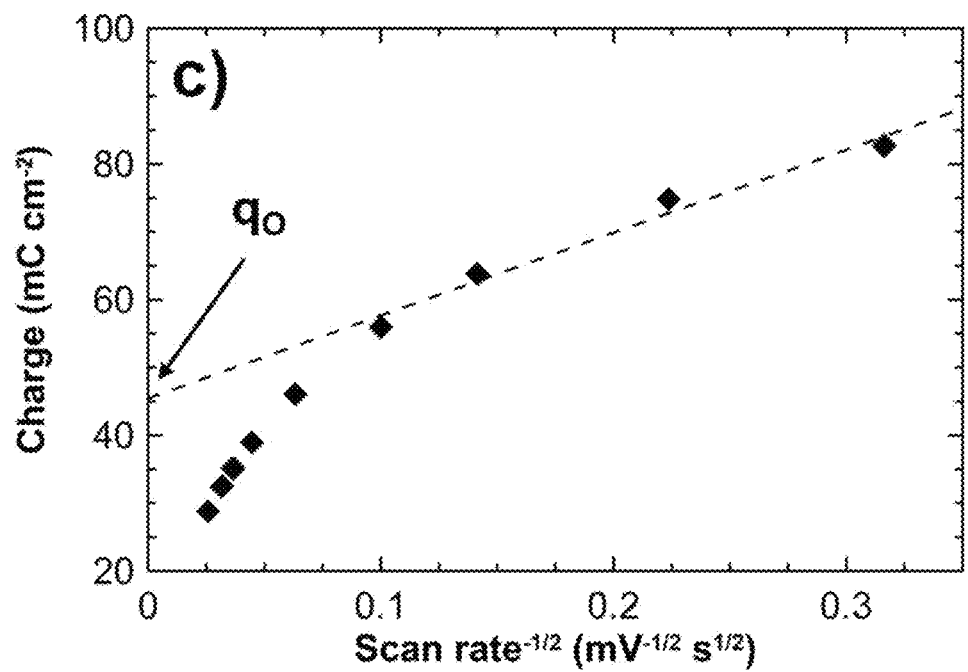
Figure 16D:
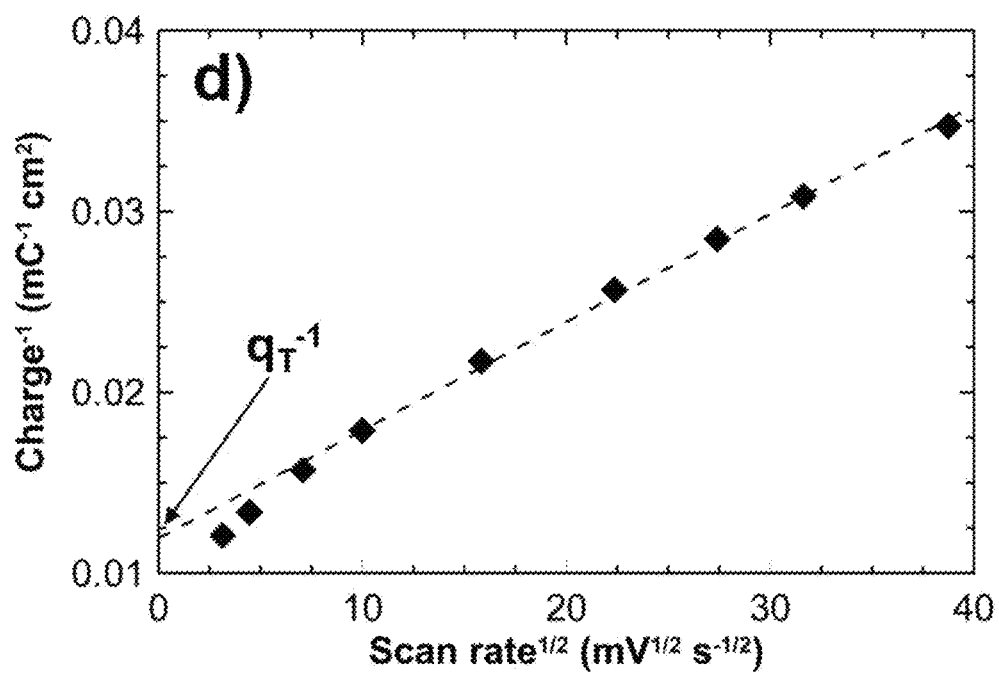

FIG. 16a shows a number of CVs recorded at different scan rates. For clarity, higher scan rate data were smoothed because of a persistent noise at higher current densities. Higher scan rates lead to higher currents in the CVs. The voltammetric charge obtained from the CVs is plotted as a function of the scan rates in FIG. 16b. FIGS. 16c and 16d show the plots used to calculate the outer and total charge according to Ardizzone's method, respectively.

The calculated electrochemical porosity of the CCM used here is about 46%, somewhat higher than that obtained for iridium nanodendrides by Oh et al. (~34%). The higher porosity could be due to the higher catalyst loading used here (2.1 $mg_{Ir}$ $cm^{-2}$ vs. 10.2 $\mu g_{Ir}$ $cm^{-2}$). The loading of the MEA was measured with XRF technique.

Example 13

Resistance Measurements for the Assembled MRDE

Figure 17A:
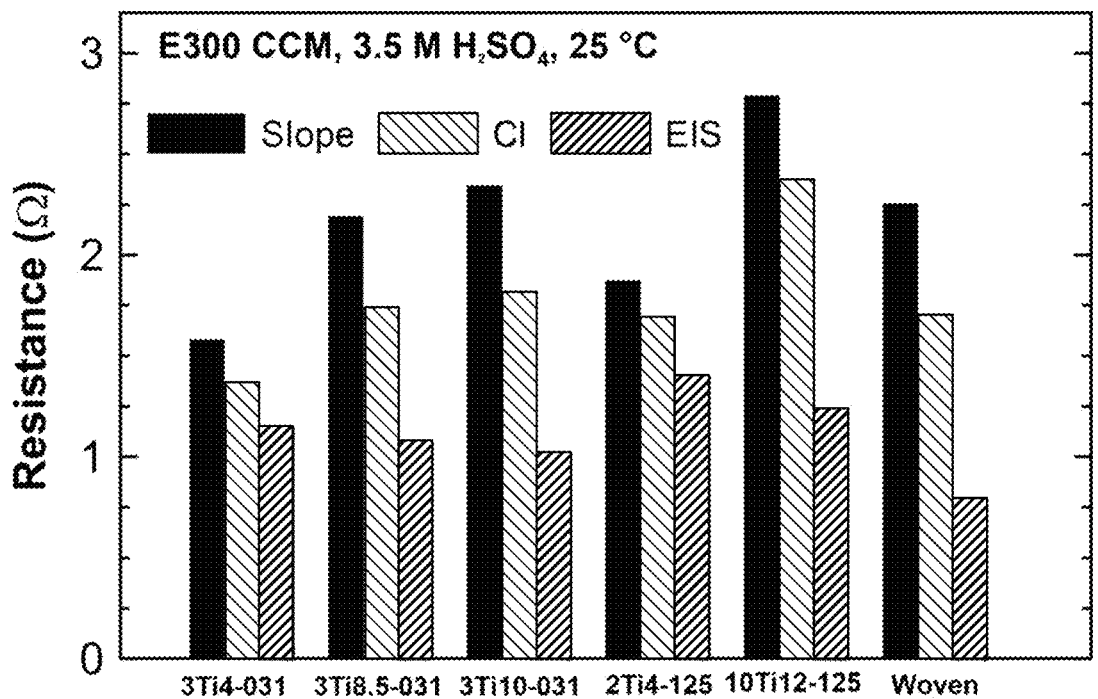
FIGS. 17a and 17b are graphs representing resistance determined in accordance with an embodiment in 3.5 M H$_2$SO$_4$ at 25° C. by: CI (current interrupt), EIS (electrochemical impedance spectroscopy), and the slope (fit of the ohmic region of the polarization curve). a) Comparison of the resistance determined for the different current collectors at 25° C., and b) Averaged resistance of the CCM contacted with the current collector 3Ti4-031 as a function of temperature. The data for the 30 wt % H$_2$SO$_4$ was obtained from H. E. Darling, Conductivity of Sulfuric Acid Solutions, J. Chem. Eng. Data. 9 (1964) 421-426.

Resistance of the assembled MRDE was determined by three different methods: i) current interrupt (CI), ii) electrochemical impedance spectroscopy (EIS), and iii) from the ohmic region of the polarization curves. FIG. 17a summarizes the results of these measurements at 25° C. for the current collectors used.

Figure 17B:
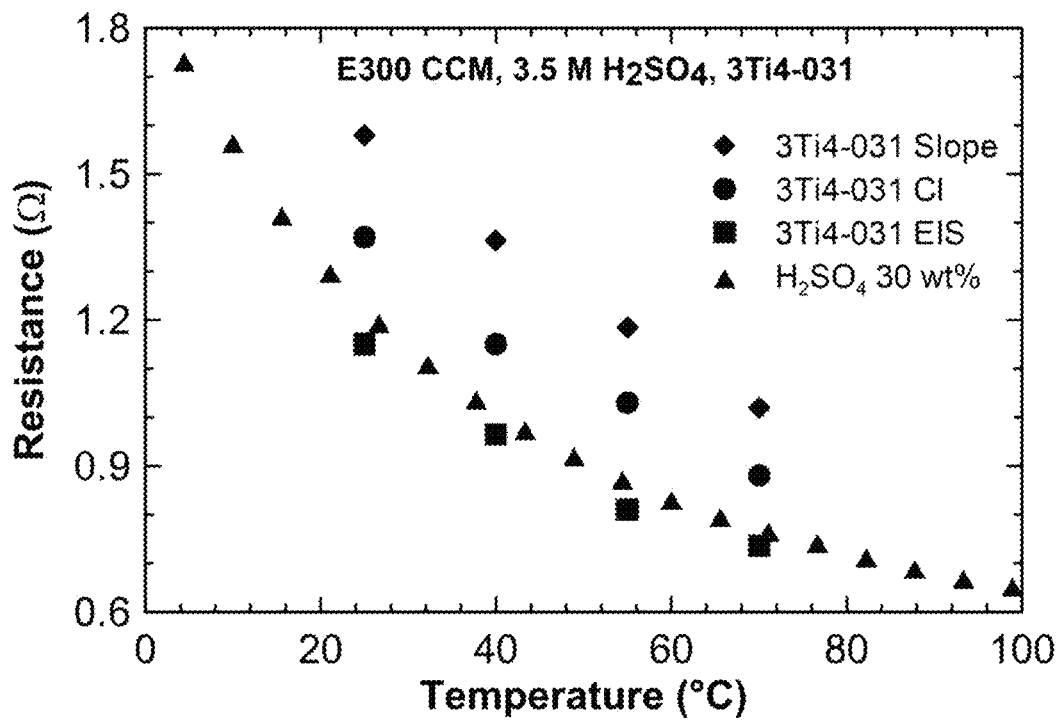

The resistance values obtained show the following trend for all meshes: $R_{slope} > R_{CI} > R_{EIS}$. It should be mentioned that the resistance obtained from the slope could be influenced by the degradations or phenomena which decrease the catalytic activity as well. FIG. 14b, for instance, shows that the potential at a fixed current density increases slightly during the current hold period and this increase is reflected in the slope of the polarization curves as well. The deviation between CI and EIS is probably due to inherent differences in the time scale of measurement. Impedance spectroscopy uses small perturbation at high frequencies to extract the ohmic resistance whereas CI analysis uses potential drop (or rise) after a sudden current interrupt or current stimulus, respectively. However, ideally, and if no other resistances (e.g., mass transport resistance) are present, the iR corrected polarization curve is almost flat in the ohmic region. The consequence of a resistance underestimation (or overestimation) is positive (or negative) slope of the polarization curve in the ohmic region. These extreme cases should be avoided when iR corrected data are presented, otherwise erroneous interpretations can be made. Correction of the resistance is desired if only catalyst properties, such as kinetic parameter, are analyzed. The resistance in the half-cell is governed by the bulk electrolyte resistance which depends on the temperature. FIG. 17b shows the exponential decrease of the cell resistance when temperature increases.

Example 14

Figure 18A:
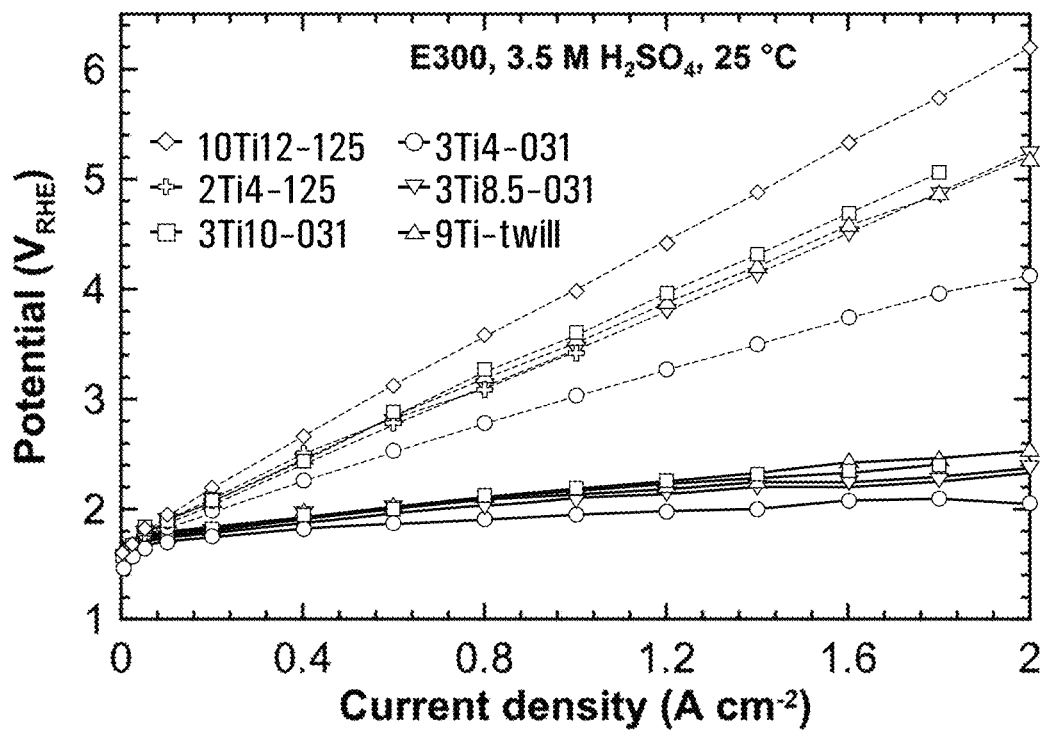
FIGS. 18a and 18b are graphs representing, in accordance with an embodiment, a) polarization curves obtained from different meshes at 1600 rpm in 3.5 M H$_2$SO$_4$ at 25° C. Dashed curves are not compensated for the resistance and solid curves are iR-corrected using the current interrupt method and b) Potential required for 100 mA cm$^{-2}$ (solid symbols) and 600 mA cm$^{-2}$ (clear symbols) for the different Ti current collectors.

OER Activity Comparison of $IrO_2$-Based CCMs with Different Ti Meshes Using MRDE FIG. 18a shows the non iR-corrected (dashed lines) and the iR-corrected (solid lines) polarization curves obtained for the tested Ti meshes at 25° C. The polarization curves, with no iR correction for different meshes, differ strongly and show the importance of current collector optimization for these measurements. The differences in performance between the meshes, on the other hand, become smaller (at 2 A $cm^{-2}$: 3Ti4-031=1.97 V vs. 9Ti-twill=2.54 V) after the iR correction, suggesting that the resistance is the main parameter influencing the measured catalytic activity. The as-measured 10Ti12-125 sample shows the least performance and the 3Ti4-031 sample shows the best performance at all the four temperatures examined here.

Figure 18B:
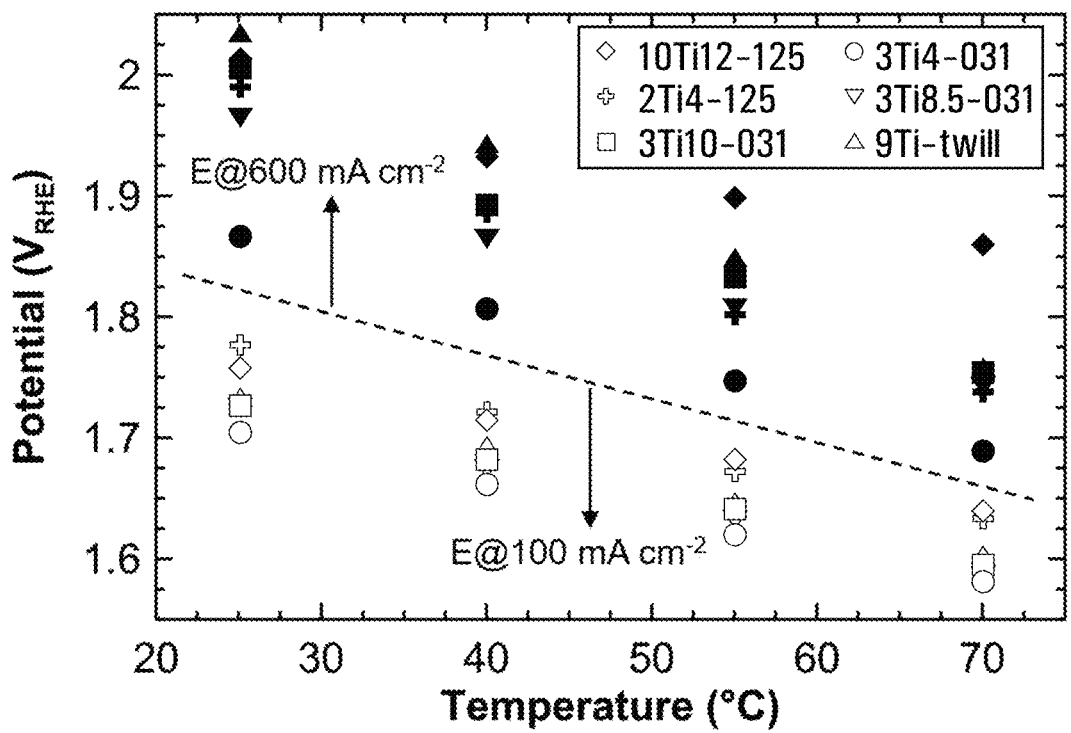
Figure 19A:
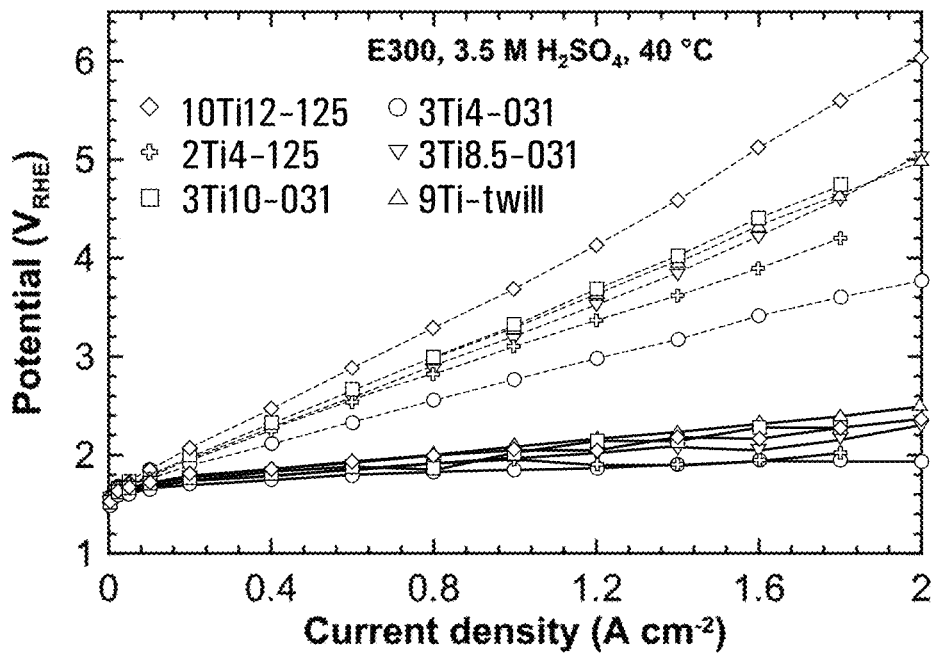
FIGS. 19a-c are graphs representing polarization curves obtained in accordance with an embodiment from the different meshes at 1600 rpm in 3.5 M H$_2$SO$_4$ at a) 40° C., b) 55° C. and c) 70° C. Dashed curves are not compensated for the resistance and solid curves are iR corrected using the current interrupt method
Figure 19B:
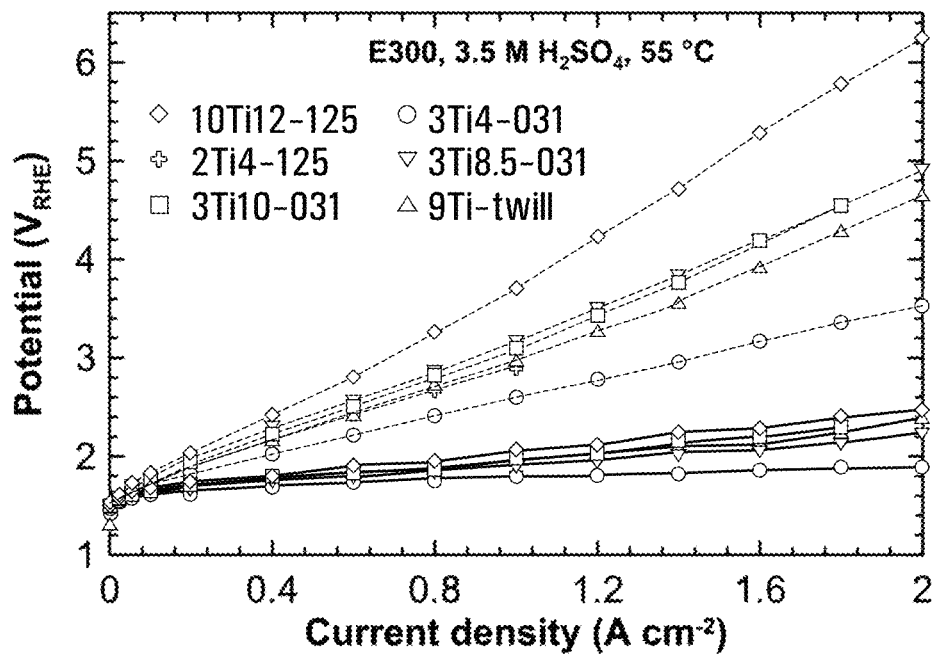
Figure 19C:
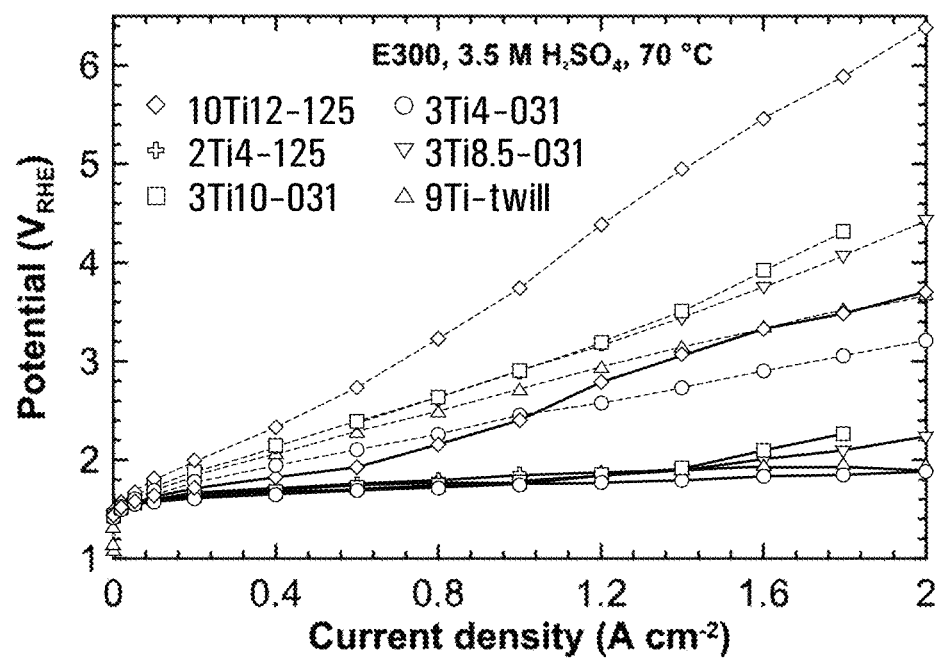

The 10Ti12-125 sample combines two undesired properties for current collectors: first it is the thickest mesh and second it has the shortest TPB-length which leads to lower performance. FIG. 18b shows the potential required to reach 100 mA $cm^{-2}$ (solid symbols) and 600 mA $cm^{-2}$ (open symbols) at different temperatures for all tested current collectors. The deviations from the linear trend at 600 mA $cm^{-2}$ indicate mass transport losses, which can be seen for the 10Ti12-125, 3Ti10-031 and the 3Ti8.5-031 current collectors. The thickness (10Ti12-125) and/or the high electrode coverage (3Ti10-031 and 3Ti8.5-031) could cause the mass transport issues. Interestingly, the sample with the highest coverage (3Ti8.5-031) shows slight transport limitations and this only occurs at 70° C. in the polarization curve as illustrated in FIG. 19. However, 2Ti4-125 was the only mesh which did not reach high current densities because of accumulation of oxygen bubbles at the electrode surface, which were also visible during the measurements. The impact of accumulated bubbles is reflected in a sawtooth-spade potential-time profile in the galvanostatic step. The measured potential increases during the accumulation of bubbles and suddenly drops after the bubble detachment. In general, the Ti meshes studied can be divided into three groups based on their non iR-corrected performance: 1) 3Ti4-031 as the best performing mesh, 2) the least performing mesh or 10Ti12-125, and 3) the average performing meshes which are, for example, 3Ti10-031, 3Ti8.5-031, 2Ti4-125 and 9Ti-twill.

Figure 20A:
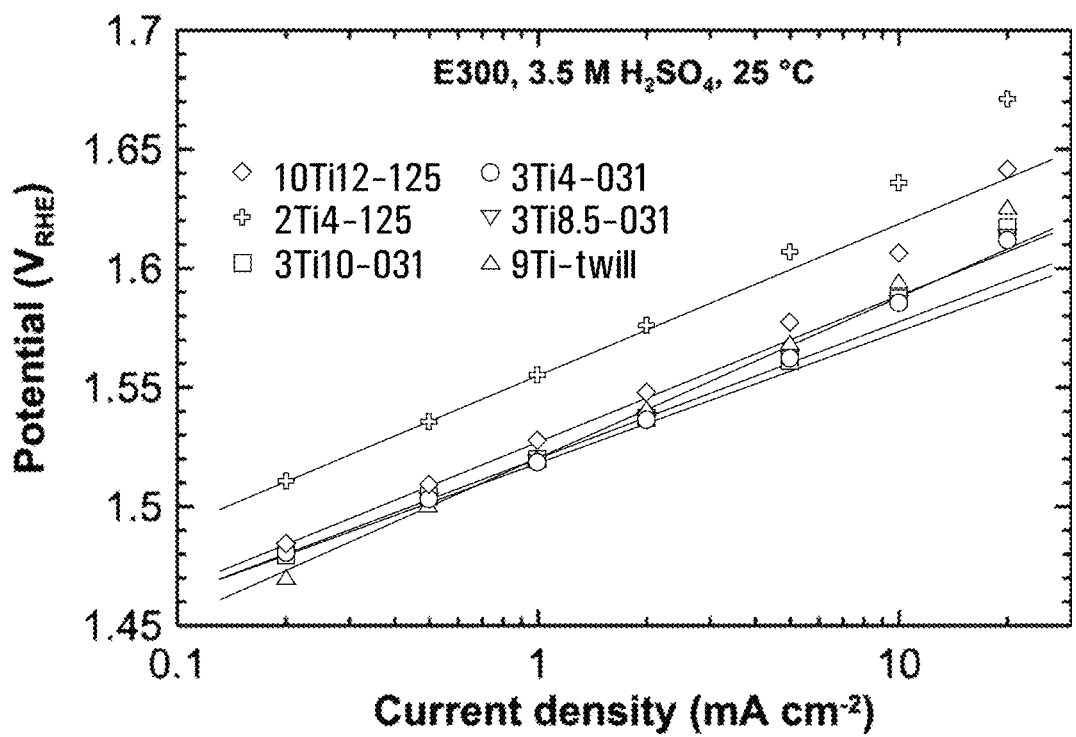
FIGS. 20a and 20b are graphs representing Tafel plots in accordance with an embodiment for the different meshes in 3.5 M H$_2$SO$_4$ with an electrode rotation of 1600 rpm at a) 25° C. and b) 40° C. All results are iR corrected by current interrupt.
Figure 20B:
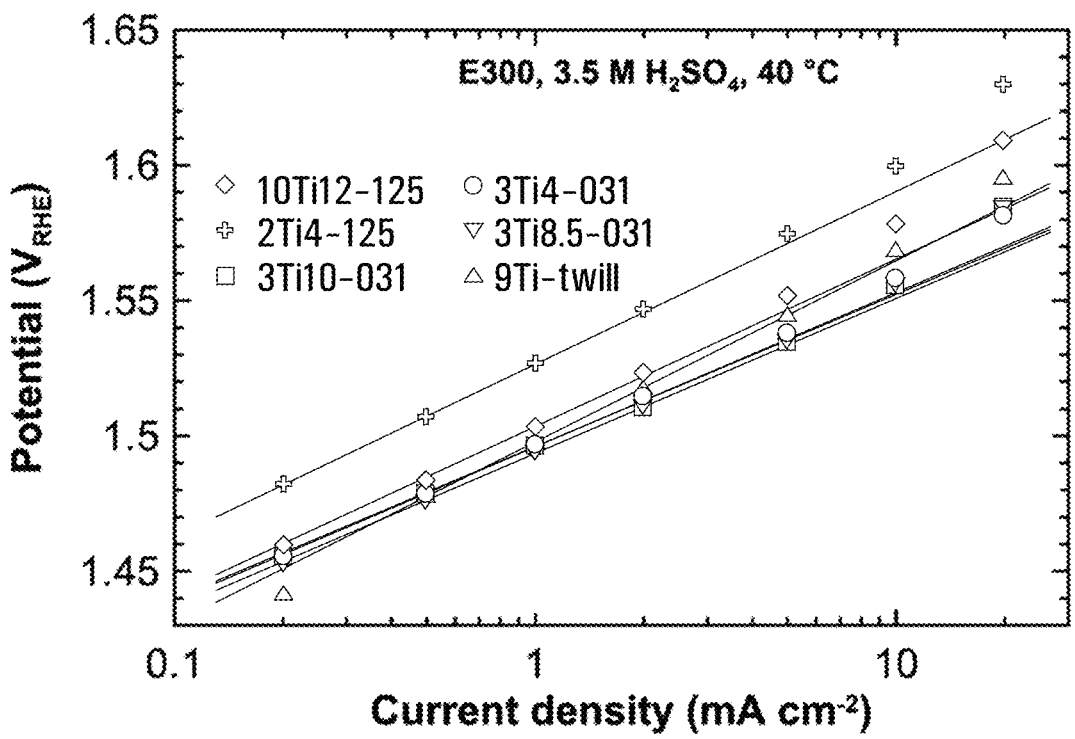
Figure 21A:
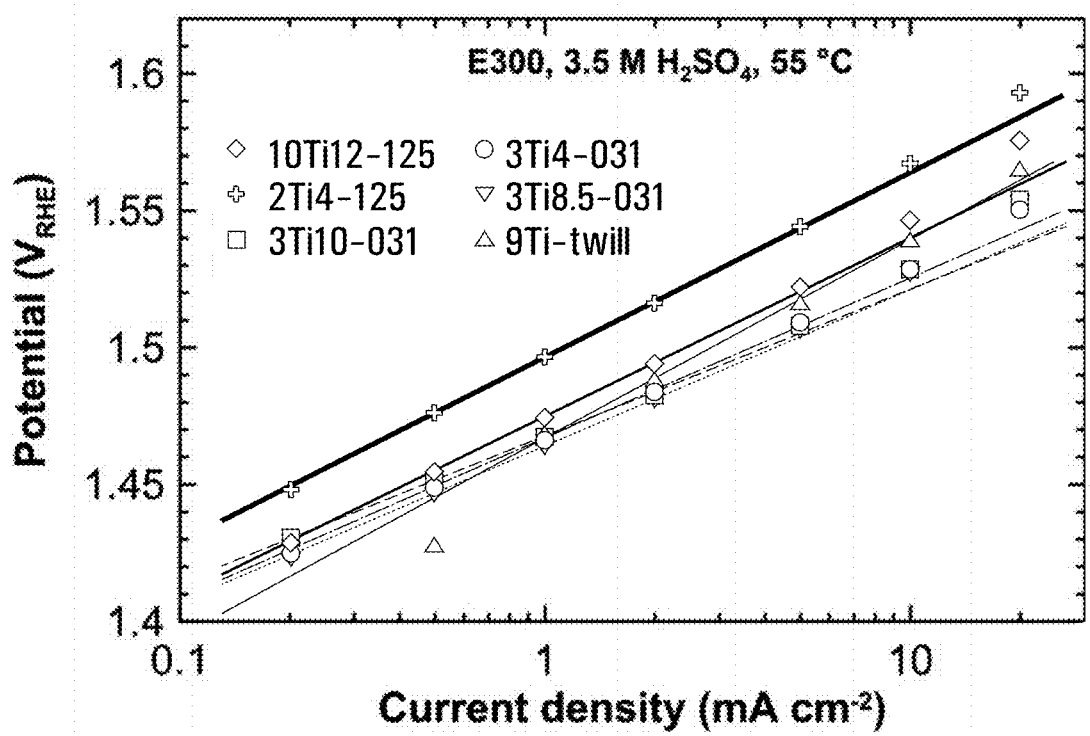
FIGS. 21a and 21b are graphs representing Tafel plots in accordance with an embodiment for the different meshes in 3.5 M H$_2$SO$_4$ with an electrode rotation of 1600 rpm at a) 55° C. and b) 70° C. All results are iR corrected by current interrupt.
Figure 21B:
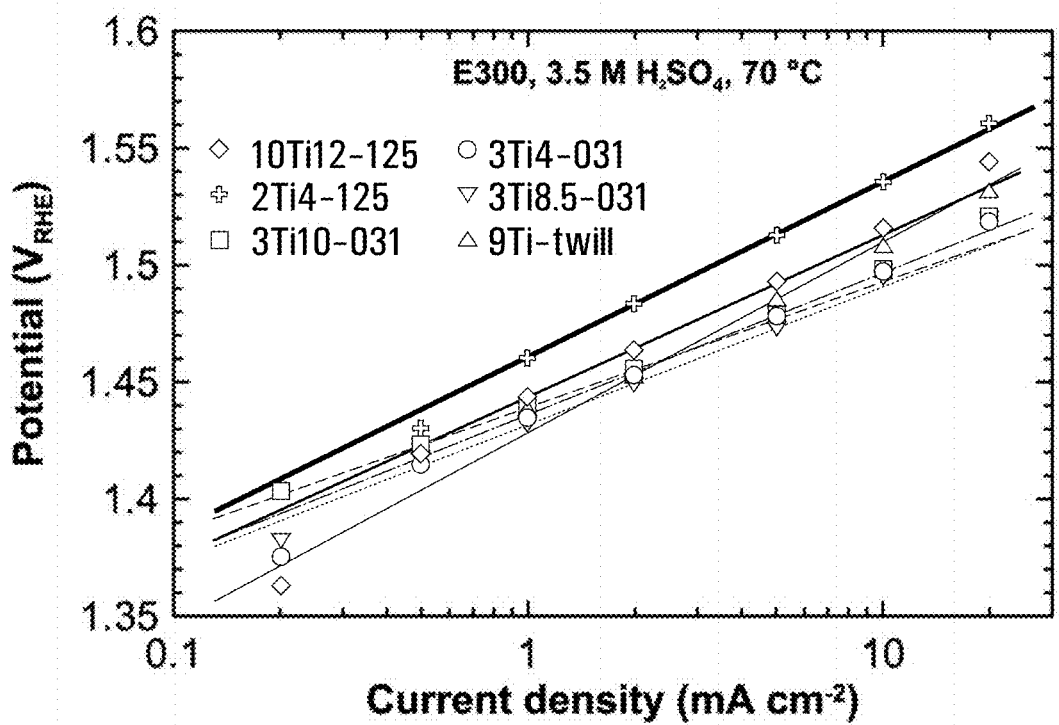

FIG. 20 shows the iR-corrected Tafel-plots obtained from the polarization curves at the low current density regions (up to 20 mA cm$^{-2}$). Only the linear region of the data, which is usually up to 2-5 mA cm$^{-2}$, was used for the linear regression. The potential at the lowest current density (i.e., 0.2 mA cm$^{-2}$) deviates from the linear trend at temperatures above 40° C. for some samples (e.g., 9Ti-twill) because the equilibration period for the first step (5 min) was not sufficient enough to reach a stable potential. This behavior can be explained by the already-discussed high in-plane resistance causing a huge characteristic time constant for the RC-circuit. Higher temperatures will not decrease the in-plane resistance of the MEA significantly but lead to increase in the voltammetric charge which causes an even longer characteristic time constant (Eq. 8) at higher temperatures. Tafel plots at 55 and 70° C. are illustrated in FIG. 21. 3Ti4-031 shows the lowest potential for a given current density but the potential obtained with 3Ti10-031 and 3Ti8.5-031 is almost similar at low current densities. The potential for a given current density is the highest for 2Ti4-125 followed by that of the 10Ti12-125. Table 3 summarizes the kinetic parameters of the OER polarization curves measured at 25° C.

TABLE 3

Resistance, kinetic parameter, corrected ($V_{iR}$) and uncorrected (V) potential at 1 A cm$^{-2}$ of the meshes examined at 25° C. The resistance was determined by the current interrupt technique at 1 A cm$^{-2}$.

| Mesh | $R_{CI, 1A/cm2}$ (Ω) | $E_{1A/cm2}$ (V) | $E_{1A/cm2}$ ($V_{iR}$) | b (mV dec$^{-1}$) | $j_0$ (A cm$^{-2}$) |
|---|---|---|---|---|---|
| 3Ti4-031 | 1.37 | 3.03 | 1.95 | 57 | 7.5 × 10$^{-9}$ |
| 3Ti8.5-031 | 1.74 | 3.46 | 2.09 | 55 | 5.8 × 10$^{-9}$ |
| 3Ti10-031 | 1.82 | 3.95 | 2.16 | 57 | 8.8 × 10$^{-9}$ |
| 2Ti4-125 | 1.69 | 3.42 | 2.10 | 66 | 1.1 × 10$^{-8}$ |
| 10Ti12-125 | 2.37 | 3.99 | 2.13 | 61 | 1.5 × 10$^{-8}$ |
| 9Ti-twill | 1.70 | 3.53 | 2.19 | 68 | 5.2 × 10$^{-8}$ |

The kinetic region was analyzed using the Tafel equation (19):

$$\eta = A \times \ln\left(\frac{j}{j_0}\right) \quad (19)$$

where η denotes the overpotential, A is the Tafel slope, and $j/j_o$ are current and exchange current densities, respectively. A Tafel slope of 60 mV dec$^{-1}$ is often associated with the so called Krasil'Schchikov pathway of OER in equations (20)-(23) where S denotes a surface species. Furthermore, a value of 60 mV dec$^{-1}$ can indicate that the chemical step in equation (21) is the rate determining step. Here an OH surface species is rearranged via an surface reaction.

$$S+H_2O \leftrightarrows S-OH_{ads}+H^++e^- \quad (20)$$

$$S-OH_{ads} \leftrightarrows S-O^-+H^+ \quad (21)$$

$$S-O^- \leftrightarrows S-O+e^- \quad (22)$$

$$S-O \leftrightarrows S+\tfrac{1}{2}O_2 \quad (23)$$

The deviation of the exchange current density, $j_0$, is more than one order of magnitude for different meshes, however, the experimental determination of the exchange current density for highly irreversible reactions, such as OER, could be highly erroneous. For instance, the deviation of the Tafel slopes are reflected in the exchange current density and higher Tafel slopes results more likely in higher exchange current densities. The exchange current densities, obtained here, are also in agreement with literature results (P. Millet, Characterization Tools for Polymer Electrolyte Membrane (PEM) Water Electrolyzers, PEM Electrolysis Hydrog. Prod. (2015) 179-217. doi:10.1201/b19096-11; P. Lettenmeier, L. Wang, U. Golla-Schindler, P. Gazdzicki, N. A. Cañas, M. Handl, R. Hiesgen, S. S. Hosseiny, A. S. Gago, K. A. Friedrich, Nanosized IrOx-Ir Catalyst with Relevant Activity for Anodes of Proton Exchange Membrane Electrolysis Produced by a Cost-Effective Procedure, Angew. Chemie—Int. Ed. 55 (2016) 742-746. doi:10.1002/anie.201507626).

Figure 22:
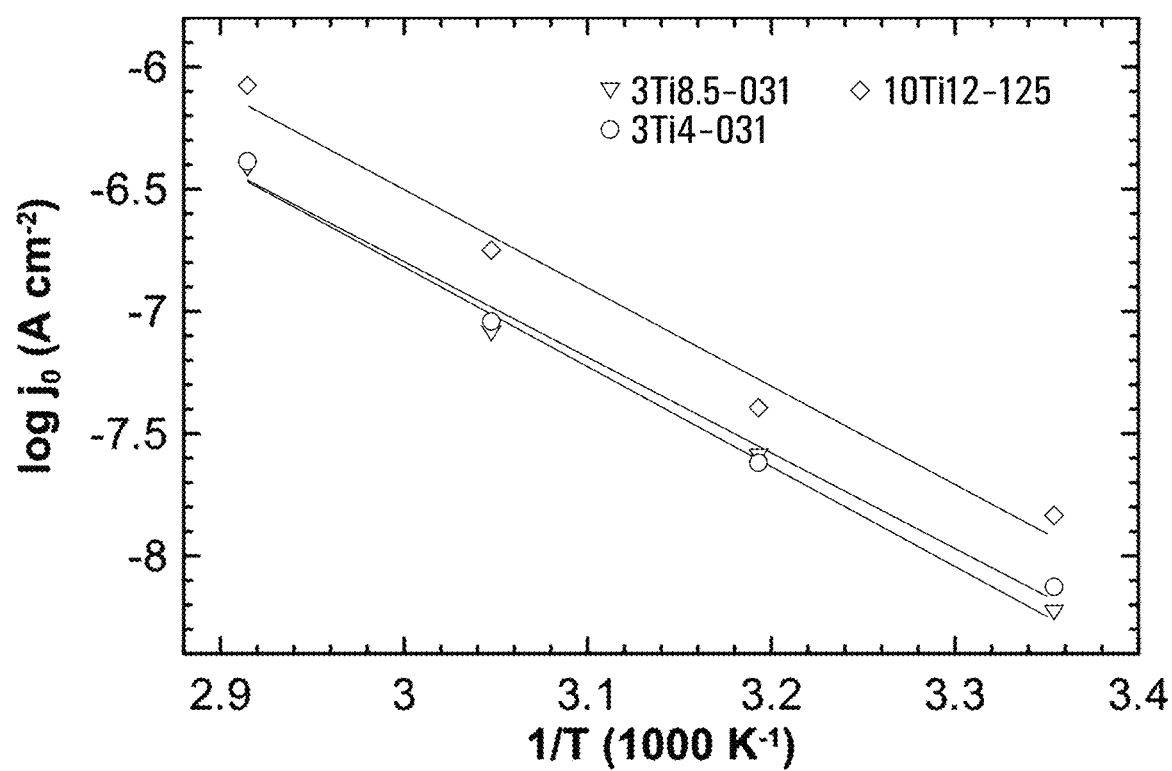
FIG. 22 is a graph representing an Arrhenius plot for the exchange current density obtained with the different meshes in accordance with an embodiment.

FIG. 22 shows the Arrhenius plot of the data for a potential of 1.23 V vs. RHE. Table 4 presents the activation energies ($E_A$) obtained for the different meshes. The activation energy for the different current collectors obtained here (~75 kJ mol$^{-1}$) is slightly higher than what has been reported in the literature for another commercial Greenerity™ MEA in an electrolyzer (67 kJ mol$^{-1}$). However, the activation energy obtained in the test station (see below) is similar to the literature value (68 kJ mol$^{-1}$).

TABLE 4

Activation energy of the used meshes.

| | 10Ti12-125 | 3Ti4-031 | 3Ti8.5-031 |
|---|---|---|---|
| $E_A$ (kJ mol$^{-1}$) | 77 | 75 | 78 |

The activation energy was calculated from the slope of the Arrhenius plot via Equation (24).

$$E_A = 2.303R \times \frac{\partial \log j_0}{\partial T^{-1}} \quad (24)$$

Example 15

Accelerated Degradation Testing of IrO$_2$-Based CCMs Using MRDE

Figure 23A:
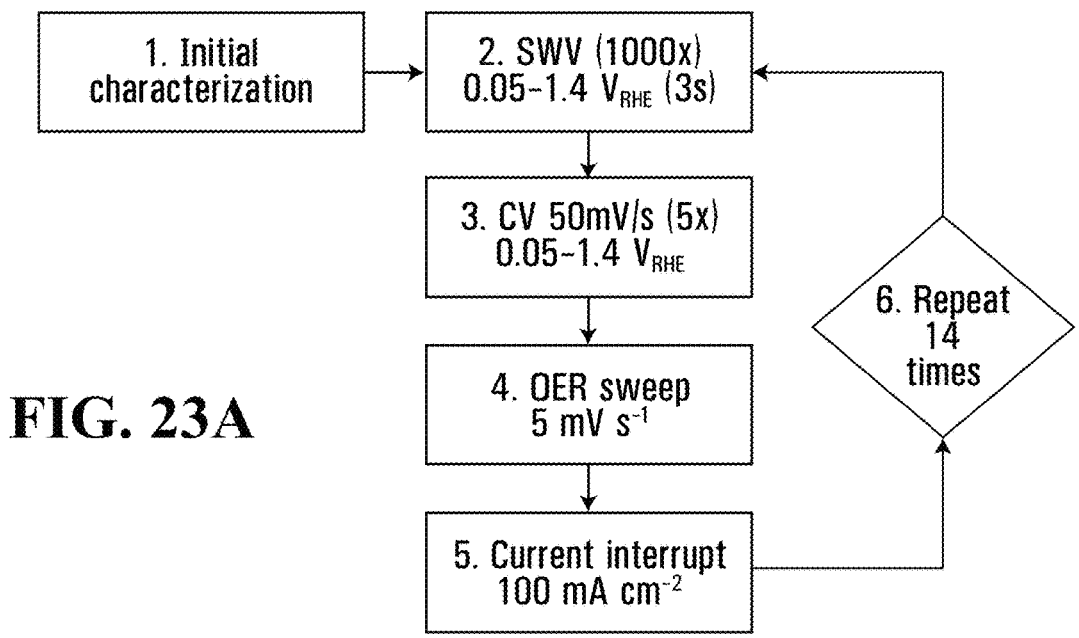
FIGS. 23a-d show accelerated degradation test (ADT) at 1600 rpm in 3.5 M H$_2$SO$_4$ at 40° C. in accordance with an embodiment. The ADT consists of 15,000 square wave cycles performed for a potential range of 0.05-1.4 V. The given sequence indicates 1,000 square wave voltammetric cycles (SWV). a) Block diagram of the ADT protocol, b) CVs recorded for 0.05-1.4 V, c) OER sweeps, and d) Peak current density and voltammetric charge.
Figure 23B:
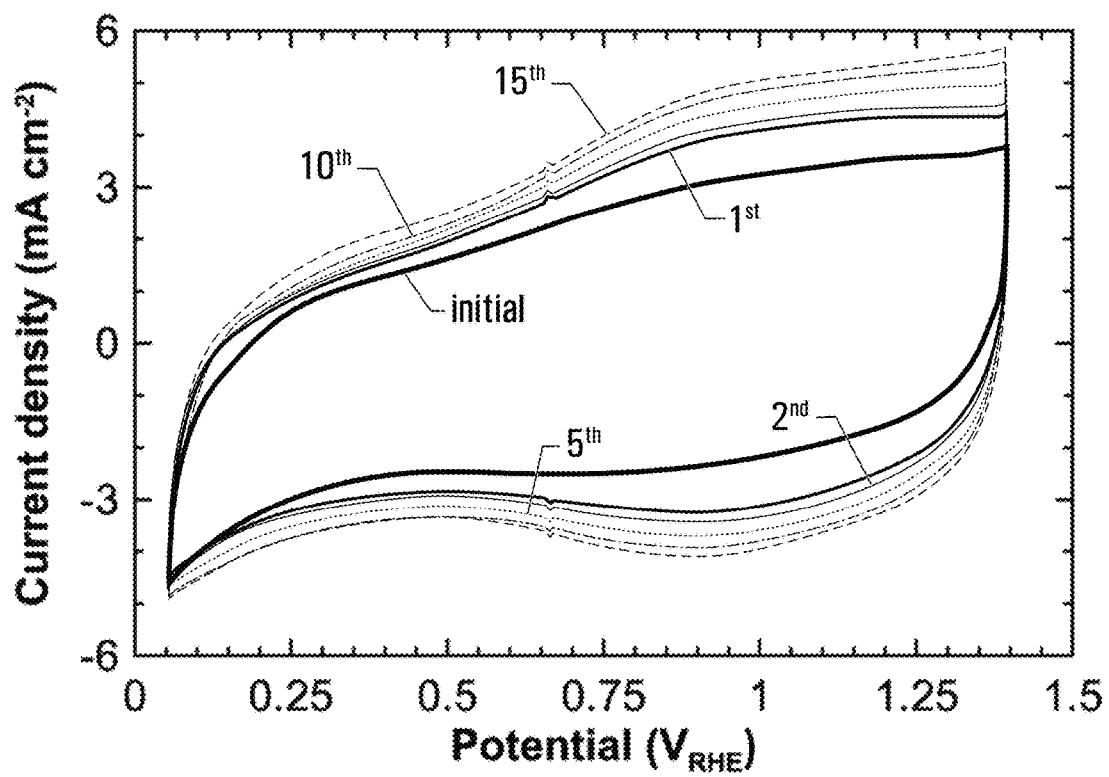
Figure 23C:
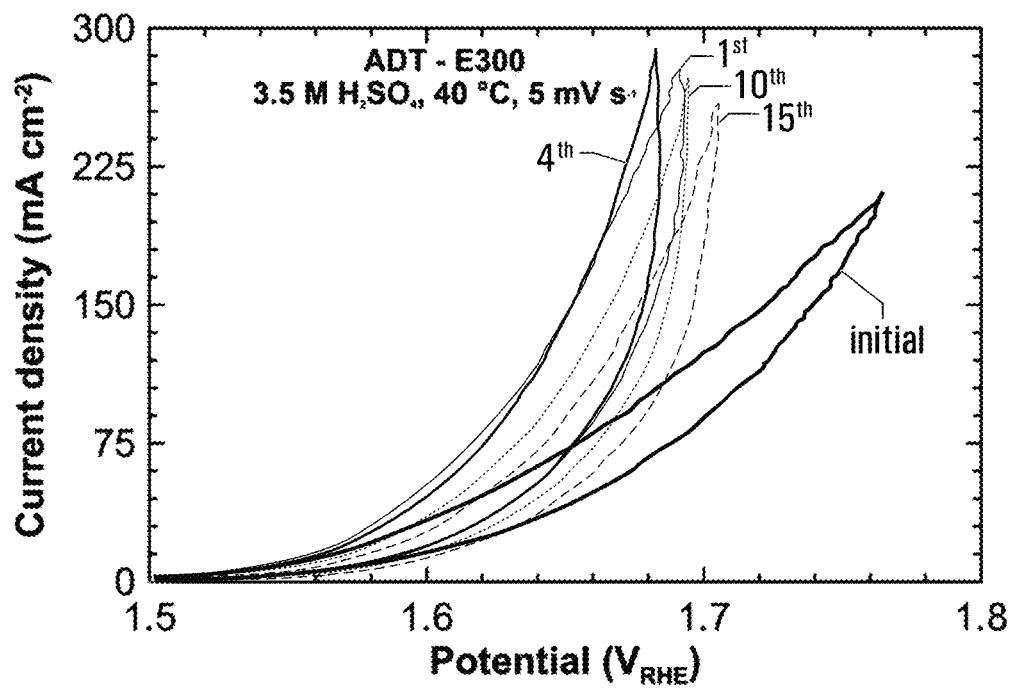

FIG. 23a shows the accelerated degradation test (ADT) protocol described in the experimental part. FIG. 23b indicates the influence of the corresponding protocol's square wave cycling on the CVs. The shape of the CVs is similar to those of FIG. 15a at 25° C. The charge increases mostly after the first sequence and subsequently rises almost constant up to sequence 11. The OER sweeps are shown in FIG.

Figure 23D:
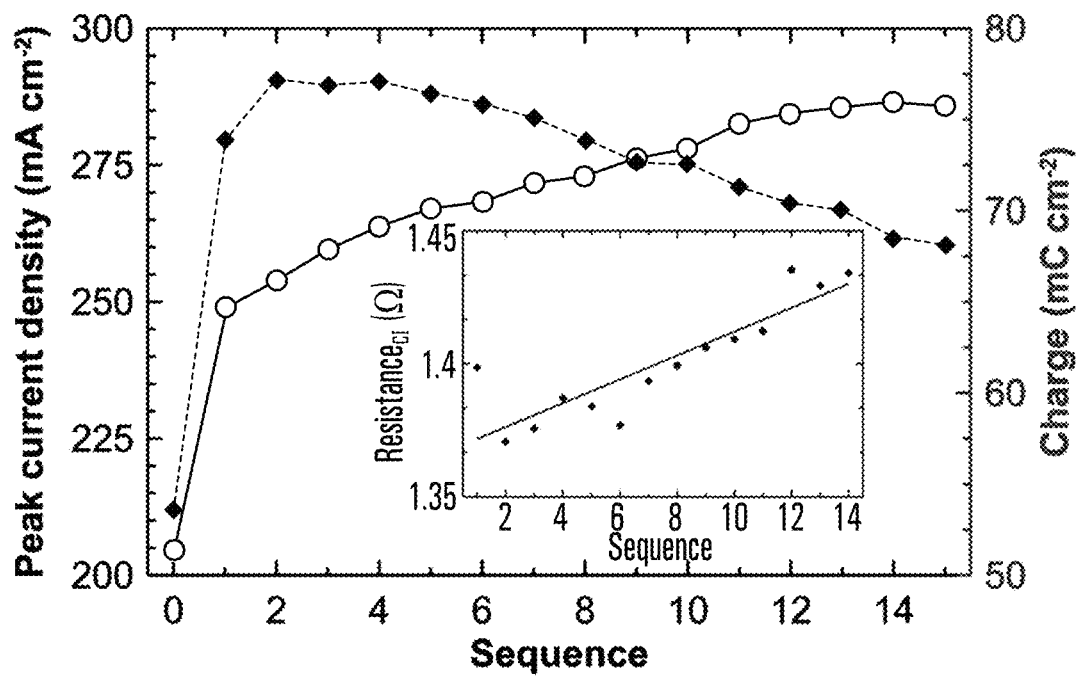

23c. The OER activity increases during the first two sequences, remains almost constant up to the fourth sequence and decreases continuously afterwards. The very first scan is before the SWV protocol and shows the lowest activity overall. The highest current density is reached after the second cycle. This behavior could indicate a break-in or conditioning period during the first cycles. Rakousky et al. observed a slight decrease in potential and resistance at the beginning of a MEA durability tests and they attribute it to the conformation of the MEA to the current collector. The resistance decreases in the beginning from 1.40Ω to 1.37Ω after the $2000^{th}$ square wave cycles, likely due to the conformation of the MEA, and increases afterwards because of titanium corrosion (FIG. 23d inset). FIG. 23d shows the peak current density (i.e., the maximum current density reached in one sweep) and the voltammetric charge vs. the sequence number. The peak current density can be seen as measure for the activity and remains relatively constant between the second and fourth cycles and decreases continuously afterwards. This trend is likely due to catalyst degradation/losses or an increasing resistance caused by titanium oxidation.

Example 16

MRDE (CCM)—Electrolyzer Test Station Comparison

Figure 24A:
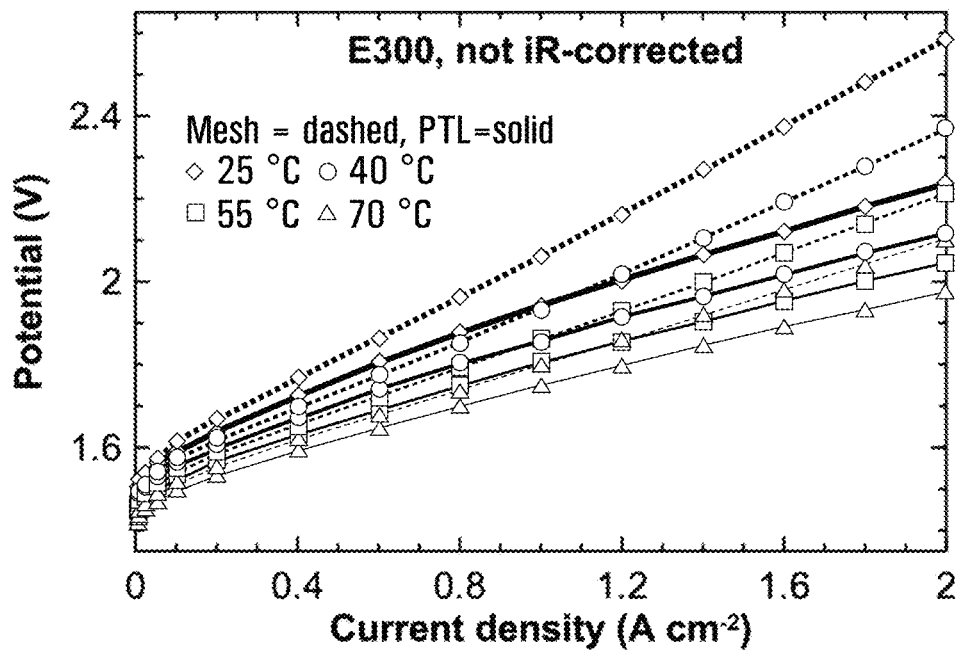
FIGS. 24a-d are graphs representing, in accordance with an embodiment, a) performance comparison of the ETS with the PTL (solid line) and the mesh placed over the PTL (dashed lines), not corrected for resistance, b) Polarization curve, c) Tafel plot of an electrode such as the electrode of FIG. 2 (dashed lines) compared to the electrolyzer test station (ETS, solid lines) at 25° C. (indicated by diamonds), 40° C. (indicated by circles), 55° C. (indicated by squares), and 70° C. (indicated by triangles), both iR corrected, and d)
Figure 24B:
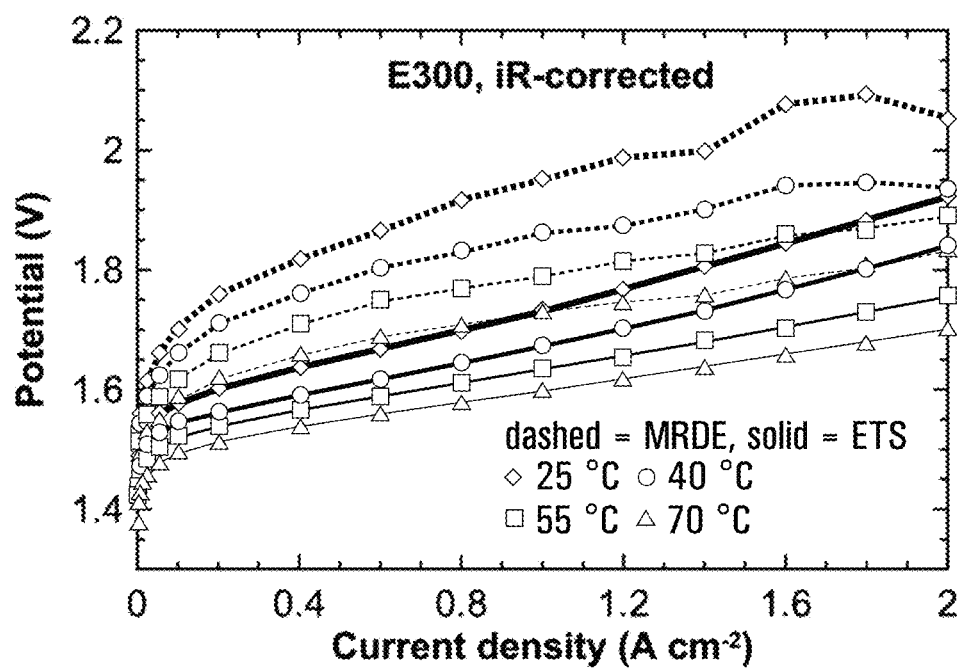
Figure 24C:
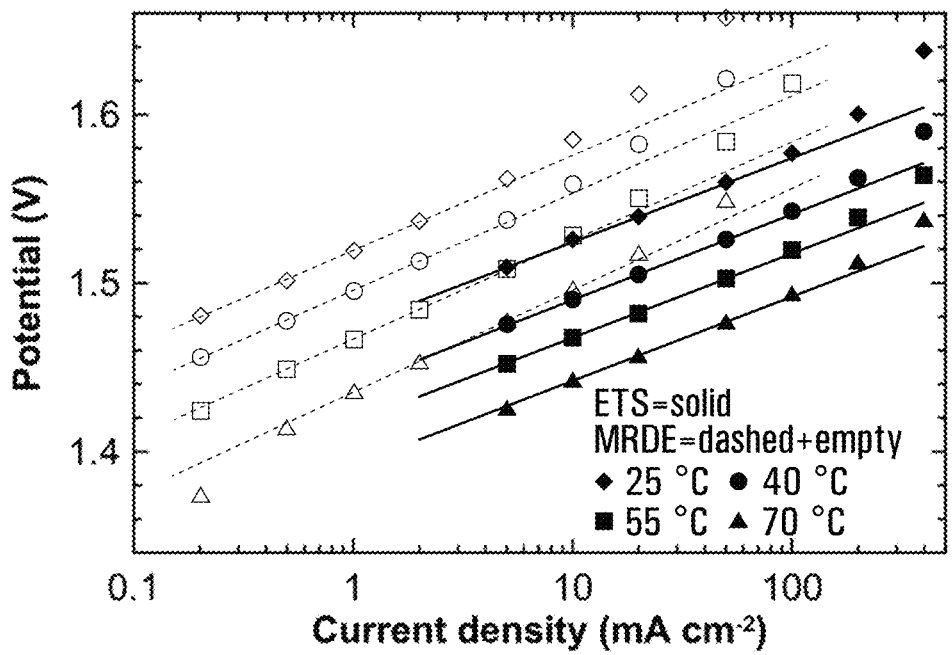

FIG. 24a compares the polarization curves obtained in an electrolysis test station with the PTL (solid lines) and the mesh (3Ti4-031, dashed lines) placed over the PTL to mimic the catalyst/current collector interface of the MRDE. The potential for a given current density is lower in the kinetic region as well as in the ohmic region for the PTL than that of the mesh current collector. FIG. 24b shows the polarization obtained using the 3Ti4-031 current collector in both MRDE and the electrolyzer setup. For both cases, higher temperature leads to better performance as expected. The Tafel plot shown in FIG. 24c shows that the overpotentials in the case of the ETS are generally lower. We attribute the activity difference to effects of the electrolyte.

Table 5 compares the Tafel slopes obtained from linear regression of the MRDE and the electrolyzer test station data for four different temperatures. Tafel slope obtained with one testing method (either MRDE or ETS) is temperature independent which indicates that the rate determining step does not change with temperature. Tafel slopes obtained from the electrolysis test station measurements are generally very comparable with Tafel slopes from MRDE experiments.

TABLE 5

Tafel slopes, b, at 25, 40, 55, and 70° C. determined with the modified-RDE (MRDE) and in the electrolyzer test station (ETS).

|  | $b_{,25° C.}$ (mV $dec^{-1}$) | $b_{,40° C.}$ (mV $dec^{-1}$) | $b_{,55° C.}$ (mV $dec^{-1}$) | $b_{,70° C.}$ (mV $dec^{-1}$) |
| --- | --- | --- | --- | --- |
| ETS | 50 | 51 | 50 | 50 |
| MRDE | 57 | 58 | 58 | 60 |

Table 6 compares the exchange current densities obtained from MRDE and ETS measurements at different temperatures. The exchange current densities measured with the ETS are at a given temperature are generally larger than that those obtained with the MRDE.

TABLE 6

Exchange current density, $j_0$, at 25, 40, 55, and 70° C. measured with the modified-RDE (MRDE) and in the electrolyzer test station (ETS).

|  | $j_{0, 25° C.}$ (A $cm^{-2}$) | $j_{0, 40° C.}$ (A $cm^{-2}$) | $j_{0, 55° C.}$ (A $cm^{-2}$) | $j_{0, 70° C.}$ (A $cm^{-2}$) |
| --- | --- | --- | --- | --- |
| ETS | $1.3 \times 10^{-8}$ | $7.3 \times 10^{-8}$ | $1.9 \times 10^{-7}$ | $5.4 \times 10^{-7}$ |
| MRDE | $7.5 \times 10^{-9}$ | $2.4 \times 10^{-8}$ | $8.9 \times 10^{-8}$ | $4.1 \times 10^{-7}$ |

Figure 24D:
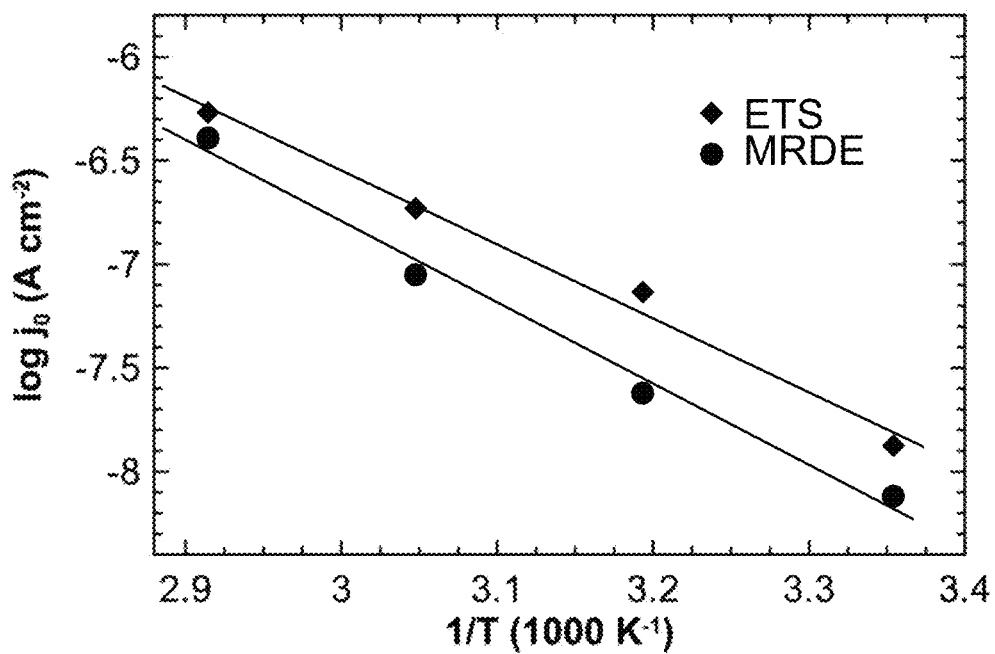

The corresponding Arrhenius plot of the kinetic data is shown in FIG. 24d. The calculated activation energies of the CCM samples determined by for the MRDE and for the electrolyzer test station are 75 and 68 kJ $mol^{-1}$, respectively.

Summary of Disclosure

In general, this disclosure provides apparatuses and methods for electrochemical analysis of a sample.

This disclosure also provides for a variety of electrochemical or electroanalytical processes, experiments, and measurements involving electroactive materials. In some embodiments, samples for ORR, for studying the electrochemical properties of conductive/insulator layers in liquid environments where fluid dynamics and/or mass transport properties of reactants (and/or products) need to be considered, and for other electrochemical reactions such as organic-based oxidations (e.g., alcohols), and oxygen evolution reaction (OER) may be used. In some embodiments, the disclosure allows for a rapid and economical screening of CCMs used for the anodic OER of PEM electrolyzers and may provide a controllable way of addressing the mass transfer due to bubble formation and their detachment from the surface of the electroactive material being studied. In some embodiments, the disclosure allows for direct characterization of CCMs using a rotating disk electrode-like approach.

This disclosure may also be used for any sample in which it is advantageous to collect current (or apply other electrical effects, such as an electric potential or an electric current) from the front side of the sample (such as the external side 167 of the sample 135, for example, which may be in most proximate contact with an electrolyte solution such as the electrolyte solution 106, rather than the back side as occurs in conventional RDE techniques). This disclosure may also be beneficial for use with samples possessing an electrically conducting material present on, at, or near a surface (for example, the external side 167 of the sample 135), and for which the opposite, generally co-parallel surface of the sample (for example, the internal side 169 of the sample 135) is electrically insulating, such as an electrically conducting material present on an electrically insulating substrate or layer, similar in general structure as that of a CCM or similar type of sample. The electrically conducting material may be, for example, a metal, a semiconductor, an alloy, or a catalyst.

This disclosure also provides for electrocatalytic measurements of CCMs in a modified RDE (MRDE) setup, which may provide researchers with an accurate and economical method of performing activity and stability measurements of catalyst coated membranes. In addition, the method may allow for precision control of working conditions (e.g., pH, electrolyte and temperature) and may also allow for investigation of the impact of potential impurities on the activity and stability of the CCMs. In some embodiments, the MRDE cell apparatus can optionally be combined with online analytical instruments such as ICP-MS or IR spectrometer allowing the user to examine the nature of the reaction products (which are often released into the electrolyte) or surface adsorbed species and intermediates in-situ, for example.

This disclosure also provides for modified RDE (MRDE) and modified RRDE (MRRDE) methods and apparatus. In some embodiments the ability to perform RDE (and RRDE)-type experiments on electroactive samples for which the electroactive species of interest is located on another material acting as a substrate or support for the electroactive species, where the substrate or support may be electrically insulating or of low electrical conductance is provided. In some embodiments, including in the case of PEMFC related materials, testing of catalyst-coated substrates (e.g., catalyst coated onto insulating/poor conducting substrates) and improved data compared to TF-RDE techniques may be provided. In some embodiments the apparatus may include a removable tip component (such as the electrode head 138) for existing RDE-type equipment. This disclosure may provide for compatibility with many existing RDE-type equipment and thus may provide the potential for "retrofitting" to various rotating electrode shafts available from a number of current suppliers.

A number of examples of the MRDE apparatus and data on some examples of use of the MRDE apparatus are presented herein, including for use in the study of a number of catalysts and CCMs, and accelerated degradation tests (ADT). In one example, OER catalyst-coated membranes can be directly analyzed with an RDE approach. In some embodiments, important kinetic data can then be extracted by this methodology and the activity can be investigated. This approach may allow one to investigate CCM samples in a fast, cost-effective, and convenient manner without expensive and more complicated hardware and test equipment. Direct measurement of CCM samples may reduce any uncertainties which arise from preparation of ink-based TF samples and may allow for a more efficient and accurate assessment of CCM samples.

This disclosure provides an electroanalytical tool capable of characterizing catalyst coated substrates. The tool may be compatible with common commercially available analytical tools and in some embodiments can use the same as-received commercial catalyst (for example catalyst-coated membranes) used in a polymer electrolyte membrane water electrolysis (PEMWE) test station. The tool can also act as a screening tool to test the effects of different external electrical conductors (or current collectors) on performance and assess the degradation of catalysts using an accelerated degradation test (ADT) protocol without the need of a PEWME test station. Operation of an MRDE with electrolysis CCMs may be very similar to those of fuel cell CCMs. In this case the potential is swept to oxidizing conditions and water splitting occurs (OER or oxygen evolution reaction). Rotation of the electrodes may help with mass transport and may improve the sensitivity (reducing noise) in the system. The working environment may be saturated with water and therefore may mimic the electrode conditions of a practical PEMWE very closely. With the MRDE very high current densities (close to those of PEMWE) may therefore be obtained. The tool may facilitate characterization of liquid electrolysis experiments, including for water electrolysis.

This disclosure also provides for a tool that may reduce the existing discrepancies between conventional RDE and PEMFC testing methods. Through the non-limiting examples disclosed above, some potential advantages of the MRDE over the commonly used TF-RDE techniques are demonstrated. The MRDE enables the characterization of catalyst activity and catalyst stability for a large range of electrochemical reactions at a reduced testing time and cost compared to conventional techniques.

Embodiments such as those described above may facilitate identifying improved electroactive materials. For example, embodiments such as those described above may facilitate identifying improved proton exchange membrane fuel cells (PEMFCs), or identifying improved membrane electrode assemblies (MEAs), which may include proton exchange membranes, ionomer and carbon-supported Pt-based (Pt/C) cathode, and anode electrocatalysts.

When compared to some known methods and apparatuses for electrochemical analysis, embodiments such as those described above may require less cost, or may indicate electroactive processes of the sample that more accurately represent electroactive processes of the sample in applications that differ from the electrochemical analysis.

Although specific embodiments have been described and illustrated, such embodiments should be considered illustrative only and not as limiting the invention as construed according to the accompanying claims.

The invention claimed is:

1. A method of exposing a sample to an electrical effect for electrochemical analysis of the sample in an electrolyte solution, the method comprising:
   causing an external electrical conductor of an electrode head to apply the electrical effect, wherein the sample is in a space defined by the electrode head, the space being open to an exterior of the electrode head at an open side of the space, and wherein a portion of the external electrical conductor of the electrode head forms a portion of an external surface of the electrode head, is on the open side of the space in the electrode head, and contacts an external side of the sample exposed to the electrolyte solution.

2. The method of claim 1 further comprising causing the sample and the external electrical conductor to rotate about an axis of rotation when the sample and the external electrical conductor are exposed to the electrolyte solution.

3. The method of claim 1 wherein causing the electrical effect to be applied to the external electrical conductor comprises causing the electrical effect to be applied to an electrical lead spaced apart from the sample and on an internal side of the sample opposite the external side of the sample.

4. The method of claim 3 wherein:
   causing the external electrical conductor of the electrode head to apply the electrical effect comprises causing the electrical effect to be applied to an internal electrical conductor;
   the internal electrical conductor is between, and in electrically conductive communication with, the electrical lead and the external electrical conductor; and
   the internal electrical conductor extends from the external electrical conductor to the internal side of the sample.

5. The method of claim 1 wherein the sample comprises an electroactive sample.

6. The method of claim 5 wherein the electroactive sample comprises a proton-exchange membrane, a catalyst-coated substrate, or a membrane-electrode assembly.

7. The method of claim 1 wherein causing the external electrical conductor of the electrode head to apply the electrical effect comprises causing an electric potential to be applied to the external electrical conductor.

8. The method of claim 1 wherein the external electrical conductor defines a plurality of openings such that the external side of the sample is exposed to the electrolyte solution through the external electrical conductor.

9. An apparatus for electrochemical analysis of a sample in an electrolyte solution, the apparatus comprising:

an electrode head defining a space for receiving the sample, the space in the electrode head open to an exterior of the electrode head at an open side of the space in the electrode head, the electrode head comprising an external electrical conductor, wherein a portion of the external electrical conductor forms a portion of an external surface of the electrode head, the portion of the external electrical conductor being on the open side of the space in the electrode head, and the portion of the external electrical conductor being positioned between the space in the electrode head and the exterior of the electrode head such that, when the space receives the sample with an external side of the sample contacting the external electrical conductor, the external side of the sample is exposed to the exterior of the electrode head.

10. The apparatus of claim 9 wherein the electrode head comprises a shaft interface on an internal side of the space in the electrode head opposite the open side of the space in the electrode head and coupleable to a shaft for rotation of the electrode head and of the shaft about an axis of rotation.

11. The apparatus of claim 10 wherein the space in the electrode head has a shape of a disk having a center on the axis of rotation.

12. The apparatus of claim 10 wherein the space in the electrode head has a shape of a ring having a center on the axis of rotation.

13. The apparatus of claim 10 further comprising a motor operable to rotate the electrode head about the axis of rotation.

14. The apparatus of claim 9 further comprising a shaft coupled to the electrode head and a motor operable to rotate the electrode head and the shaft about an axis of rotation.

15. The apparatus of claim 9 further comprising an electrical lead positionable to be in electrically conductive communication with the external electrical conductor and on an internal side of the space in the electrode head opposite the open side of the space in the electrode head.

16. The apparatus of claim 15 wherein the electrode head further comprises an internal electrical conductor positionable to extend from the external electrical conductor to the internal side of the space in the electrode head, and positionable to be in electrically conductive communication with the electrical lead and with the external electrical conductor.

17. The apparatus of claim 16 wherein the electrode head comprises:

a first portion comprising the electrical lead; and
a second portion defining the space in the electrode head, comprising the external electrical conductor, and removably attachable to the first portion;
wherein the internal electrical conductor is positionable to be in electrically conductive communication with the electrical lead when the first portion of the electrode head is attached to the second portion of the electrode head.

18. The apparatus of claim 9 wherein the electrode head further comprises a movable portion movable to urge the sample against the external electrical conductor when the sample is received in the space in the electrode head.

19. The apparatus of claim 9 further comprising an electrolyte reservoir for an electrochemical cell, the electrolyte reservoir operable to hold the electrolyte solution and operable to hold the electrode head in a position such that external electrical conductor is exposed to the electrolyte solution when the reservoir holds the electrolyte solution.

20. The apparatus of claim 9 wherein the external electrical conductor defines a plurality of openings such that the external side of the sample is exposed to the electrolyte solution through the external electrical conductor when the space receives the sample with the external side of the sample contacting the external electrical conductor and when the external surface of the electrode head is exposed to the electrolyte solution.

\* \* \* \* \*